United States Patent
Chun et al.

(10) Patent No.: US 11,214,583 B2
(45) Date of Patent: Jan. 4, 2022

(54) COMPOUND HAVING ALKOXYSILYL GROUP AND ACTIVE ESTER GROUP, METHOD FOR PREPARING SAME, COMPOSITION COMPRISING SAME, AND USE

(71) Applicant: KOREA INSTITUTE OF INDUSTRIAL TECHNOLOGY, Cheonan-si (KR)

(72) Inventors: Hyun-Aee Chun, Seongnam-si (KR); Yun-Ju Kim, Ansan-si (KR); Sook-Yeon Park, Gunpo-si (KR); Su-Jin Park, Osan-si (KR); Tae-Kwang Kim, Seoul (KR)

(73) Assignee: KOREA INSTITUTE OF INDUSTRIAL TECHNOLOGY, Chungcheongnam-do (KR)

( * ) Notice: Subject to any disclaimer, the term of this patent is extended or adjusted under 35 U.S.C. 154(b) by 21 days.

(21) Appl. No.: 16/619,464

(22) PCT Filed: Jun. 5, 2017

(86) PCT No.: PCT/KR2017/005859
§ 371 (c)(1),
(2) Date: Dec. 5, 2019

(87) PCT Pub. No.: WO2018/225880
PCT Pub. Date: Dec. 13, 2018

(65) Prior Publication Data
US 2020/0165275 A1 May 28, 2020

(51) Int. Cl.
*C07F 7/18* (2006.01)
*C08G 61/10* (2006.01)
(Continued)

(52) U.S. Cl.
CPC .......... *C07F 7/1804* (2013.01); *C07F 7/1876* (2013.01); *C08G 61/10* (2013.01);
(Continued)

(58) Field of Classification Search
CPC ..................................................... C07F 7/1804
See application file for complete search history.

(56) References Cited

U.S. PATENT DOCUMENTS

2008/0221238 A1    9/2008   Su et al.
2014/0179836 A1    6/2014   Chun et al.
(Continued)

FOREIGN PATENT DOCUMENTS

JP       2004149497 A      5/2004
JP       2005-113000    *   4/2005
(Continued)

OTHER PUBLICATIONS

Japanese Office Action for JP Application No. 2019-567319 dated Jan. 27, 2021, citing the above reference(s).
(Continued)

*Primary Examiner* — William D Young
(74) *Attorney, Agent, or Firm* — Cantor Colburn LLP

(57) ABSTRACT

The present invention relates to a novel compound having an alkoxysilyl group and an active ester group, a method for preparing the same, a composition comprising the same, and a use, wherein the novel compound exhibits improved low moisture absorption and/or low dielectric properties when cured as an epoxy composition, but is not accompanied by loss of thermal expansion characteristics. Disclosed are a novel compound of formulae AF to LF having an alkoxysilyl group and an active ester group, and a method for preparing the same, a composition comprising the same, and a use of same.

7 Claims, 1 Drawing Sheet

(51) Int. Cl.
*C08L 63/00* (2006.01)
*C09D 163/04* (2006.01)
*C09J 163/04* (2006.01)
*C08K 3/36* (2006.01)

(52) U.S. Cl.
CPC ............ *C08L 63/00* (2013.01); *C09D 163/04* (2013.01); *C09J 163/04* (2013.01); *C08K 3/36* (2013.01); *C08K 2201/005* (2013.01)

(56) References Cited

U.S. PATENT DOCUMENTS

| | | |
|---|---|---|
| 2015/0051316 A1 | 2/2015 | Chun et al. |
| 2015/0105493 A1 | 4/2015 | Chun et al. |
| 2015/0203626 A1 | 7/2015 | Chun et al. |
| 2015/0247033 A1 | 9/2015 | Chun et al. |
| 2015/0361211 A1 | 12/2015 | Chun et al. |
| 2016/0326299 A1 | 11/2016 | Chun et al. |
| 2017/0066789 A1 | 3/2017 | Tak et al. |
| 2018/0155370 A1 | 6/2018 | Chun et al. |

FOREIGN PATENT DOCUMENTS

| | | |
|---|---|---|
| JP | 2005113000 A | 4/2005 |
| JP | 2008266576 A | 11/2008 |
| KR | 1020130023168 A | 3/2013 |
| KR | 1020130111299 A | 10/2013 |
| KR | 1020130112007 A | 10/2013 |
| KR | 1020140009029 A | 1/2014 |
| KR | 1020140036983 A | 3/2014 |
| KR | 1020140106441 A | 9/2014 |
| KR | 1020150083791 A | 7/2015 |
| KR | 1020150098559 A | 8/2015 |
| KR | 1020170092468 A | 8/2017 |
| WO | 2015105379 A1 | 7/2015 |
| WO | 2016093383 A1 | 6/2016 |

OTHER PUBLICATIONS

International Search Report dated Mar. 9, 2018 for PCT/KR2017/005859, citing the above reference(s).
S. Nakamura et al., "Network Structure and Glass Transition of Epoxy Resins Cured with Active Ester," Journal of Thermal Analysis, 1993, pp. 613-619, vol. 40.

* cited by examiner

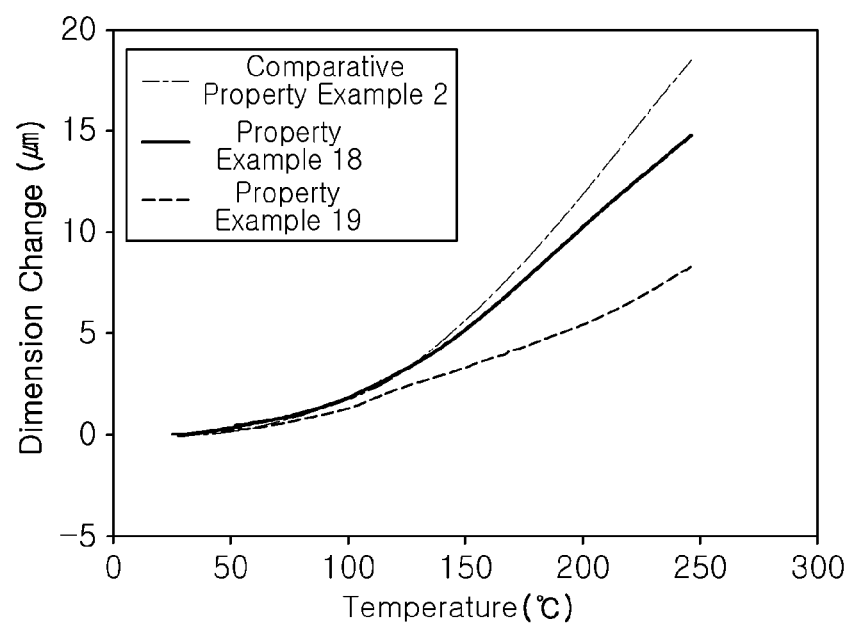

COMPOUND HAVING ALKOXYSILYL GROUP AND ACTIVE ESTER GROUP, METHOD FOR PREPARING SAME, COMPOSITION COMPRISING SAME, AND USE

TECHNICAL FIELD

The present disclosure relates to a novel compound having an alkoxysilyl group and an active ester group, a method for preparing the same, a composition comprising the same, and a use thereof, the novel compound exhibiting improved low moisture absorption and/or low dielectric properties without loss of thermal expansion properties when its epoxy composition is cured.

BACKGROUND ART

An epoxy material used in various substrates or packagings in the field of semiconductor and electrical and electronic materials has a property to absorb moisture from the air. Moisture absorbed by an epoxy material is rapidly vaporized when exposed to a high temperature such as in a soldering process. The volume expansion during vaporization may cause the stress, which lead to packaging cracks and internal peel-off, increase of leakage current and corrosion of an electrode. Consequently the reliability of a component may degrade.

Also, an epoxy material may have a higher coefficient of thermal expansion than those of ceramic and metal materials used for semiconductor and electrical and electronic materials. Accordingly, when an epoxy material is used with an inorganic material or a metal material where a process and/or a used temperature are changed, product defects such as cracks, warpage of a substrate, peel-off, breakage of a substrate, and the like may occur due to CTE-mismatch between the epoxy material and the inorganic material or the metal material. Thus, high thermal expansion properties of an epoxy material may be a factor for degrading dimension stability and high temperature reliability of a component.

Therefore, low moisture absorption and low thermal expansion properties of an epoxy material may be important factors for determining reliability of a component in the field of semiconductor and electrical and electronic materials. As a conventional method for decreasing moisture absorption of an epoxy material, a introduction a hydrophobic group to an epoxy compound or decrease of the crosslinking density has been used. However, when crosslinking density is decreased, heat resistance properties may degrade. Hence it may be difficult that low moisture absorption and low thermal expansion properties are compatible. Also, to improve low-moisture absorption, a curing agent with an active ester group has been used. However, when a curing agent with active ester group is used, thermal expansion properties may be deteriorated such that it may be difficult that both low moisture absorption and low thermal expansion properties are observed at the same time. The above-described issues is disclosed in "Network Structure and Glass Transition of Epoxy Resins Cured with Active Ester" (Journal of Thermal Analysis, Vol. 40 (1993) 613-619)" where low thermal expansion properties may degrade when an epoxy resin is cured using an active ester group. Further, in the recent field of high-tech electronic devices, printed substrates, for example, a high transmission speed in a high frequency environment may be required, and a material having low dielectric properties may thus be necessary.

Disclosure

Technical Problem

An aspect of the present disclosure is to provide a compound having an alkoxysilyl group and an active ester group which may exhibit improved low moisture absorption and/or low dielectric properties without loss of thermal expansion properties when its epoxy composition is cured.

Also, an aspect of the present disclosure is to provide a method for preparing a compound having an alkoxysilyl group and an active ester group which may exhibit improved low moisture absorption and/or low dielectric properties without loss of thermal expansion properties when its epoxy composition is cured.

Further, an aspect of the present disclosure is to provide composition comprising a compound having an alkoxysilyl group and an active ester group which may exhibit improved low moisture absorption and/or low dielectric properties without loss of thermal expansion properties and a use thereof, when its epoxy composition is cured.

According to an aspect of the present disclosure, a compound having an alkoxysilyl group and an active ester group selected from a group consisting of Formulae AF to LF below is provided:

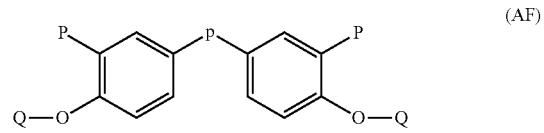

(AF)

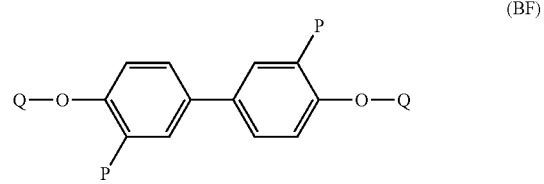

(BF)

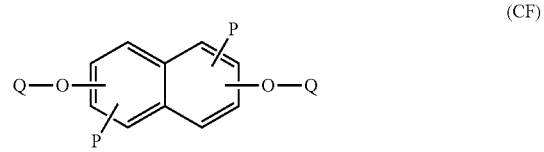

(CF)

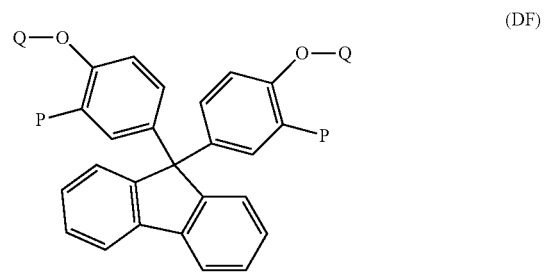

(DF)

(EF)
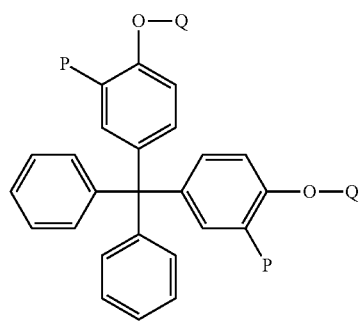
(FF)
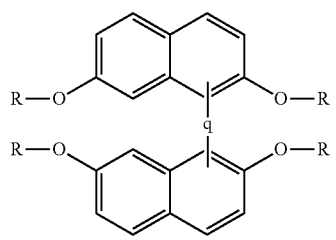
(GF)
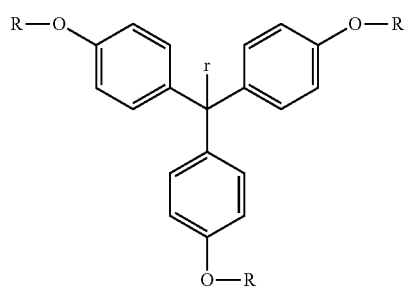
(HF)
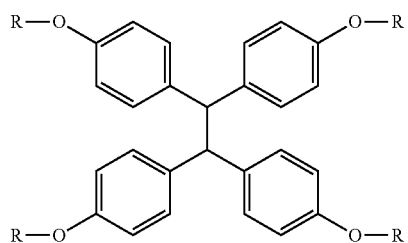
(IF)
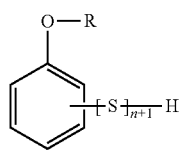
(JF)
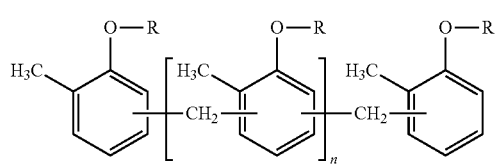
(KF)
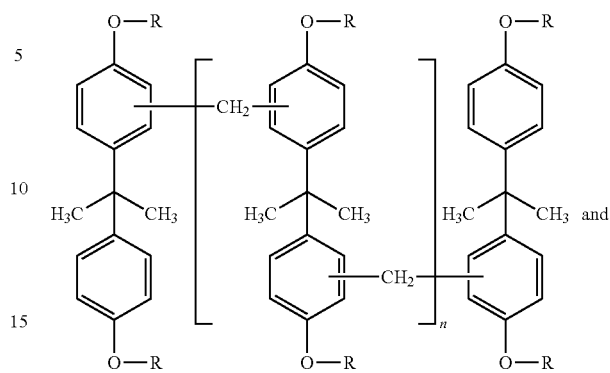
(LF)
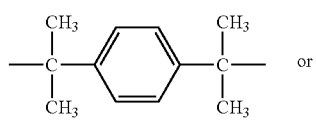
(in Formula AF, -p- is —C(CH$_3$)$_2$—, —CH$_2$—, —C(CF$_3$)$_2$—, —S—, —SO$_2$—,
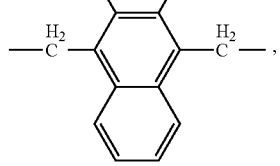
or
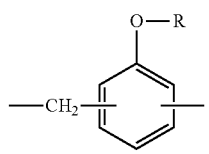
in Formula FF, -q- is —CH$_2$— or a direct linkage,
in Formula GF, r is hydrogen, a hydroxyl group, a C1-C10 alkyl group, or a C1-C10 aromatic group,
in Formula IF, s is
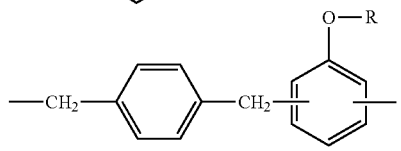
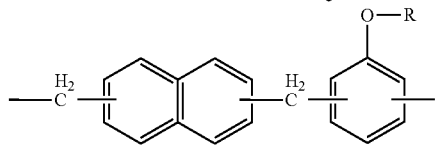

-continued

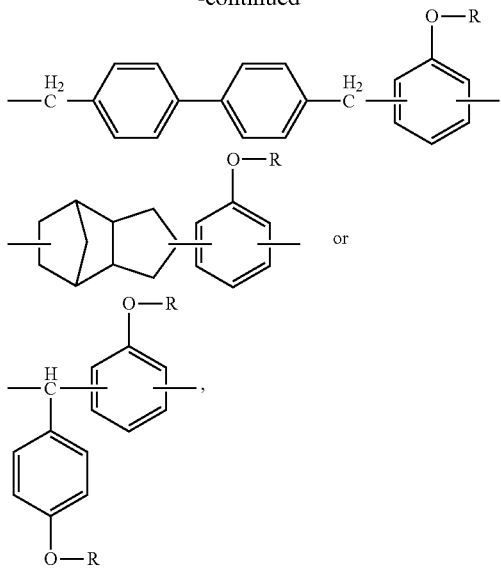

in Formula LF, t is

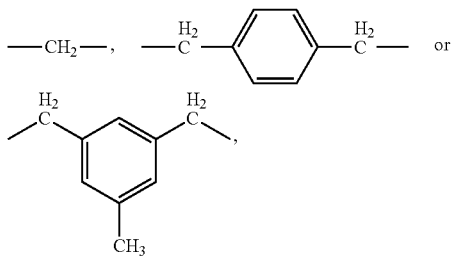

in Formulae IF to LF, n is an integer equal to or greater than 1, in Formulae AF to EF, at least one of a plurality of Ps is —(CH$_2$)mSiRaRbRc, at least one of Ra, Rb, and Rc is a C1-C5 alkoxy group and the remainders thereof are alkyl groups having 1 to 10 carbon atoms, the alkyl group and the alkoxy group are a linear or branched, m is an integer ranging from 3 to 10, the remainders thereof are hydrogen or alkenyl of —(CH$_2$)$_l$CHCH$_2$, where l is an integer ranging from 1 to 8, at least one of a plurality of Qs is —COR$_1$, where R$_1$ is an aliphatic, alicyclic, or aromatic hydrocarbon group of C1-C20, and the aliphatic hydrocarbon group is a linear or branched, and the remainder of the plurality of Qs are hydrogen, in Formulae FF to LF, at least one of a plurality of Rs is —(CH$_2$)mSiRaRbRc or —CONH(CH$_2$)mSiRaRbRc, where at least one of Ra, Rb, and Rc may be a C1-C5 alkoxy group, and the remainders thereof are alkyl groups having 1 to 10 carbon atoms, the alkyl group and the alkoxy group are a linear or branched, m is an integer ranging from 3 to 10, at least one of a plurality of Rs is —COR$_1$, R$_1$ is an aliphatic, alicyclic, or aromatic hydrocarbon group of C1-C20, the aliphatic hydrocarbon group is a linear or branched, and the remainder of the plurality of Rs are hydrogen or —(CH$_2$)$_l$CHCH$_2$, independently, where l is an integer ranging from 1 to 8).

According to another aspect of the present disclosure, a method of preparing a compound having an alkoxysilyl group and an active ester group is provided, the method including an esterification step in which an intermediate (1-2) of Formulae AM to EM below is obtained by a reaction between a starting material (1-1) of Formulae AS to ES below and an acyl compound of Formula 1 below or an acid anhydride of Formula 2 below; and an alkoxysilylation step in which a compound represented by Formulae AF to EF is obtained by a reaction between the intermediate (1-2) of Formulae AM to EM above and an alkoxysilane of Formula 3 below:

[Starting Material (1-1)]

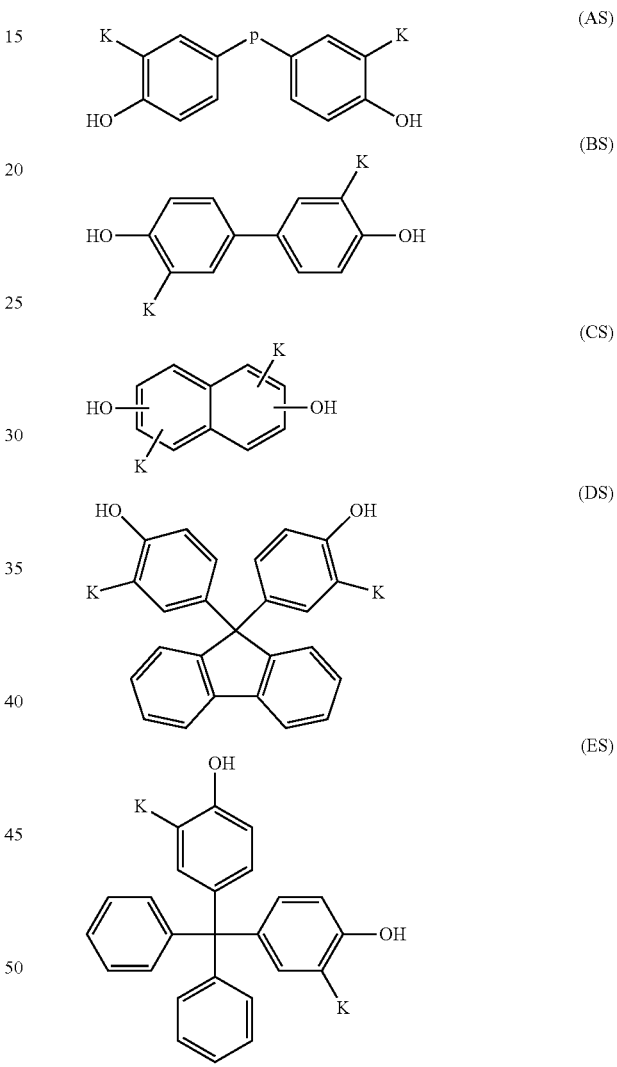

(in Formulae AS to ES, at least one of Ks is —(CH$_2$)$_l$CHCH$_2$, where l is an integer ranging from 1 to 8, and the remainders thereof are hydrogen, in Formula AS, -p- is —C(CH$_3$)$_2$—, —CH$_2$—, —C(CF$_3$)$_2$—, —S—, —SO$_2$—,

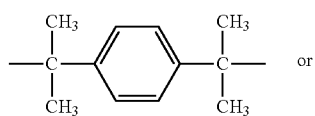 or

-continued

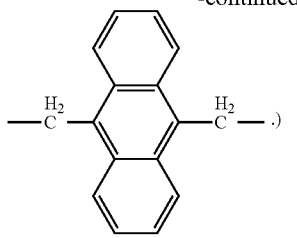

R₁—CO—X [Formula 1]

(R₁—CO)₂O [Formula 2]

(in Formula 1, X is a halide such as Cl, Br or I, —O—SO₂—CH₃, —O—SO₂—CF₃, or —O—SO₂—C₆H₄—CH₃, and in Formulae 1 and 2, R₁ is an aliphatic, aromatic, or alicyclic hydrocarbon group having C1 to C20 carbon atoms, and the aliphatic hydrocarbon group is a linear or branched.)

[Intermediate (1-2)]

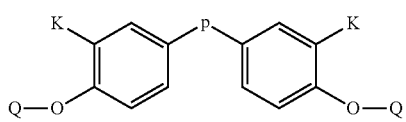
(AM)

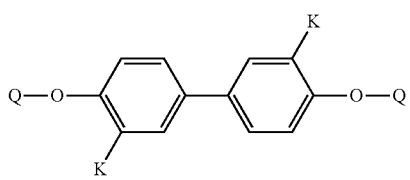
(BM)

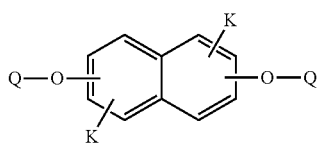
(CM)

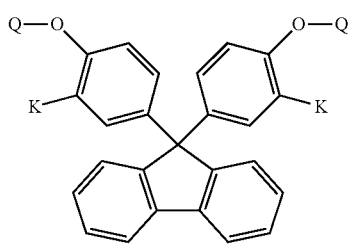
(DM)

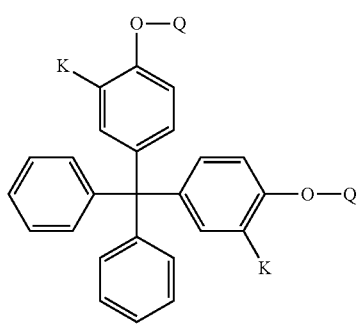
(EM)

in Formulae AM to EM, at least one of Ks is —(CH₂)$_l$CHCH₂, where l is an integer ranging from 1 to 8, the remainders thereof are hydrogen, at least one of Qs is —COR₁, R₁ is an aliphatic, aromatic, or alicyclic hydrocarbon group having C1 to C20 carbon atoms, the aliphatic hydrocarbon group is a linear or branched, and the remainder of Qs are hydrogen, in Formulae AM, -p- is —C(CH₃)₂—, —CH₂—, —C(CF₃)₂—, —S—, —SO₂—,

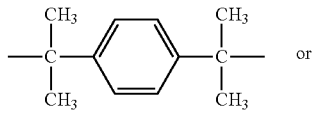 or

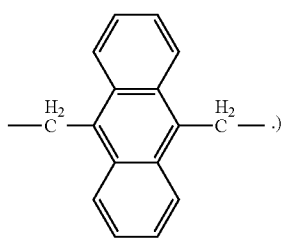

HSiR$_a$R$_b$R$_c$ [Formulae 3]

(in Formula 3, at least one of R$_a$ to R$_c$ may be a C1-C5 alkoxy group, the remainders thereof are C1-C10 alkyl groups, and the alkoxy group and the alkyl group are a linear or branched.)

According to another aspect of the present disclosure, a method of preparing a compound having an alkoxysilyl group and an active ester group is provided, the method including an esterification step in which an intermediate (2-2) of Formulae FM to LM below is obtained by a reaction between a starting material (2-1) of Formulae FS to LS below and an acyl compound of Formula 1 below or an acid anhydride of Formula 2 below; and an alkoxysilylation step in which a compound represented by Formulae FF to LF above where at least one of the plurality of Rs is —CONH(CH₂)$_m$SiRaRbRc (where m, Ra, Rb, and Rc are as defined above), at least one of the plurality of Rs is —COR₁ (where R₁ is as defined above), the remainder of the plurality of Rs are hydrogen is obtained by a reaction between the intermediate (2-2) of Formulae FM to LM above and an alkoxysilane of Formula 4 below:

[Starting Material (2-1)]

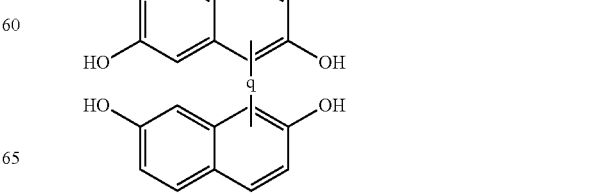
(FS)

-continued

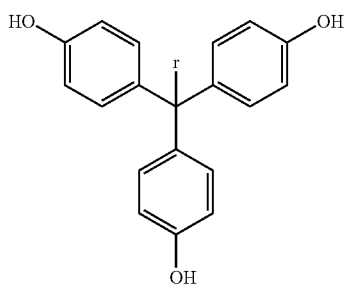
(GS)

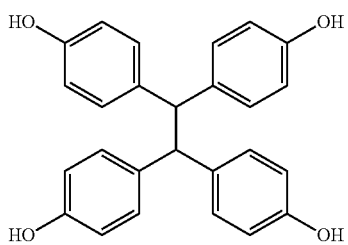
(HS)

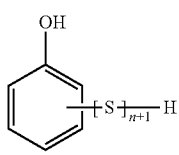
(IS)

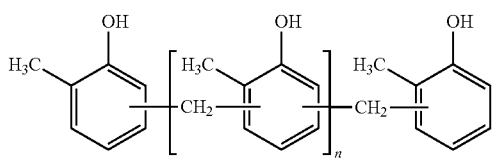
(JS)

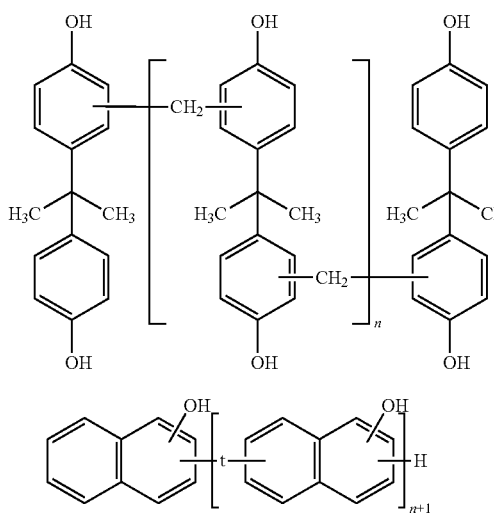
(KS)

(LS)

(in Formula FS, -q- may be —CH$_2$— or a direct linkage, in Formula GS, r is hydrogen, a hydroxyl group, a C1-C10 alkyl group, or a C1-C10 aromatic group, preferably a C6-C10 aromatic group, in Formula IS, S is

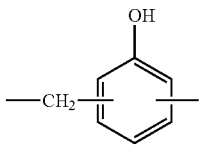

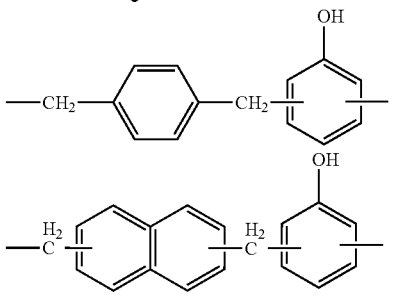

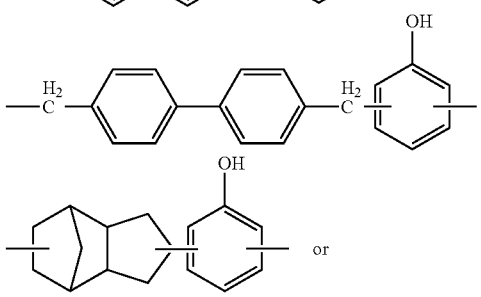

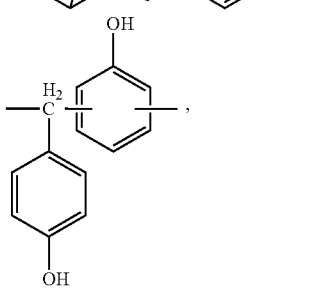

in Formula LS, t is

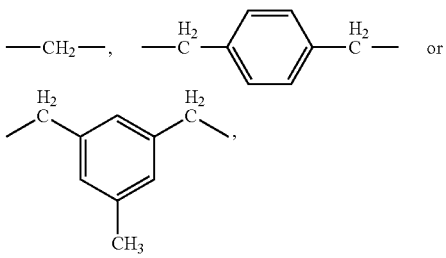

and in in Formulae IS to LS, n is an integer equal to or greater than 1)

$$R_1-CO-X \quad \text{[Formula 1]}$$

$$(R_1-CO)_2O \quad \text{[Formula 2]}$$

(in Formula 1, X is a halide such as Cl, Br or I, —O—SO$_2$—CH$_3$, —O—SO$_2$—CF$_3$, or —O—SO$_2$—C$_6$H$_4$—CH$_3$, and in Formulae 1 and 2, R$_1$ is an aliphatic, aromatic, or alicyclic hydrocarbon group having C1 to C20 carbon atoms, and the aliphatic hydrocarbon group is a linear or branched.)

[Intermediate (2-2)]
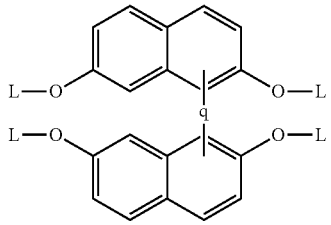
(FM)
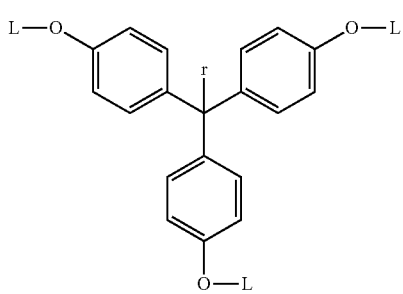
(GM)
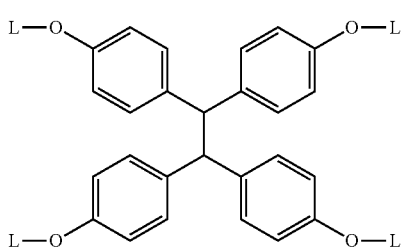
(HM)
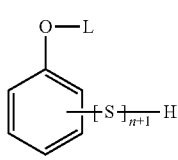
(IM)
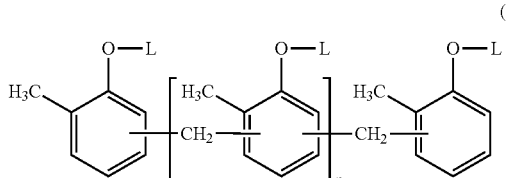
(JM)
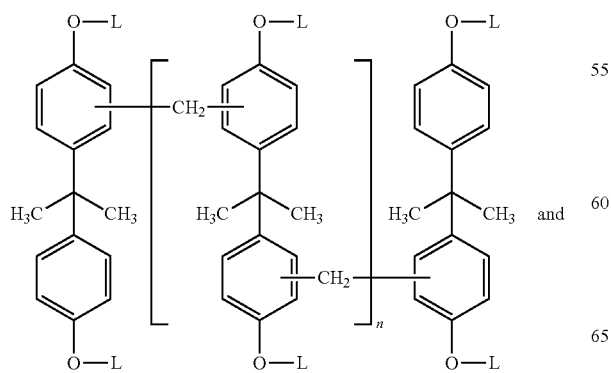
(KM) and
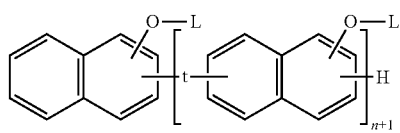
(LM)
(in Formula FM, -q- is —CH$_2$— or a direct linkage,
in Formula GM, r is hydrogen, a hydroxyl group, a C1-C10 alkyl group, or a C1-C10 aromatic group,
in Formula IM, S is
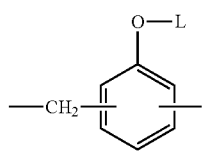
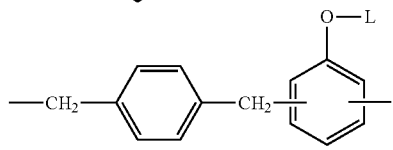
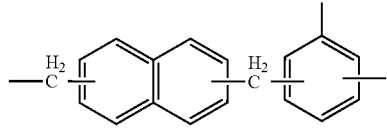
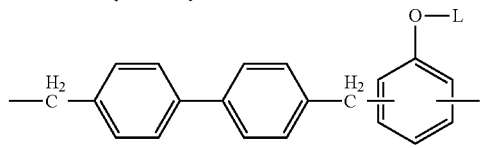
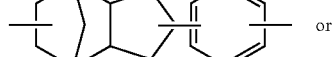 or
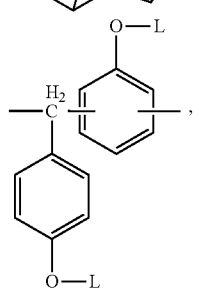,
in Formula LM, t is
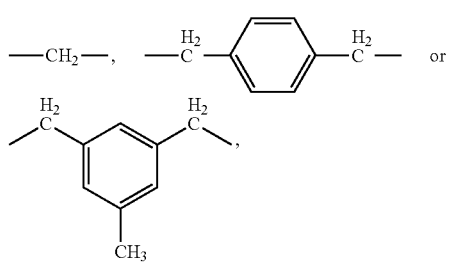 or in Formulae IM to LM, n is an integer equal to or greater than 1, in Formulae FM to LM, at least one of Ls is —COR$_1$, R$_1$ is an aliphatic, aromatic, or alicyclic hydrocarbon group having C1 to C20 carbon atoms, the aliphatic hydrocarbon group is a linear or branched, and the remainder of Ls is hydrogen.)

OCN—(CH$_2$)$_m$-SiRaRbRc    [Formula 4]

(in Formula 4, at least one of Ra to Rc is a C1-C5 alkoxy group, the remainders thereof are C1-C10 alkyl groups, the alkoxy group and the alkyl group are a linear or branched, and m is an integer ranging from 3 to 10.)

Also, according to the present disclosure, a method of preparing a compound having an alkoxysilyl group and an active ester group is provided, the method including an alkenylation step in which an intermediate (3-2(1)) of Formulae FM1 to LM1 below is obtained by a reaction between a starting material (3-1) of Formulae FS to LS below and an alkenyl compound of Formula 5 below;

an esterification step in which an intermediate (3-2(2)) of Formulae FM2 to LM2 below is obtained by a reaction between the intermediate (3-2(1)) of Formulae FM1 to LM1 above and an acyl compound of Formula 1 below or an acid anhydride of Formula 2 below; and an alkoxysilylation step in which a compound represented by Formulae FF to LF above where at least one of the plurality of Rs is —(CH$_2$)$_m$SiRaRbRc (where m, Ra, Rb, and Rc are as defined above), at least one of the plurality of Rs is —CO—R$_1$ (where R$_1$ is as defined above), the remainder of the plurality of Rs are hydrogen or an alkenyl group of —(CH$_2$)$_l$CHCH$_2$ (where l is as defined above) is obtained by a reaction between the intermediate (3-2(2)) of Formulae FM2 to LM2 above and an alkoxysilane of Formula 3 below;

[Starting Material (3-1)]

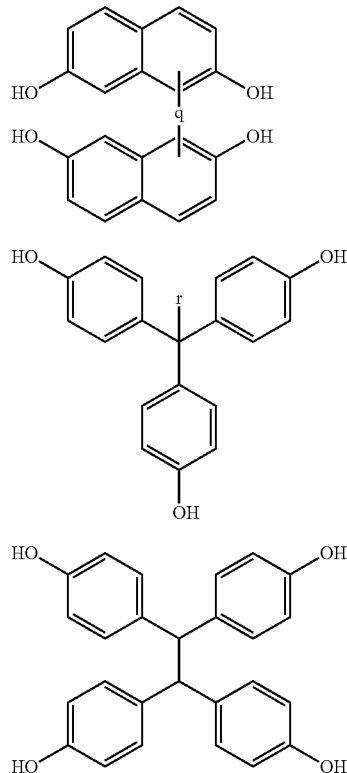

(FS)

(GS)

(HS)

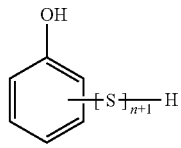

(IS)

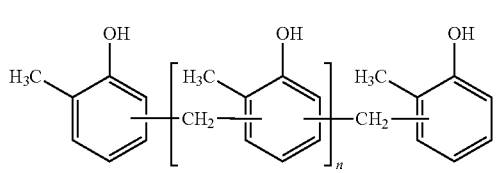

(JS)

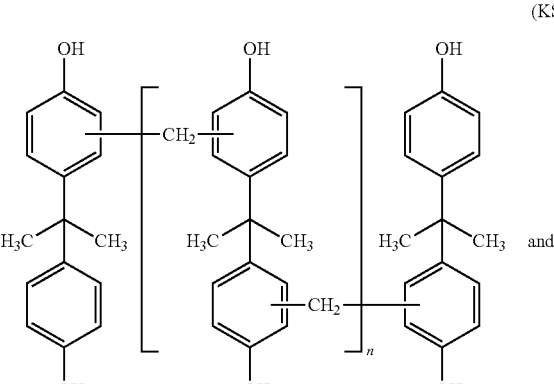

(KS)

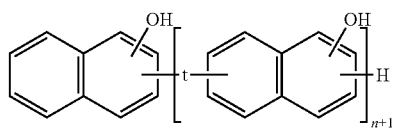

and (LS)

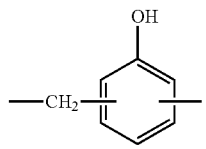

(in Formula FS, -q- is -CH$_2$- or a direct linkage, in Formula GS, r is hydrogen, a hydroxyl group, a C1-C10 alkyl group, or a C1-C10 aromatic group, preferably a C6-C10 aromatic group, in Formula IS, S is

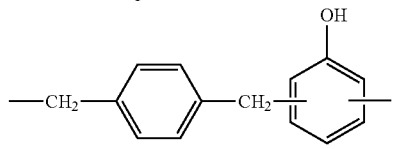

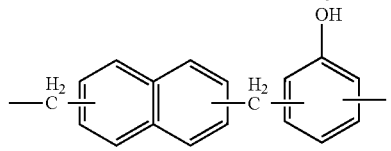

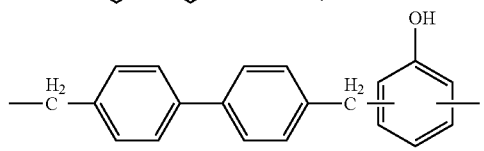

-continued

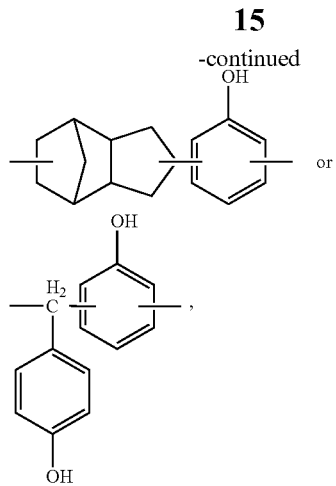

in Formula LS, t is

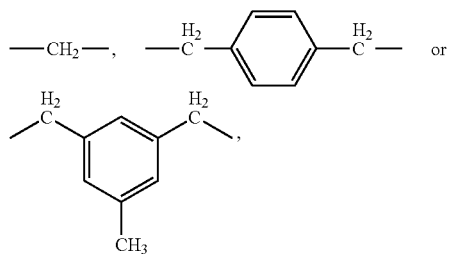

and in Formulae IS to LS, n is an integer equal to or greater than 1.)

X—(CH$_2$)$_l$—CH=CH$_2$  [Formula 5]

(in Formula 5, l is an integer ranging from 1 to 8, X is a halide such as Cl, Br or I, —O—SO$_2$—CH$_3$, —O—SO$_2$—CF$_3$, or —O—SO$_2$—C$_6$H$_4$—CH$_3$.)

[Intermediate (3-2(1))]

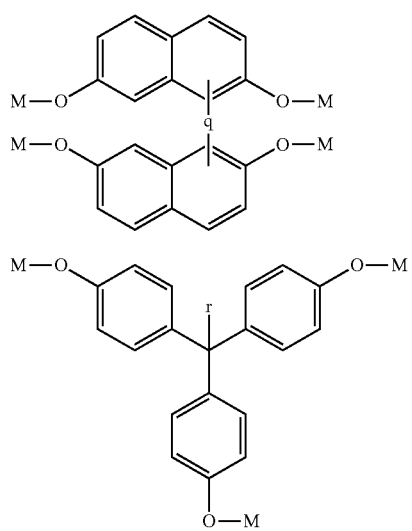
(FM1)

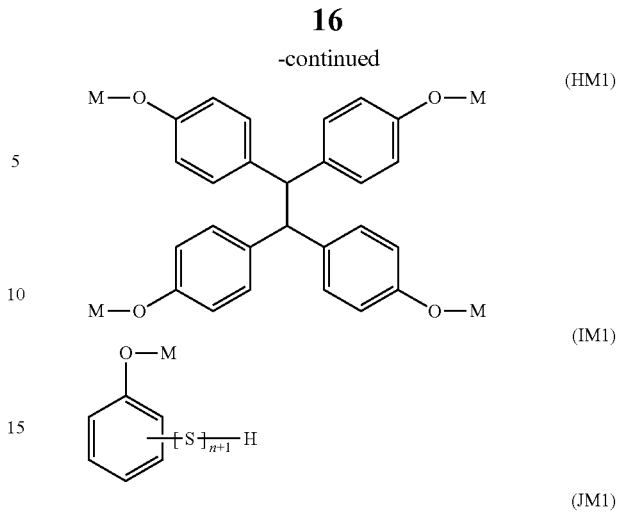

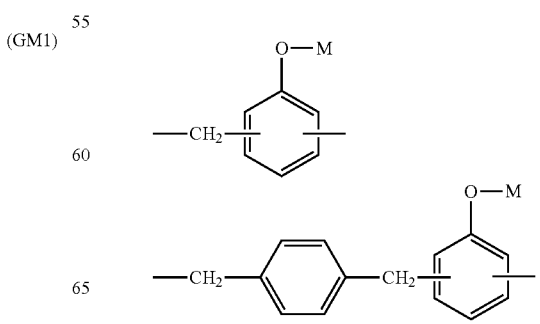

(in Formula FM1, -q- may be —CH$_2$— or a direct linkage, in Formula GM1, r is hydrogen, a hydroxyl group, a C1-C10 alkyl group, or a C1-C10 aromatic group, preferably a C6-C10 aromatic group, in Formula IM1, S is -continued

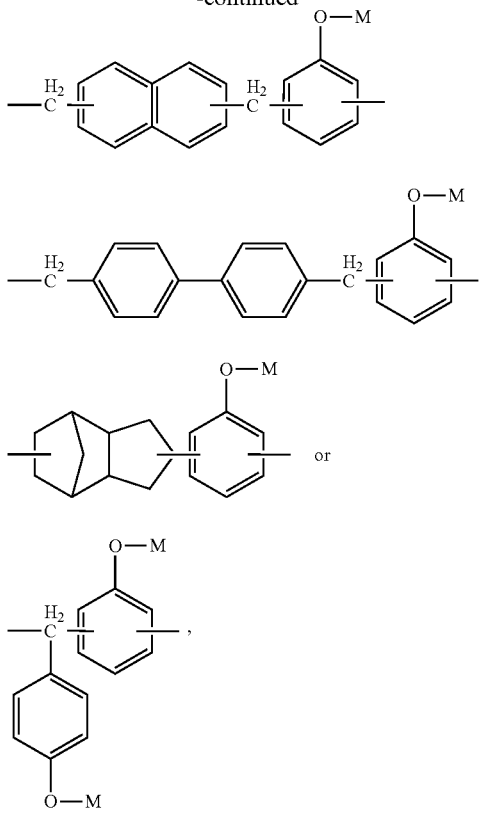

in Formula LM1, t is

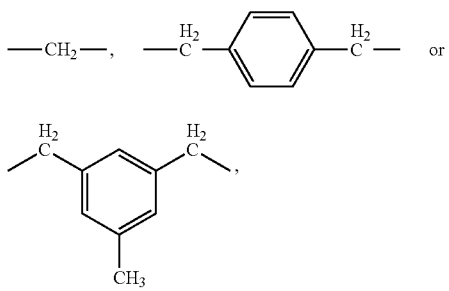

in Formulae IM1 to LM1, n is an integer equal to or greater than 1, and at least one of Ms in Formulae FM1 to LM1 above is —(CH$_2$)$_l$CHCH$_2$, where l is an integer ranging from 1 to 8, and the remainder of Ms are hydrogen.)

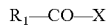            [Formula 1]

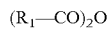            [Formula 2]

(in Formula 1, X is a halide such as Cl, Br or I, —O—SO$_2$—CH$_3$, —O—SO$_2$—CF$_3$, or —O—SO$_2$—C$_6$H$_4$—CH$_3$, and in Formulae 1 and 2, R$_1$ is an aliphatic, aromatic, or alicyclic hydrocarbon group having C1 to C20 carbon atoms, and the aliphatic hydrocarbon group is a linear or branched.)

[Intermediate (3-2(2))]

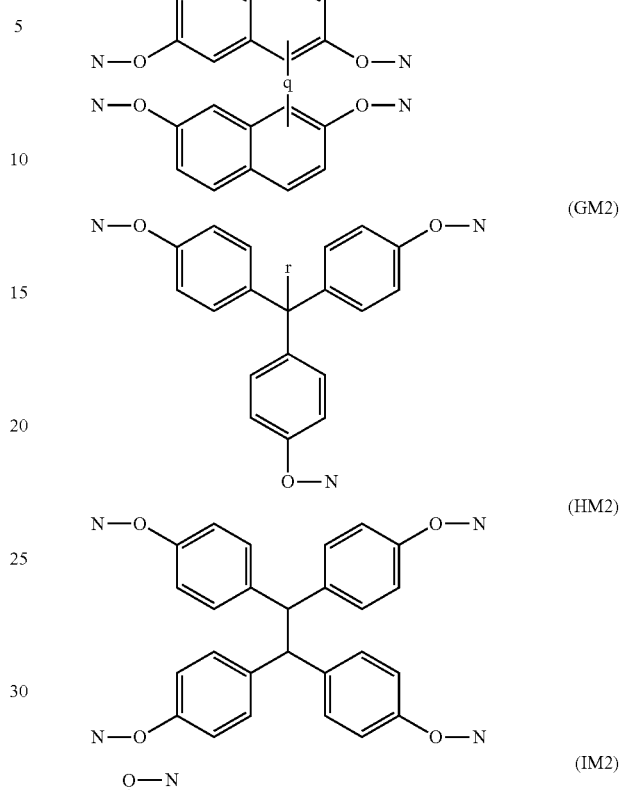

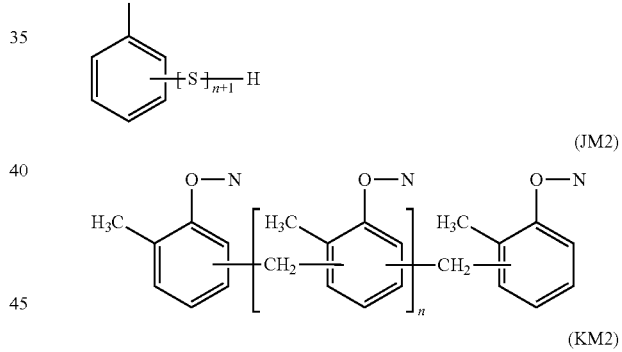

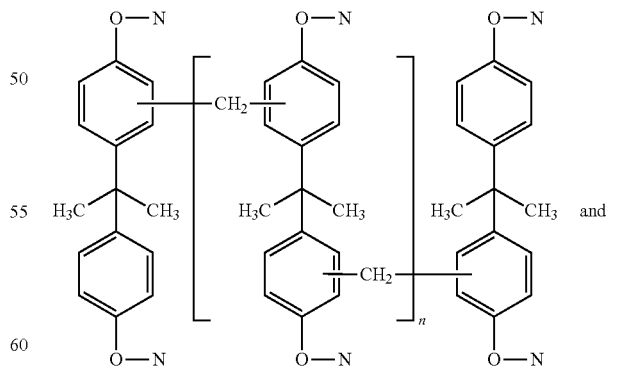

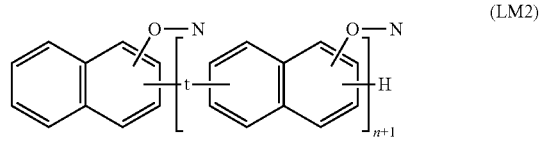

(in Formula FM2, -q- is —$CH_2$— or a direct linkage, in Formula GM2, r is hydrogen, a hydroxyl group, a C1-C10 alkyl group, or a C1-C10 aromatic group, preferably a C6-C10 aromatic group, in Formula IM2, S is

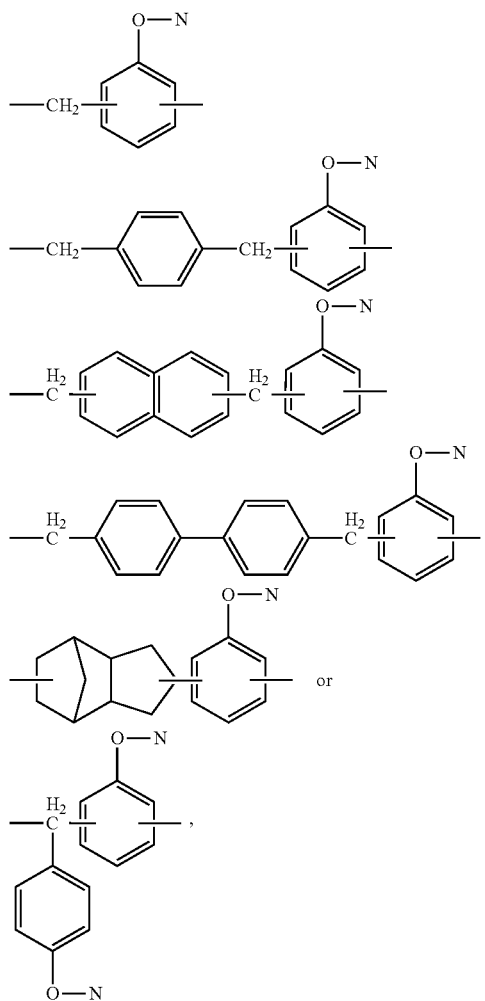

in Formula LM2, t is

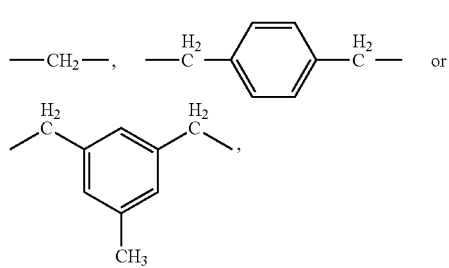

in Formulae IM2 to LM2, n is an integer equal to or greater than 1, in Formulae FM2 to LM2, at least one of a plurality of Ns is —$(CH_2)_l$CHCH$_2$, where l is an integer ranging from 1 to 8, at least one of Ms is —$COR_1$, $R_1$ is an aliphatic, aromatic, or alicyclic hydrocarbon group having C1 to C20 carbon atoms, the aliphatic hydrocarbon group is a linear or branched, and the remainder of Ns are hydrogen.)

 [Formula 3]

(in Formula 3, at least one of $R_a$ to $R_c$ is a C1-C5 alkoxy group, the remainders thereof are C1-C10 alkyl groups, and the alkoxy group and the alkyl group are a linear or branched.)

According to the present disclosure, an epoxy composition comprising a compound having an alkoxysilyl group and an active ester group selected from a group consisting of Formulae AF to LF above is provided.

The epoxy composition may include an epoxy compound, a curing agent, and a filler.

Also, an electrical and electronic material including the epoxy composition described above is provided, and the electrical and electronic material may be a substrate, a film, a laminated substrate, prepreg, a printed circuit board, or a packaging material.

Further, an adhesive and a paint including the above-described epoxy composition are provided.

DESCRIPTION OF DRAWINGS

FIGURE is a graph illustrating the difference of CTE values between Property Examples 18 and 19 including a compound of Synthesis Example 8 and Comparative Property example 2 which does not include a compound of Synthesis Example 8.

BEST MODE FOR INVENTION

1. Compound Having Alkoxysilyl Group and Active Ester Group

According to the present disclosure, a compound having an alkoxysilyl group and an active ester group is provided, the compound may exhibit improved low moisture absorption and/or low dielectric properties while it may maintain and improve low thermal expansion properties, when the compound is used for an epoxy composition.

The compound having an alkoxysilyl group and an active ester group according to the present disclosure may be represented by Formulae AF to LF as below:

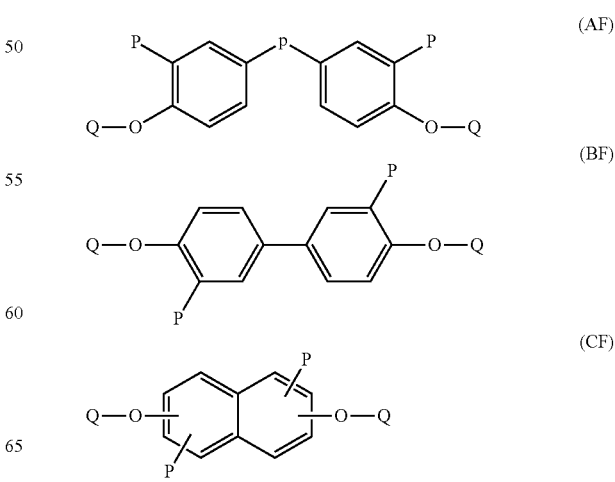

-continued
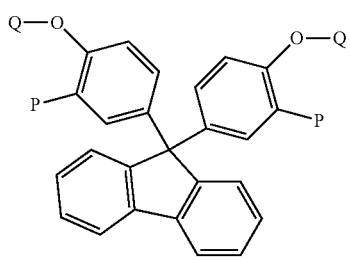
(DF)
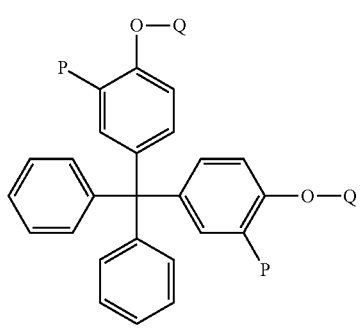
(EF)
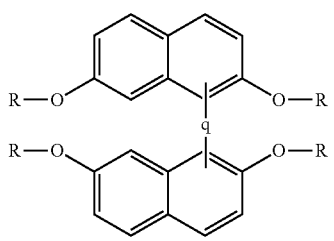
(FF)
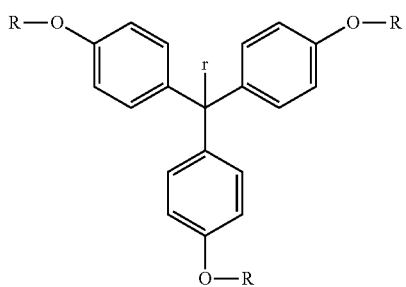
(GF)
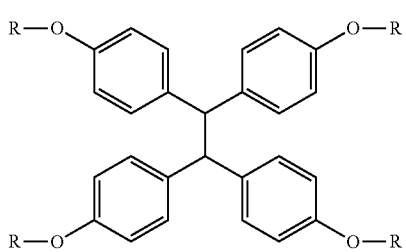
(HF)
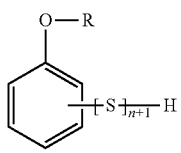
(IF)
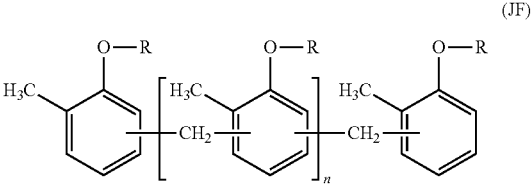
(JF)
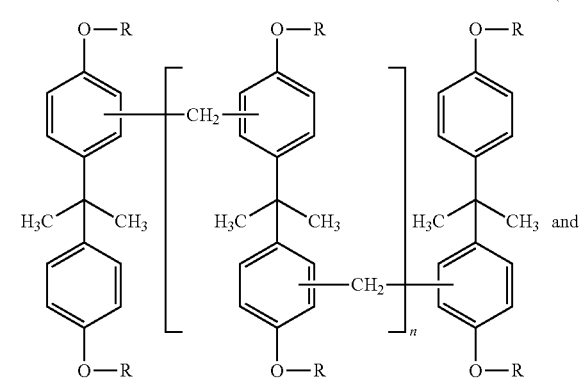
(KF)
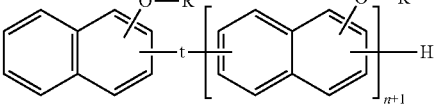
(LF)
in Formula AF, -p- is —C(CH$_3$)$_2$—, —CH$_2$—, —C(CF$_3$)$_2$—, —S—, —SO$_2$,
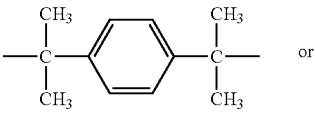 or
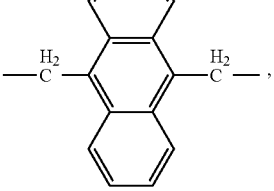,
in Formula FF, -q- is —CH$_2$— or a direct linkage,
in Formula GF, r is hydrogen, a hydroxyl group, a C1-C10 alkyl group, or a C1-C10 aromatic group, preferably a C6-C10 aromatic group,
in Formula IF, S is
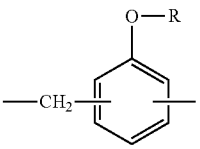
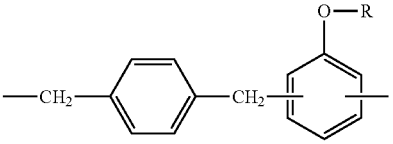

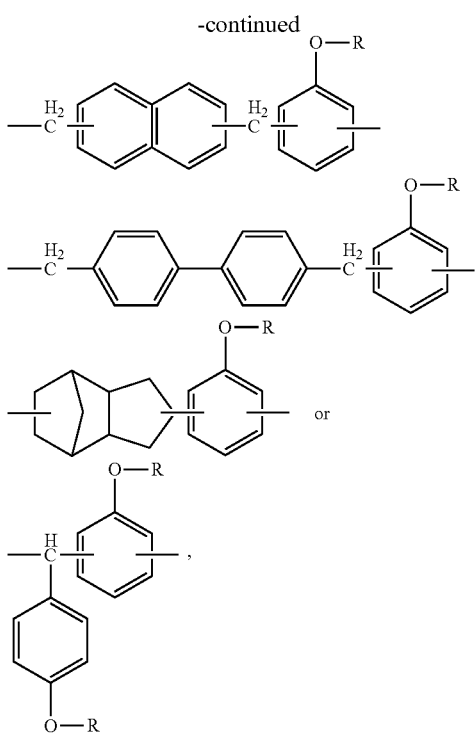

in Formula LF, t is

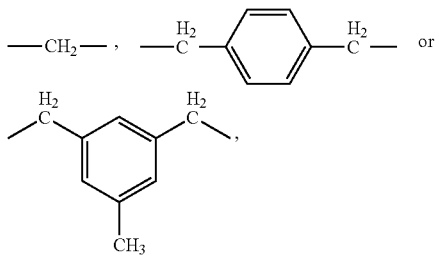

and in Formulae IF to LF, n is an integer equal to or greater than 1, preferably an integer ranging from 1 to 100.

In Formulae AF to EF, at least one of a plurality of Ps is —(CH$_2$)mSiRaRbRc, at least one of Ra, Rb, and Rc is a C1-C5 alkoxy group, the remainder may be alkyl groups having 1 to 10 carbon atoms, and the alkyl group and the alkoxy group are a linear or branched, m is an integer ranging from 3 to 10, preferably an integer ranging from 3 to 6, and the remainder of Ps are hydrogen or alkenyl of —(CH$_2$)$_l$CHCH$_2$, where l is an integer ranging from 1 to 8, preferably an integer ranging from 1 to 4.

In Formulae AF to EF, at least one of a plurality of Qs is —COR$_1$, where R$_1$ may be an aliphatic, alicyclic, or aromatic hydrocarbon group of C1 to C20, and the aliphatic hydrocarbon group may be a linear or branched, preferably a linear or branched alkyl group of C1 to C10, a substituted or unsubstituted alicyclic hydrocarbon group of C5 to C20, or a substituted or unsubstituted aromatic hydrocarbon group of C5 to C20, that is, substituted or unsubstituted phenyl or naphthalene, for example. When the alicyclic or aromatic hydrocarbon group is substituted, the alicyclic or aromatic hydrocarbon group may be substituted with an alkyl group of C1 to C10. The remainder of the plurality of Qs may be hydrogen.

In Formulae FF to LF, at least one of a plurality of Rs is —(CH$_2$)mSiRaRbRc or —CONH(CH$_2$)mSiRaRbRc, where at least one of Ra, Rb, and Rc may be a C1-C5 alkoxy group, and the remainder may be alkyl groups having 1 to 10 carbon atoms, the alkyl group and the alkoxy group may be a linear or branched, m may be an integer ranging from 3 to 10, preferably an integer ranging from 3 to 6, at least one of a plurality of Rs may be —COR$_1$, and R$_1$ may be as defined above. The remainder of the plurality of Rs may be hydrogen or alkenyl of —(CH$_2$)$_l$CHCH$_2$ independently, where l is an integer ranging from 1 to 8, preferably an integer ranging from 1 to 4.

Also, each of the Ra, Rb, and Rc may be an alkoxy group having 1 to 6 carbon atoms.

The Formulae AF to LF above having at least one alkoxysilyl group, —(CH$_2$)mSiRaRbRc or —CONH(CH$_2$)mSiRaRbRc, and at least one active ester group, —COR$_1$, does not exhibit the decrease of low thermal expansion properties even though the formulae exhibits improved low moisture absorption and/or low dielectric properties. Meanwhile, depending on desired low moisture absorption and/or low dielectric properties and low thermal expansion properties, the number of an alkoxysilyl groups and of an active ester group of the compound of Formulae AF to LF above may be adjusted. As an example, the compound of Formulae AF to FF and HF above may have 1 or 2 alkoxysilyl groups and 1 or 2 active ester groups. The compound of GF may also have one alkoxysilyl group and one active ester group, one alkoxysilyl group and two active ester groups, or two alkoxysilyl groups and one active ester group. The compound of IF to LF may have a plurality of alkoxysilyl groups and a plurality of active ester groups depending on the number of a repeating unit n. For example, the compound may have 1 to 5 alkoxysilyl groups and 1 to 5 active ester groups.

2. Method for Preparing Compound Having Alkoxysilyl Group and Active Ester Group According to the present disclosure, a method for preparing the compound having an alkoxysilyl group and an active ester group of the present disclosure is provided. Specifically, the compound of Formulae AF to EF above may be prepared by a method of (preparation method 1) below, and the compound of Formulae FF to LF may be prepared by a method of (preparation method 2) or of (preparation method 3) below.

(1) Preparation Method 1

The compound of Formulae AF to EF may be prepared via esterification of a starting material (1-1) (1-1 step) and alkoxysilylation (1-2 step).

In the esterification, a 1-1 step, a hydroxyl group of the starting material (1-1) may be esterified by a reaction between the starting material (1-1) and an acyl compound of Formulae 1 or an acid anhydride of Formula 2 below, thereby giving an intermediate (1-2).

The starting material (1-1) may be a compound represented by Formulae AS to ES below:

[Starting Material (1-1)]

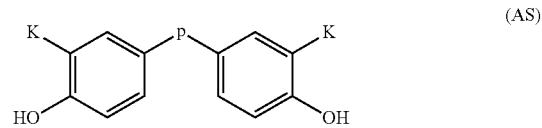

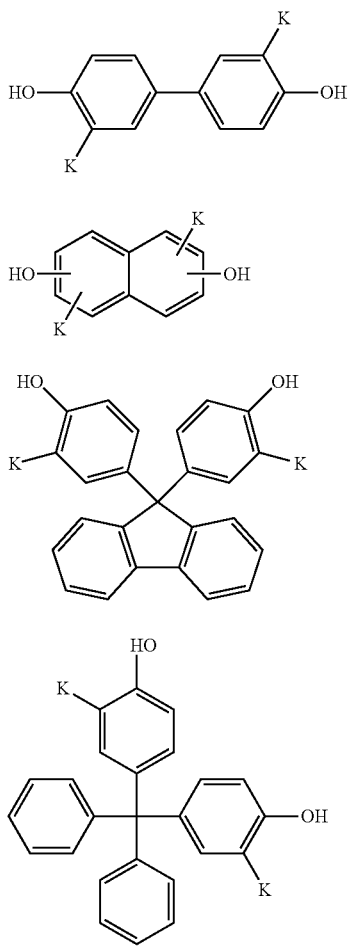

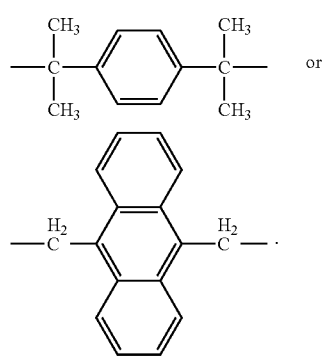

In Formulae AS to ES, at least one of Ks is —(CH$_2$)$_l$CHCH$_2$, where l is an integer ranging from 1 to 8, preferably an integer ranging from 1 to 4, and the remainders thereof are hydrogen, in Formula As, -p- is —C(CH$_3$)$_2$—, —CH$_2$—, —C(CF$_3$)$_2$—, —S—, —SO$_2$—, R$_1$—CO—X [Formula 1]

(R$_1$—CO)$_2$O [Formula 2]

In Formula 1, X is a halide such as Cl, Br or I, —O—SO$_2$—CH$_3$, —O—SO$_2$—CF$_3$, or —O—SO$_2$—C$_6$H$_4$—CH$_3$.

In Formulae 1 and 2, R$_1$ may be an aliphatic, alicyclic, or aromatic hydrocarbon group of C1 to C20, the aliphatic hydrocarbon group may be a linear or branched, preferably a linear or branched alkyl group of C1 to C10, a substituted or unsubstituted alicyclic hydrocarbon group of C5 to C20, or a substituted or unsubstituted aromatic hydrocarbon group of C5 to C20, that is, substituted or unsubstituted phenyl or naphthalene, for example. When the alicyclic or aromatic hydrocarbon group is substituted, the alicyclic or aromatic hydrocarbon group may be substituted with an alkyl group of C1 to C10.

The intermediate (1-2) may be a compound represented by Formulae AM to EM below:

[Intermediate (1-2)]

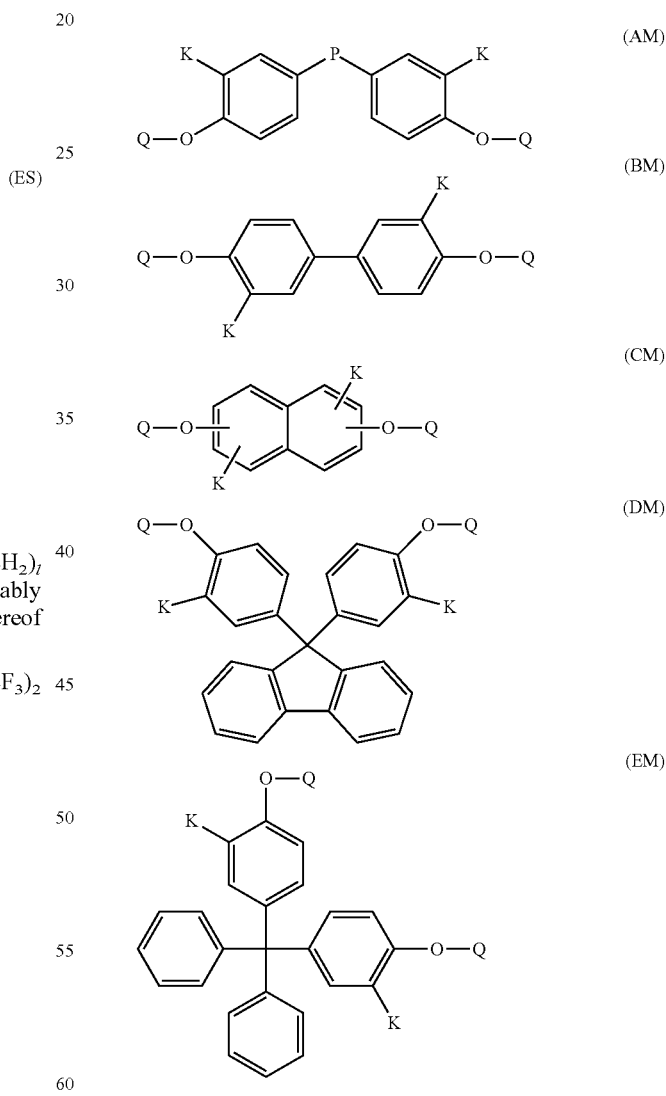

In Formulae AM to EM, at least one of Ks may be —(CH$_2$)$_l$CHCH$_2$, where l is an integer ranging from 1 to 8, preferably an integer ranging from 1 to 4, and the remainder may be hydrogen. Also, at least one of Qs may be —COR$_1$, R$_1$ may be as defined above, and the remainder may be hydrogen.

In Formulae AM, -p- is —C(CH$_3$)$_2$—, —CH$_2$—, —C(CF$_3$)$_2$—, —S—, —SO$_2$—,

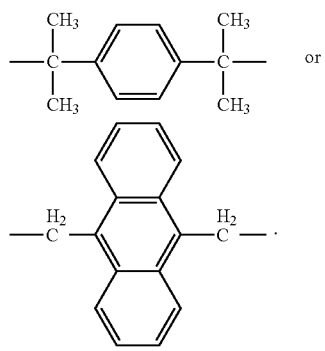

The reactant may react in accordance with stoichiometric ratio, and thus, the starting material (1-1) may react with an acyl compound or an acid anhydride with controlled equivalent ratio, thereby the desired intermediate (1-2) is obtained. For example, for the reaction between the starting material (1-1) and an acyl compound or an acid anhydride, 0.01 to 1 equivalent of an acyl group or a carbonyl group of an acid anhydride may react with 1 equivalent of a hydroxyl group of the starting material (1-1), thereby obtaining the intermediate (1-2).

The reaction of the esterification may be performed in the presence of a base and an optional solvent. As an example of a usable base, although not limited thereto, K$_2$CO$_3$, Na$_2$CO$_3$, KHCO$_3$, NaHCO$_3$, NaH, pyridine, triethylamine, and diisopropylethylamine may be used. Only one of the bases may be used, or a mixture including two or more of the bases may be used. It may be preferable to use 0.1 to 5 equivalents of a base with respect to 1 equivalent of a hydroxyl group of the starting material (1-1) in terms of reaction efficiency.

The solvent may be used as occasion demands if desired. The solvent may not be used if viscosity of the reactants at the reaction temperature is appropriate for carrying out the reaction without using a separate solvent. That is, a separate solvent may not be necessary in the case in which viscosity of the reactants is sufficiently low to easily perform the mixing and stirring of the reactants, which may be easily decided by a person skilled in the art. In the case in which a solvent is used, any organic solvents that may properly dissolve the reactants, may not adversely affect the reaction, and may be easily removed may be used. For example, although not limited thereto, acetonitrile, tetrahydrofuran (THF), methyl ethyl ketone (MEK), dimethyl formamide (DMF), dimethyl sulfoxide (DMSO), methylene chloride (MC), toluene, or the like, may be used. Only one of the solvents may be used, or a mixture including two or more of the solvents may be used. The amount of the solvent may not be limited to any specific range, and an appropriate amount and/or concentration of the solvent may be used within a range in which the reactants may be sufficiently dissolved and does not adversely affect the reaction. A person skilled in the art may select an appropriate amount and/or concentration of the solvent in consideration of the above-mentioned points.

A reaction temperature and a reaction time of the esterification may be varied depending on a type of a reactant. For example, the above-mentioned reaction may be completed by carrying out the reaction at −20° C. to 100° C. for 1 to 120 hours. It may be preferable to carry out the reaction at the aforementioned temperature and for the aforementioned time range in terms of reaction efficiency.

In the alkoxysilylation, a 1-2 step, a compound having an alkoxysilyl group and an active ester group according to the present disclosure, a compound represented by Formulae AF to EF above, may be obtained by a reaction between the esterified intermediate (1-2) and an alkoxysilane.

In the alkoxysilylation, in the reaction between the intermediate (1-2) and an alkoxysilane of Formula 3 below, an alkenyl group of the intermediate (1-2) may react with an alkoxysilane in accordance with a stoichiometric ratio. Thus, in consideration thereof, in the reaction between the intermediate (1-2) and an alkoxysilane of Formula 3 below, 0.1 to 5 equivalents of an alkoxysilane of Formula 3 below may react with 1 equivalent of an alkenyl group of the intermediate (1-2).

$$HSiR_aR_bR_c \qquad \text{[Formula 3]}$$

In Formula 3, at least one of $R_a$ to $R_c$ may be a C1-C5 alkoxy group, the remainder may be C1-C10 alkyl groups, and the alkyl group and the alkoxy group are a linear or branched.

A reaction temperature and a reaction time of the 1-2 step may be varied depending on a type of a reactant. For example, the above-mentioned reaction may be carried out at −20° C. to 120° C. for 1 to 72 hours, thereby obtaining a compound having an alkoxysilyl group and an active ester group. It may be preferable to carry out the reaction at the aforementioned temperature and for the aforementioned time range in terms of reaction efficiency.

The alkoxysilylation may be performed in the presence of a platinum catalyst. As a platinum catalyst used in the alkoxysilylation, although not limited thereto, a platinum catalyst of PtO$_2$ or H$_2$PtCl$_6$ (chloroplatinic acid) may be used, for example. It may be preferable to use $1 \times 10^{-4}$ to $1 \times 10^{-2}$ equivalents of the platinum catalyst with respect to 1 equivalent of an alkenyl group of the intermediate (1-2).

The solvent may be used in the alkoxysilylation as occasion demands, if desired. For example, in the reaction of the alkoxysilylation, the solvent may not be used if viscosity of the reactants at the reaction temperature is appropriate for carrying out the reaction without using a separate solvent. That is, a separate solvent may not be necessary in the case in which viscosity of the reactants is sufficiently low to easily perform the mixing and stirring of the reactants, which may be easily decided by a person skilled in the art. In the case in which a solvent is used, any aprotic solvents that may properly dissolve the reactants, may not adversely affect the reaction, and may be easily removed may be used. For example, although not limited thereto, toluene, acetonitrile, tetrahydrofuran (THF), methyl ethyl ketone (MEK), dimethyl formamide (DMF), dimethyl sulfoxide (DMSO), methylene chloride (MC), or the like, may be used. Only one of the solvents may be used, or a mixture including two or more of the solvents may be used. The amount of the solvent may not be limited to any specific range, and an appropriate amount and/or concentration of the solvent may be used within a range in which the reactants may be sufficiently dissolved and does not adversely affect the reaction. A person skilled in the art may select an appropriate amount and/or concentration of the solvent in consideration of the above-mentioned points.

(Preparation Method 2)

The compound of Formulae FF to LF above may be prepared by (preparation method 2) including esterification step (2-1 step) and alkoxysilylation step (2-2 step).

In the esterification, 2-1 step, a starting material (2-1) may react with an acyl compound of Formulae 1 above or an acid anhydride of Formula 2 above, thereby obtaining an intermediate (2-2) formed by esterification of a hydroxyl group of the starting material (2-1).

The starting material (2-1) may be represented by Formulae FS to LS below:

[Starting Material (2-1)]

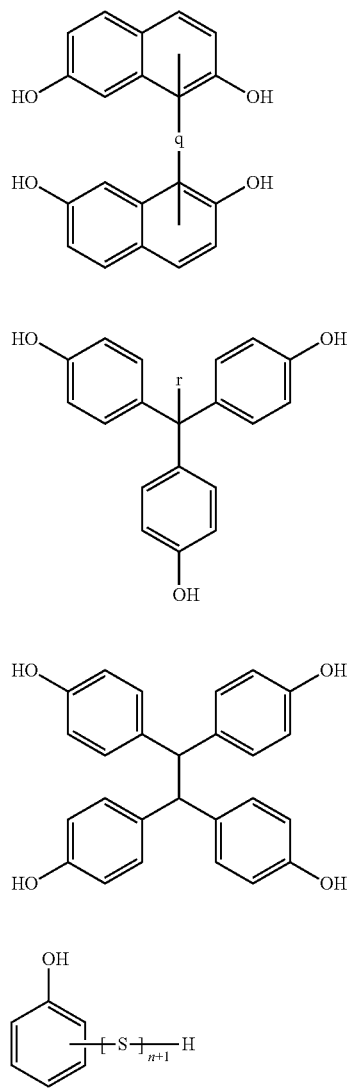

(FS)

(GS)

(HS)

(IS)

(JS)

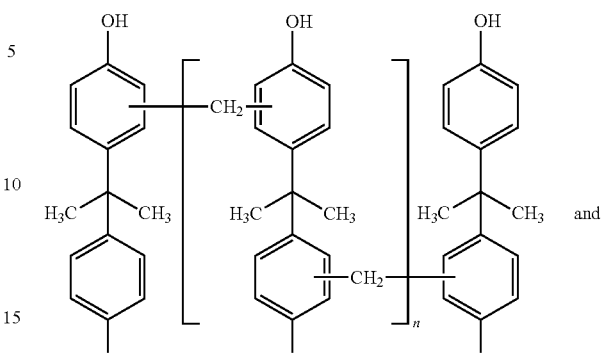

(KS)

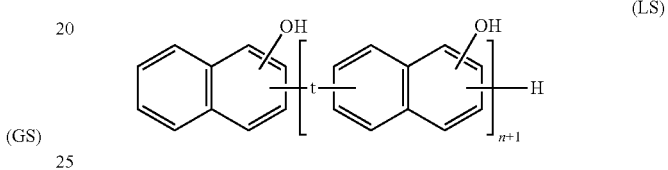

(LS)

in Formula FS, -q- may be —CH$_2$— or a direct linkage, in Formula GS, r is hydrogen, a hydroxyl group, a C1-C10 alkyl group, or a C1-C10 aromatic group, preferably a C6-C10 aromatic group, in Formula IS, S is

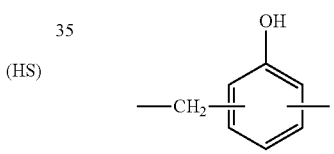

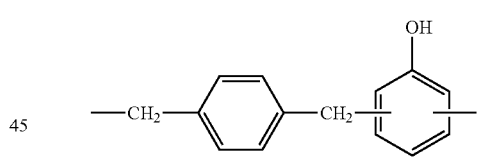

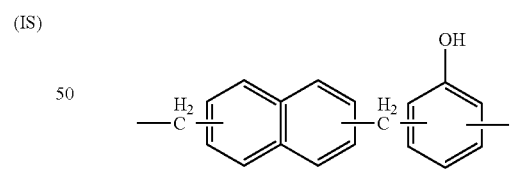

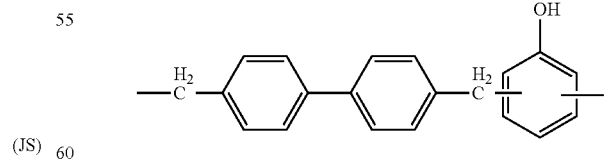

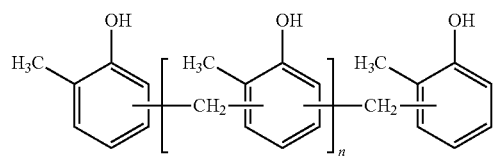

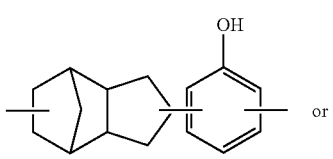 or

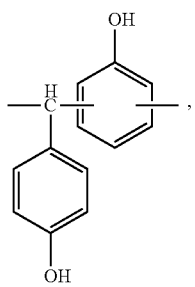

in Formula LS, t is

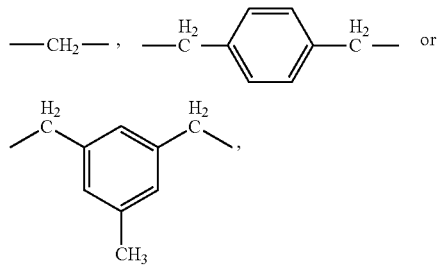

and in Formulae IS to LS, n is an integer equal to or greater than 1, preferably an integer ranging from 1 to 100.

Other than using the starting material (2-1) as a starting material, the esterification of the 2-1 step, may be the same as the esterification of the 1-1 step, of the (preparation method 1) described above.

The intermediate (2-2) may be represented by Formulae FM to LM below:

[Intermediate (2-2)]

(FM)

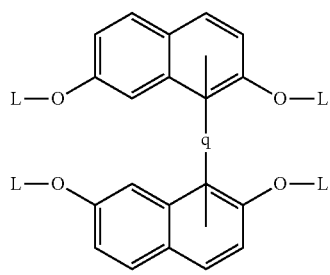

(GM)

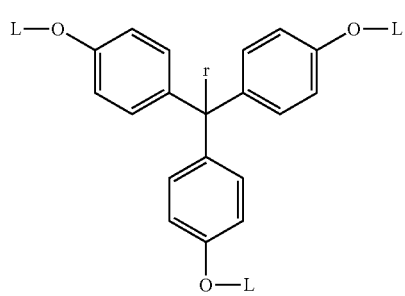

(HM)

(IM)

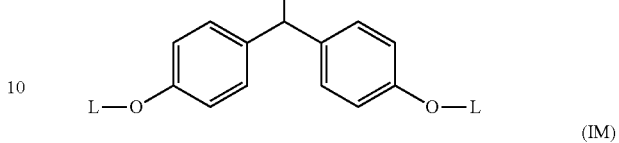

(JM)

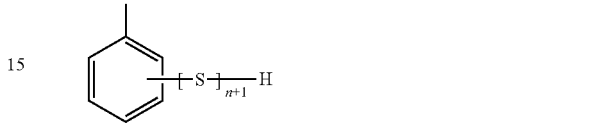

(KM)

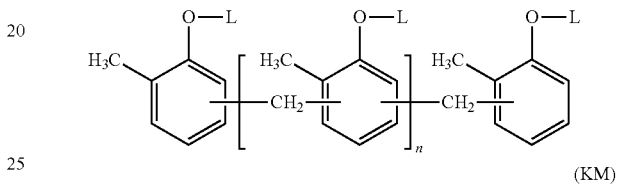

and (LM)

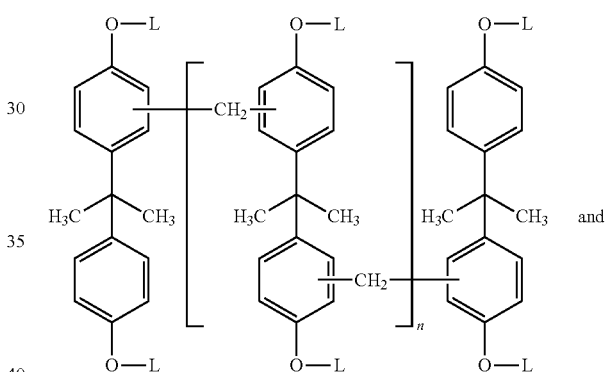

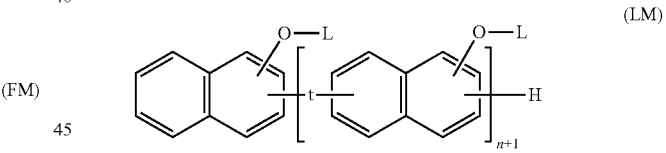

in Formula FM, -q- is —CH$_2$— or a direct linkage, in Formula GM, r is hydrogen, a hydroxyl group, a C1-C10 alkyl group, or a C1-C10 aromatic group, preferably a C6-C10 aromatic group, in Formula IM, S is

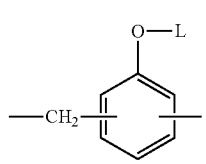

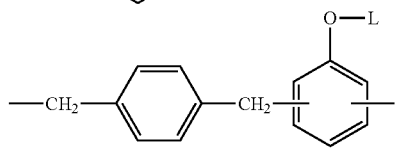

-continued

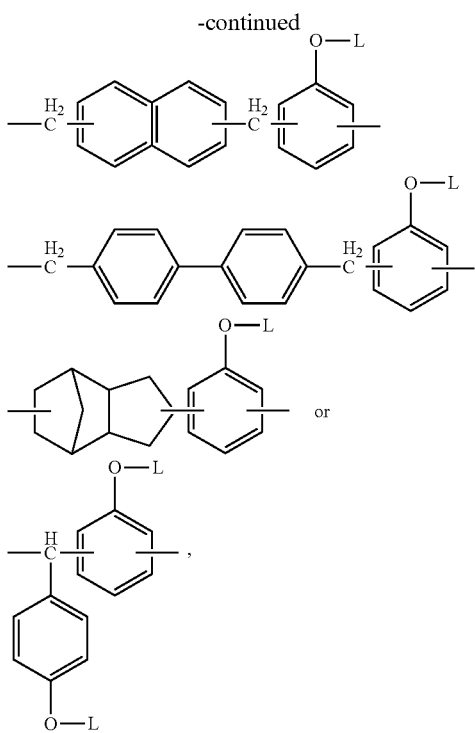

in Formula LM, t is

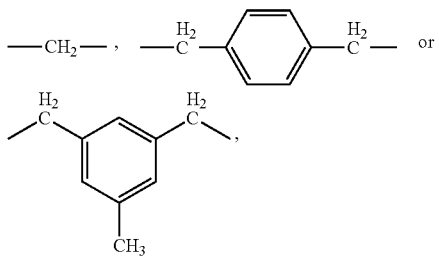

and in Formulae IM to LM, n is an integer equal to or greater than 1, preferably an integer ranging from 1 to 100.

In Formulae FM to LM, at least one of Ls may be —COR$_1$, where R$_1$ may be as defined above, and the remainder of Ls may be hydrogen.

In the alkoxysilylation, 2-2 step, by a reaction between the intermediate (2-2) and an isocyanate-based silane coupling agent of Formula 4 below, a compound having an alkoxysilyl group and an active ester group of the present disclosure, a compound represented by Formulae FF to IF above may be obtained, wherein at least one of a plurality of Rs may be —CONH(CH$_2$)$_m$SiRaRbRc (where m, Ra, Rb, and Rc are as defined above), at least one of the plurality of Rs may be —COR$_1$, where R$_1$ is as defined above, and the remainder of the plurality of Rs may be hydrogen.

OCN—(CH$_2$)$_m$-SiRaRbRc   [Formula 4]

In Formula 4, at least one of Ra to Rc may be a C1-C5 alkoxy group, the remainder may be C1-C10 alkyl groups, the alkoxy group and the alkyl group are a linear or branched, and m is an integer ranging from 3 to 10, preferably an integer ranging from 3 to 6.

In the alkoxysilylation, the intermediate (2-2) may react with an isocyanate-based alkoxysilane of Formula 4 above in accordance with a stoichiometric ratio. Thus, in consideration thereof, for example, 0.01 to 1 of equivalents of an isocyanate-based alkoxysilane of Formula 4 may react with 1 equivalent of a hydroxyl group of the intermediate (2-2). The reaction of the alkoxysilylation may be performed at −20° C. to 120° C. for 1 to 72 hours. It may be preferable to carry out the reaction at the aforementioned temperature and for the aforementioned time range in terms of reaction efficiency.

The reaction of the alkoxysilylation may be performed in the presence of a base if desired. The reaction may be performed without using a base, but in this case, a reaction speed may be somewhat slow, and when a base is used, a reaction rate may increase. As an example of a usable base, although not limited thereto, K$_2$CO$_3$, Na$_2$CO$_3$, KHCO$_3$, NaHCO$_3$, pyridine, triethylamine, and diisopropylethylamine, or the like, may be used, for example. Only one of the above-mentioned bases may be used, or two or more bases may be used together. When a base is used, it may be preferable to use 0.1 to 5 equivalents of a base with respect to 1 equivalent of a hydroxyl group of the intermediate (2-2) in terms of reaction efficiency.

In the reaction of the alkoxysilylation, a solvent may be used as occasion demands if desired. For example, in the reaction of the alkoxysilylation, the solvent may not be used if viscosity of the reactants at the reaction temperature is appropriate for carrying out the reaction without using a separate solvent. That is, a separate solvent may not be necessary in the case in which viscosity of the reactants is sufficiently low to easily perform the mixing and stirring of the reactants, which may be easily decided by a person skilled in the art. In the case in which a solvent is used, any aprotic solvents that may properly dissolve the reactants, may not adversely affect the reaction, and may be easily removed may be used. For example, although not limited thereto, toluene, acetonitrile, tetrahydrofuran (THF), methyl ethyl ketone (MEK), dimethyl formamide (DMF), dimethyl sulfoxide (DMSO), methylene chloride (MC), or the like, may be used. Only one of the solvents may be used, or two or more of the solvents may be used together. The amount of the solvent may not be limited to any specific range, and an appropriate amount of the solvent may be used within a range in which the reactants may be sufficiently dissolved and does not adversely affect the reaction. A person skilled in the art may select an appropriate amount of the solvent in consideration of the above-mentioned points.

(Preparation Method 3)

The compound of Formulae FF to LF above may be prepared by (preparation method 3) including an alkenylation step (3-1 step) of a starting material (3-1), an esterification step (3-2 step), and an alkoxysilylation step (3-3 step).

The reaction of the alkenylation, 3-1 step of a starting material (3-1) may be carried out by reacting the starting material (3-1) with an alkenyl compound of Formula 5 below. The starting material (3-1) may react with an alkenyl compound of Formula 5 below in accordance with a stoichiometric ratio. Thus, in consideration thereof, for example, 0.01 to less than 1 equivalent of an alkenyl group of the alkenyl compound may react with 1 equivalent of a hydroxyl group of the starting material (3-1).

The starting material (3-1) may be the same as the starting material (2-1), and may be a compound represented by Formulae FS to IS above.

X—(CH$_2$)$_l$—CH═CH$_2$   [Formula 5]

in Formula 5, l is an integer ranging from 1 to 8, preferably an integer ranging from 1 to 4, X is a halide such as Cl, Br or I, —O—SO$_2$—CH$_3$, —O—SO$_2$—CF$_3$, or —O—SO$_2$—C$_6$H$_4$—CH$_3$.

A reaction temperature and a reaction time of the alkenylation step may be varied depending on a type of a reactant. For example, the reaction may be carried out at −20° C. to 100° C. for 1 to 120 hours, thereby obtaining an intermediate (3-2(1)). The intermediate (3-2(1)) may be represented by Formulae FM1 to LM1 below:

[Intermediate (3-2(1))]

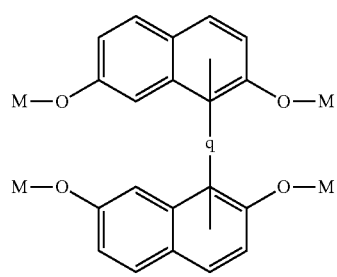 (FM1)

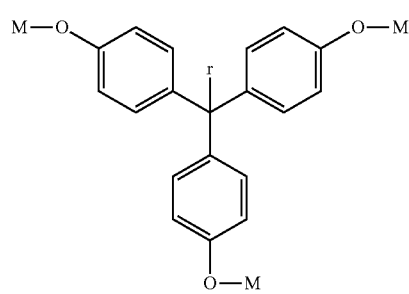 (GM1)

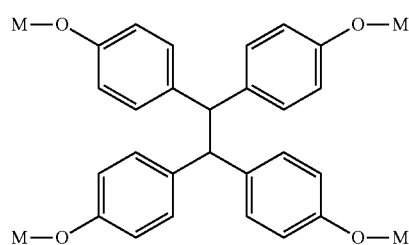 (HM1)

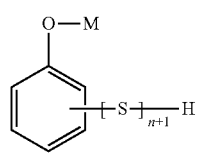 (IM1)

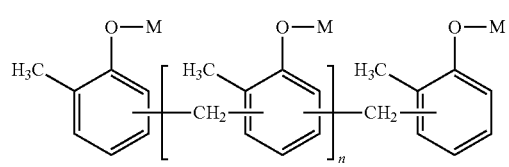 (JM1)

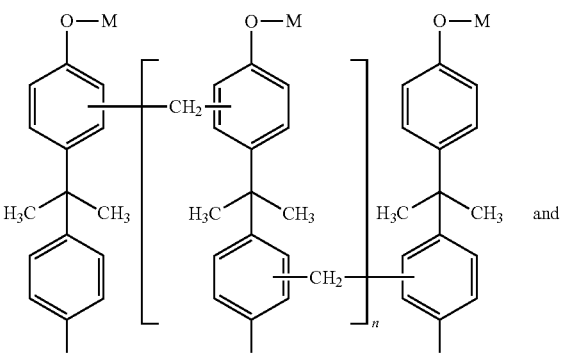 (KM1)

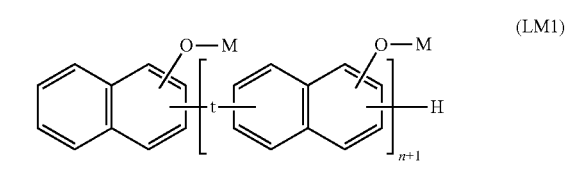 (LM1)

in Formula FM1, -q- may be —CH$_2$— or a direct linkage, in Formula GM1, r is hydrogen, a hydroxyl group, a C1-C10 alkyl group, or a C1-C10 aromatic group, preferably a C6-C10 aromatic group, in Formula IM1, S is

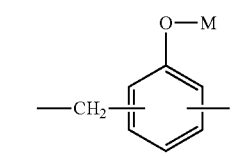

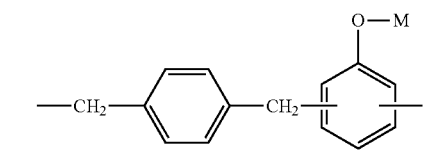

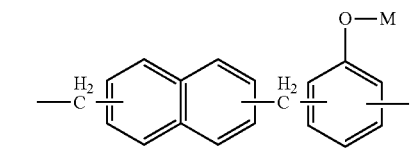

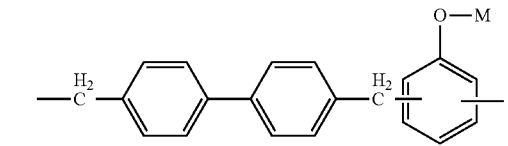

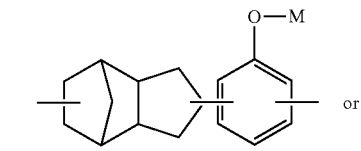 or

-continued

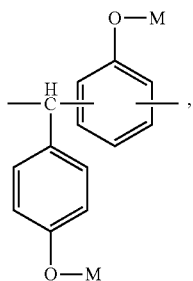

in Formula LM1, t is

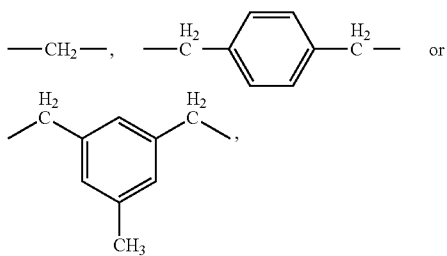

and in Formulae IM1 to LM1, n is an integer equal to or greater than 1, preferably an integer ranging from 1 to 100.

At least one of Ms in Formulae FM1 to LM1 above may be —$(CH_2)_l$CHCH$_2$, where l may be an integer ranging from 1 to 8, preferably an integer ranging from 1 to 4, and the remainder M may be hydrogen.

The alkenylation may be performed in the presence of a base and an optional solvent. As an example of a usable base, although not limited thereto, KOH, NaOH, $K_2CO_3$, $Na_2CO_3$, $KHCO_3$, $NaHCO_3$, NaH, triethylamine, diisopropylethylamine, or the like, may be used, for example. Only one of the above-mentioned bases may be used, or two or more bases may be used together. It may be preferable to use 0.1 to 5 equivalents of a base with respect to 1 equivalent of a hydroxyl group of the starting material (3-1) in terms of reaction efficiency.

In the reaction of the alkenylation, the solvent may be used as occasion demands if desired. For example, in the reaction of the alkenylation, the solvent may not be used if viscosity of the reactants at the reaction temperature is appropriate for carrying out the reaction without using a separate solvent. That is, a separate solvent may not be necessary in the case in which viscosity of the reactants is sufficiently low to easily perform the mixing and stirring of the reactants, which may be easily decided by a person skilled in the art. In the case in which a solvent is used, any organic solvents that may properly dissolve the reactants, may not adversely affect the reaction, and may be easily removed may be used. For example, although not limited thereto, acetonitrile, tetrahydrofuran (THF), methyl ethyl ketone (MEK), dimethyl formamide (DMF), dimethyl sulfoxide (DMSO), methylene chloride (MC), $H_2O$, alcohol type solvents, toluene, or the like, may be used. Only one of the solvents may be used, or two or more of the solvents may be used together. The amount of the solvent may not be limited to any specific range, and an appropriate amount and/or concentration of the solvent may be used within a range in which the reactants may be sufficiently dissolved and does not adversely affect the reaction. A person skilled in the art may select an appropriate amount and/or concentration of the solvent in consideration of the above-mentioned points.

The esterification of the 3-2 step and the silylation of the 3-3 step may be the same as the esterification of the 1-1 step and the silylation of the 1-2 step, respectively.

Specifically, in the esterification, the 3-2 step, the intermediate (3-2 (1)) may be esterified by a reaction between the intermediate (3-2 (1)) obtained in the 3-1 step with an acyl compound of Formula 1 above or an acid anhydride of Formula 2, thereby obtaining an intermediate (3-2 (2)). The 3-2 step may be the same as the reaction of the esterification of the 1-1 step except the reaction between the intermediate (3-2 (1)) and an acyl compound of Formula 1 above or an acid anhydride of Formula 2. The intermediate (3-2(2)) obtained in the 3-2 step may be a compound represented by Formulae FM2 to LM2 below:

[Intermediate (3-2(2))]

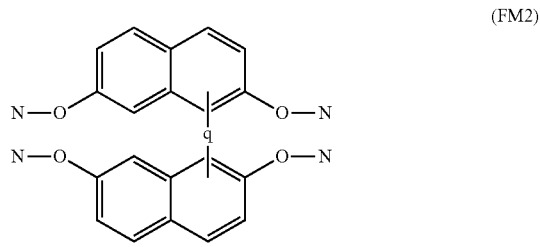

(FM2)

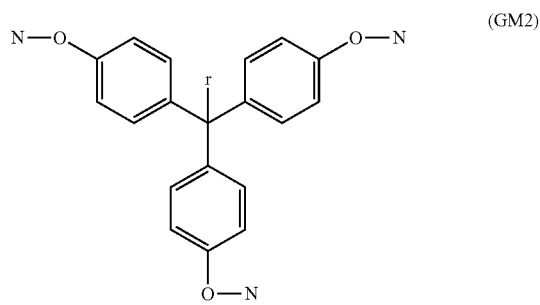

(GM2)

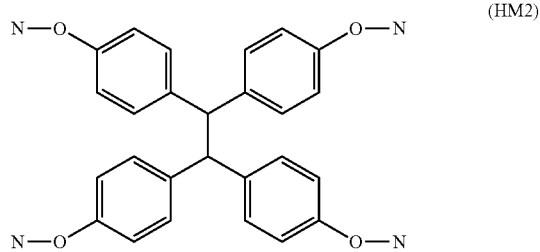

(HM2)

(IM2)

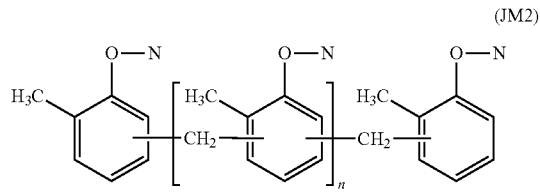

(JM2)

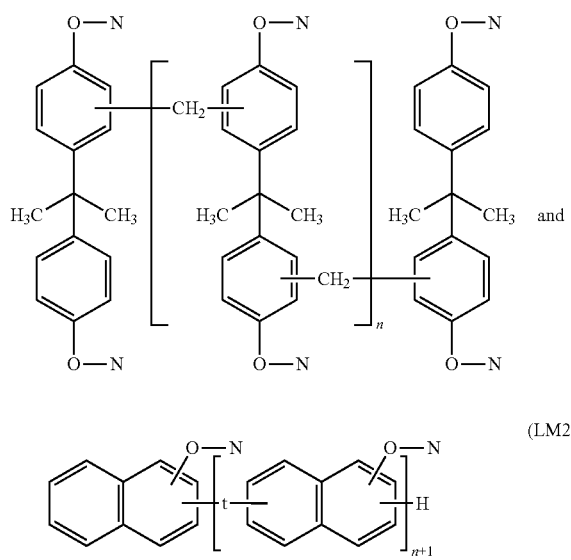
(KM2)

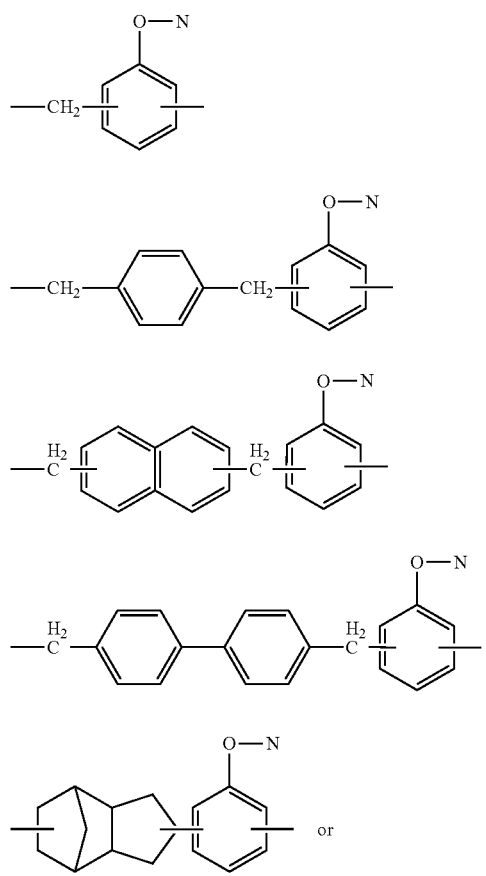
(LM2)

in Formula FM2, -q- may be —CH$_2$— or a direct linkage, in Formula GM2, r is hydrogen, a hydroxyl group, a C1-C10 alkyl group, or a C1-C10 aromatic group, preferably a C6-C10 aromatic group, in Formula IM2, S is

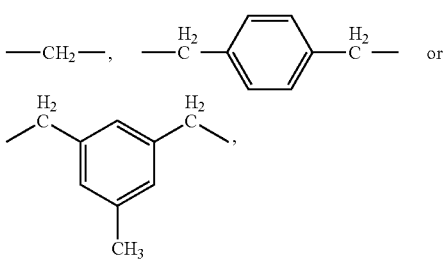

in Formula LM2, t is

—CH$_2$—, $-\underset{H_2}{C}-\phantom{x}-\underset{H_2}{C}-$ or $-\underset{H_2}{C}-\phantom{x}-\underset{H_2}{C}-$ , CH$_3$ and in Formulae IM2 to LM2, n is an integer equal to or greater than 1, preferably an integer ranging from 1 to 100.

At least one of Ns in Formulae FM2 to LM2 above may be —(CH$_2$)$_l$CHCH$_2$, where l may be an integer ranging from 1 to 8, preferably an integer ranging from 1 to 4, at least one of Ns may be —COR$_1$, where R$_1$ may be as defined above, and the remainder of Ns may be hydrogen.

The alkoxysilylation, the 3-3 step, may be the same as the alkoxysilylation of the 1-2 step, except the reaction between the intermediate (3-2(2)) and an alkoxysilane of Formula 3 above. By the reaction of the alkoxysilylation in the 3-3 step, a compound having an alkoxysilyl group and an active ester group of the present disclosure, a compound represented by Formulae FF to IF above may be obtained, wherein at least one of a plurality of Rs may be —(CH$_2$)$_m$SiRaRbRc (where m, Ra, Rb, and Rc are as defined above), at least one of the plurality of Rs may be —CO—R$_1$, where R$_1$ is as defined above, and the remainder of the plurality of Rs may be hydrogen or alkenyl groups of —(CH$_2$)$_l$CHCH$_2$ (where l is as defined as above).

3. Composition Comprising Compound Having Alkoxysilyl Group and Active Ester Group According to the present disclosure, composition comprising the compound having an alkoxysilyl group and an active ester group may be provided. The compound having an alkoxysilyl group and an active ester group may be formulated to improve properties of an epoxy composition, low moisture absorption and/or low dielectric properties, and the compound may be formulated with any epoxy composition well-known in the field of art. The epoxy composition where the compound having an alkoxysilyl group and an active ester group of the present disclosure is able to be formulated is not limited to any particular epoxy composition.

For example, the compound having an alkoxysilyl group and an active ester group may be used as an additive to an epoxy composition comprising an epoxy compound, a curing agent and a filler.

In the epoxy composition comprising the compound having an alkoxysilyl group and an active ester group, the epoxy compound may be any epoxy compound generally known in the field of art. As an example of the epoxy compound, although not limited thereto, at least one type of epoxy compound selected from a group consisting of a glycidylether-based epoxy compound, a glycidyl-based epoxy compound, a glycidylamine-based epoxy compound, and a glycidylester-based epoxy compound may be used. Also, for example, the epoxy compound may be at least one type of epoxy compound selected from a group consisting of a bisphenol-based epoxy compound, a biphenyl-based epoxy compound, a naphthalene-based epoxy compound, a benzene-based epoxy compound, a thiodiphenol-based epoxy compound, a fluorene-based epoxy compound, an anthracene-based epoxy compound, an isocyanurate-based epoxy compound, a triphenylmethane-based epoxy compound, a 1,1,2,2-tetraphenylethane-based epoxy compound, a tetraphenylmethane-based epoxy compound, a 4,4'-diaminodiphenylmethane-based epoxy compound, an aminophenol-based epoxy compound, an alicyclic-based epoxy compound, an aliphatic-based epoxy compound, and a novolac-based epoxy compound. The epoxy compound may have at least one alkoxysilyl group or may not have an alkoxysilyl group. Further, the epoxy compound having at least one alkoxysilyl group may have a core structure of an epoxy compound selected from a group consisting of a bisphenol-based epoxy compound, a biphenyl-based epoxy compound, a naphthalene-based epoxy compound, a benzene-based epoxy compound, a thiodiphenol-based epoxy compound, a fluorene-based epoxy compound, an anthracene-based epoxy compound, an isocyanurate-based epoxy compound, a triphenylmethane-based epoxy compound, a 1,1,2,2-tetraphenylethane-based epoxy compound, tetraphenylmethane-based, a 4,4'-diaminodiphenylmethane-based epoxy compound, an aminophenol-based epoxy compound, an alicyclic-based epoxy compound, an aliphatic-based epoxy compound, and a novolac-based epoxy compound. Specifically, the epoxy compound having at least one alkoxysilyl group may be disclosed in Korean patent applications of No. 2012-0093320, No. 2013-0027308, No. 2013-0035546, No. 2013-0078347, No. 2013-0111473, No. 2014-0021884, and/or No. 2014-0175937 of the present applicant.

The epoxy compound having at least one alkoxysilyl group of Korean patent application No. 2012-0093320 may be an epoxy compound having an alkoxysilyl group comprising a core selected from a group consisting of Formulae A' to K' below and at least one substituent of Formula S1 below and two epoxy groups of Formula S2 below:

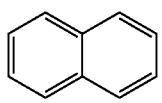

(A')

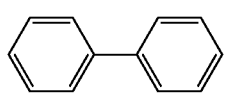

(B')

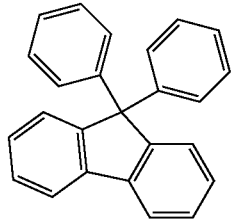

(C')

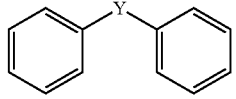

(D')

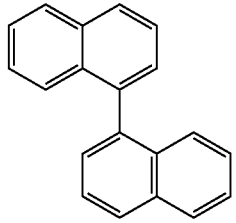

(E')

(F')

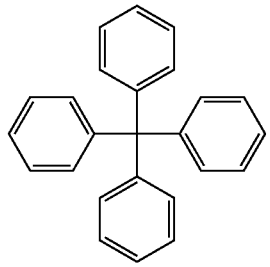

(G')

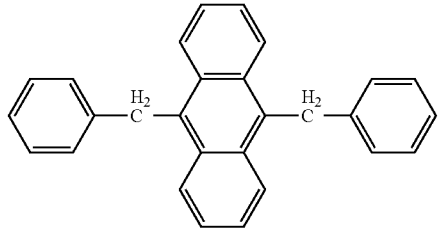

(H')

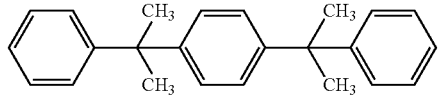

(I')

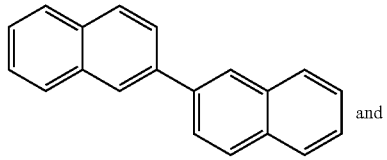

(J')

and

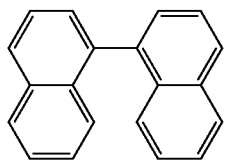
(K')

(In Formula D', Y is —CH$_2$—, —C(CH$_3$)$_2$—, —C(CF$_3$)$_2$—, —S—, or —SO$_2$—.)

—CR$_b$R$_c$—CHR$_a$—CH$_2$—SiR$_1$R$_2$R$_3$ [Formula S1]

(in Formula S1, each of R$_a$, R$_b$ and R$_c$ may be H or an alkyl group having 1 to 6 carbon atoms, independently, at least one of R$_1$ to R$_3$ is an alkoxy group having 1 to 6 carbon atoms, the remainders thereof are alkyl groups having 1 to 10 carbon atoms, and the alkyl group and the alkoxy group are a linear or branched)

[Formula S2]
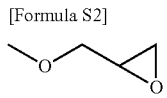

The epoxy compound having at least one alkoxysilyl group of Korean patent application No. 2013-0027308 may be an epoxy compound having an alkoxysilyl group selected from a group consisting of Formulae AI to HI below, for example.

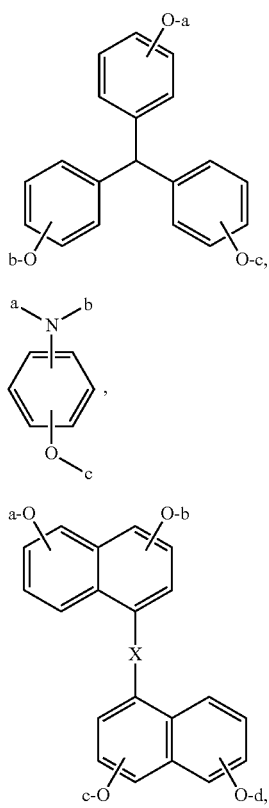

AI

BI

CI

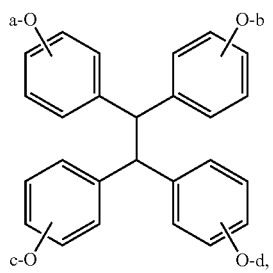
DI

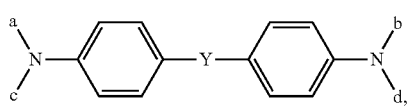
EI

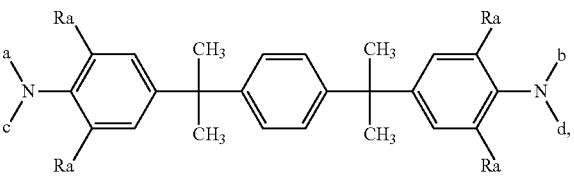
FI

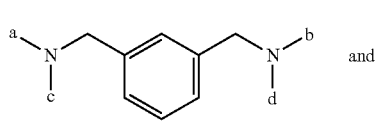
GI and

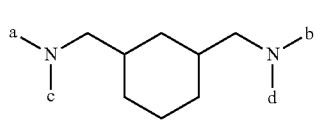
HI (one or two of substituents a to c of Formulae AI or BI above may be Formula S1 below, one or two may be Formula S2 or Formula S3 below, and the remainder may be hydrogen or —(CH$_2$)$_{z-2}$CH═CH$_2$ (z in the formula is an integer ranging from 3 to 10), one to three of substituents a to d of Formulae CI to HI above may be Formula S1 below, one to three may be Formula S2 or Formula S3 below, and the remainder may be hydrogen or —(CH$_2$)$_{z-2}$CH═CH$_2$ (in the formula, z is an integer ranging from 3 to 10), Formula BI may be substituted with a linear or branched C1-C10 alkyl group in a meta position of oxygen, in Formula CI, X is a single linkage, —CH$_2$—, or

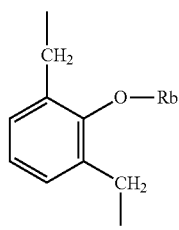

(Rb is H or a C1-C3 alkyl group),
in Formula EI, Y is —CH$_2$—, —C(CH$_3$)$_2$—, —C(CF$_3$)$_2$—, —S—, or —SO$_2$—, and in Formula FI, Ra is H or a C1-C3 alkyl group.)

[Formula S1]]

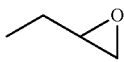

—(CH$_2$)$_z$—SiR$_1$R$_2$R$_3$ [Formula S2]

—CONH(CH$_2$)$_z$—SiR$_1$R$_2$R$_3$ [Formula S3]

(In Formulae S2 and S3, at least one of R$_1$ to R$_3$ is an alkoxy group having 1 to 10 carbon atoms, the remainders thereof are alkyl groups having 1 to 10 carbon atoms, the alkyl group and the alkoxy group are a linear or branched, and z is an integer ranging from 3 to 10.)

The epoxy compound having an alkoxysilyl group of Korean patent application No. 2013-0035546 above may be an epoxy compound having an alkoxysilyl group of Formula 1 below:

[Formula 1]

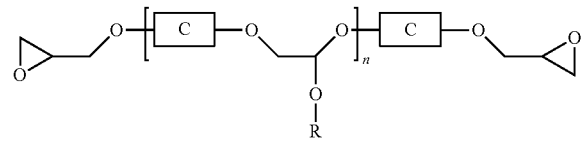

(In Formula 1, the core unit C may be independently selected from structures of Formulae 2-1 to 2-5 below, and a plurality of core units Cs present in Formula 1 above may be the same or may be different from each other,

[Formula 2-1]

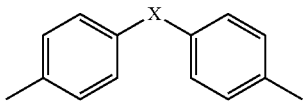

[Formula 2-2]

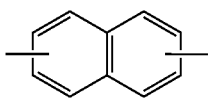

[Formula 2-3]

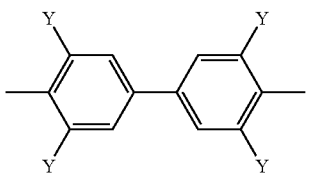

[Formula 2-4]

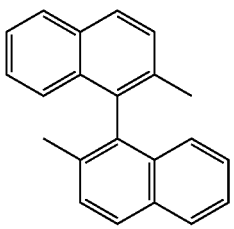

[Formula 2-5]

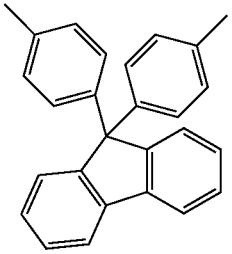

in Formula 2-1, X may be —CH$_2$—, —C(CH$_3$)$_2$—, —C(CF$_3$)$_2$—, —S—, or —SO$_2$—, in Formula 2-3, each Y may be independently selected from a group consisting of H and a C1 to C5 alkyl group, n is an integer ranging from 1 to 10, and when n is 1, R is a structure of Formula 3a or Formula 3b below, when n is 2 or greater, at least one of a plurality of Rs is a structure of Formula 3a or Formula 3b below, the remainders thereof are hydrogen, and in the epoxy compound of Formula 1 above, an epoxy compound of Formula 2-1 including a core unit in which X is —C(CH$_3$)$_2$— and R is Formula 3b below is excluded, —(CH$_2$)$_m$—SiR$_a$R$_b$R$_c$ [Formula 3a]

—CONH(CH$_2$)$_m$—SiR$_a$R$_b$R$_c$ [Formula 3b]

(In Formulae 3a and 3b, at least one of R$_a$ to R$_c$ may be an alkoxy group having 1 to 5 carbon atoms, the remainder thereof may be alkyl groups having 1 to 10 carbon atoms, the alkoxy group and the alkyl group may be a linear or branched alkoxy group and a linear or branched alkyl group, and m is an integer ranging from 3 to 10.))

The epoxy compound having an alkoxysilyl group of Korean patent application No. 2013-0078347 may be a novolac-based epoxy compound having at least one alkoxysilyl group selected from a group consisting Formulae I-1 to I-4 below:

[Formula I-1]

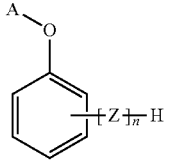

(In Formula I-1, Z is one from a group consisting of Formulae 1A to 1F below:

1A

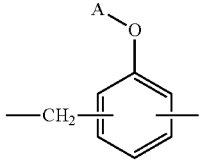

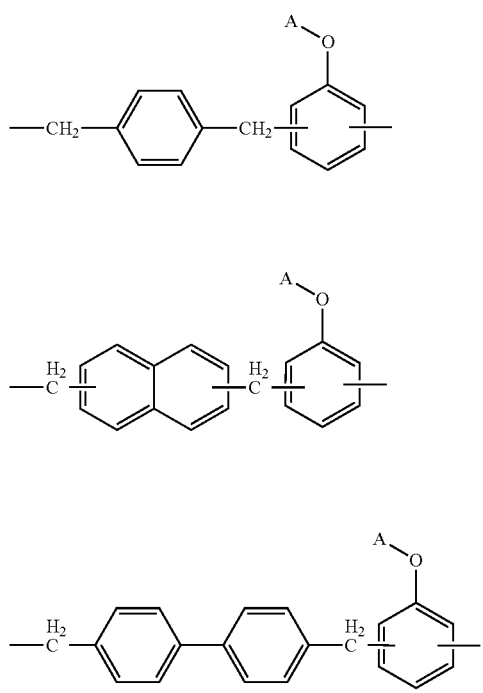

1B

1C

1D

1E

1F

[Formula I-2]

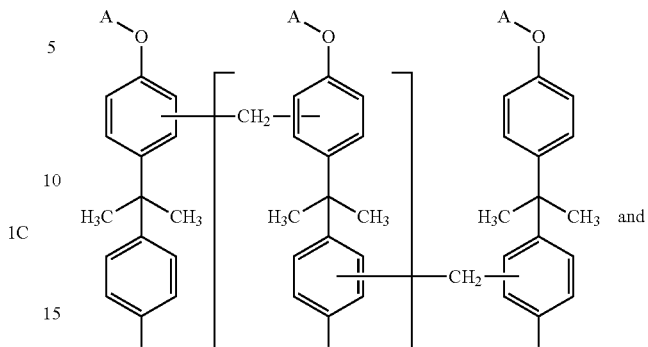

[Formula I-3]

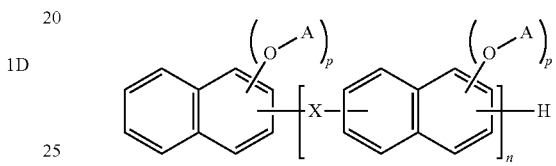

[Formula I-4]

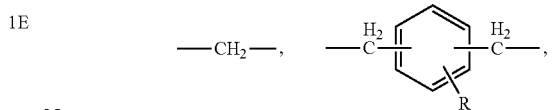

(In the formulae, x is $-CH_2-$,

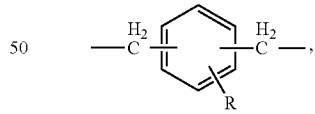

or

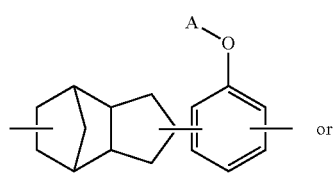

and in

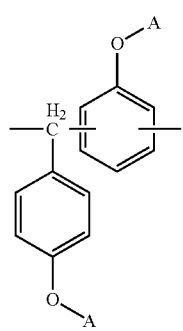

R is a linear or branched alkyl group of C1-C10.)

(In Formulae I-1 to I-4, at least two of a plurality of As is a structure of Formula A2 below, at least one of the plurality of As is Formula A3 or Formula A4 below, when at least one of the plurality of As is A3, the remainders thereof are Formula B3 below or hydrogen, when at least one of the plurality of As is A4, the remainders thereof are hydrogen, when Z is 1A to 1E in Formula I-1 above, n is an integer equal to or greater than 2, and when Z is 1F, n is an integer equal to or greater than 1, in Formulae I-2 and I-3, n is an integer equal to or greater than 1, in Formula I-4, when x is

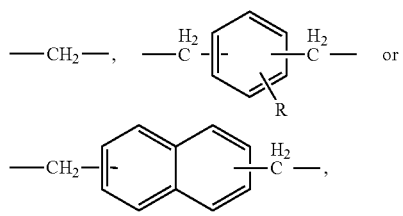

n is an integer equal to or greater than 2,
when x is

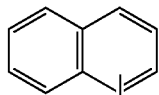

n is an integer equal to or greater than 1, and
in Formula I-4, p is 1 or 2.)

[Formula A2]

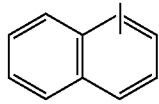

—(CH$_2$)$_m$—SiR$_1$R$_2$R$_3$      [Formula A3]

—CONH(CH$_2$)$_m$—SiR$_1$R$_2$R$_3$      [Formula A4]

(In Formulae A3 and A4, at least one of R$_1$ to R$_3$ is an alkoxy group having 1 to 5 carbon atoms, the remainders thereof are alkyl groups having 1 to 10 carbon atoms, the alkoxy group and the alkyl group are a linear or branched alkoxy group and a linear or branched alkyl group, and m is an integer ranging from 3 to 10.)

—(CH$_2$)$_l$—CH=CH$_2$      [Formula B3]

(in the formula, l is an integer ranging from 1 to 8.)

The epoxy compound having an alkoxysilyl group of Korean patent application No. 2013-0111473 may be an epoxy compound having an alkoxysilyl group, the epoxy compound comprising one type of core selected from a group consisting of Formulae A' to N' below; at least one alkoxysilyl group (1) independently selected from a group consisting of Formulae S11 to S16 below, (2) independently selected from a group consisting of Formulae S21 to S26 below, (3) independently selected from a group consisting of Formulae S11 to S16 below and Formulae S31 to S38 below, or (4) independently selected from a group consisting of Formulae S21 to S26 below and Formulae S31 to S38 below; and at least two epoxy groups independently selected from a group consisting of Formulae S51 to S58 below:

(A') 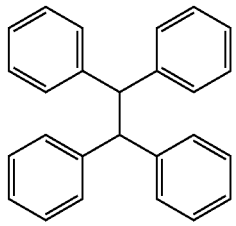

(B') 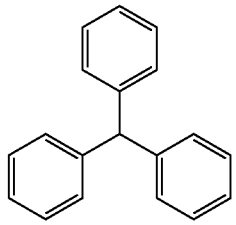

(C') 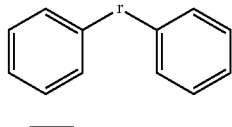

(D') 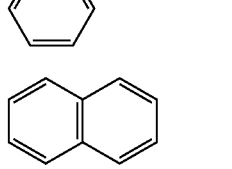

(E') 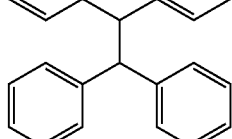

(F') 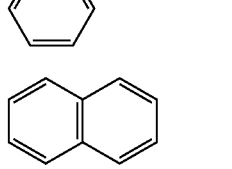

(G') 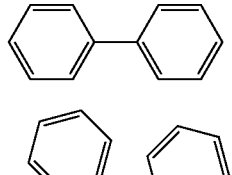

(H') 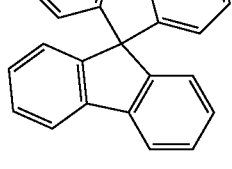

(I') 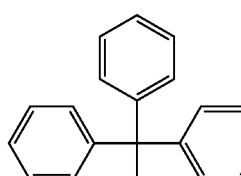

-continued

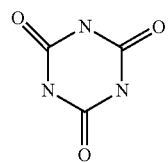
(J')

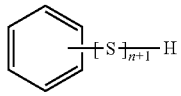
(K')

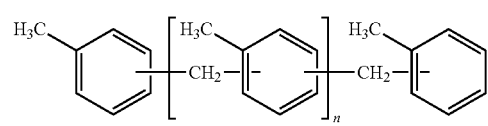
(L')

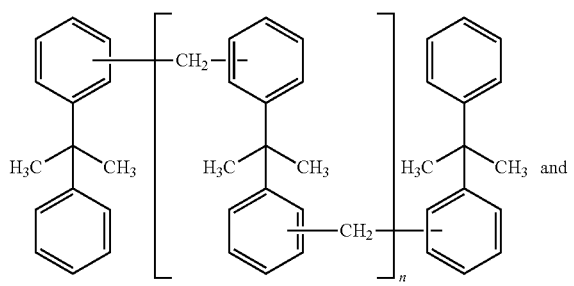
(M')

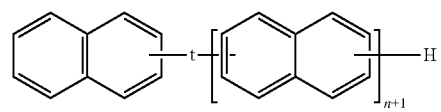
(N')

(In Formula A', -q- is —CH₂— or a direct linkage,
in Formula D', -r- is —C(CH₃)₂—, —CH₂—, —C(CF₃)₂—, —SO₂—, or —S—,
in Formula K', s is

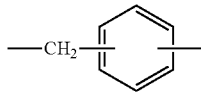

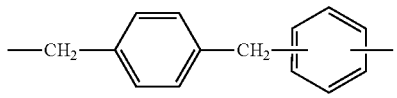

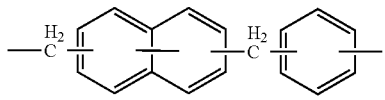

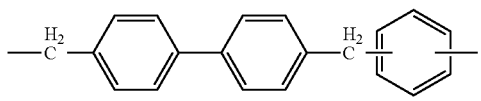

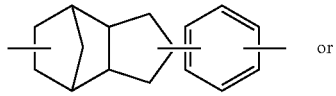 or

-continued

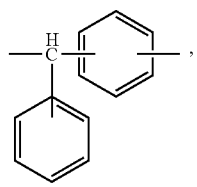

in Formula N', t is

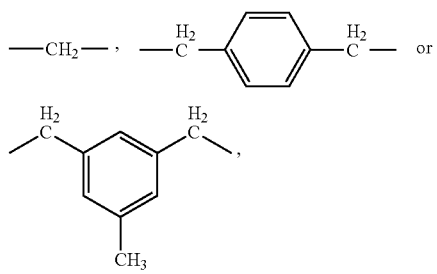

in Formulae K' to N', n is an integer equal to or greater than 1.)

[Formula S1]

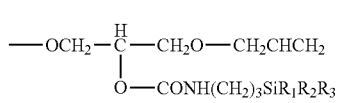
(S11)

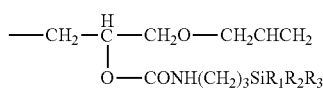
(S12)

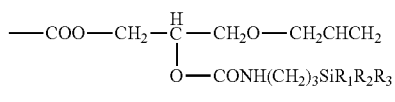
(S13)

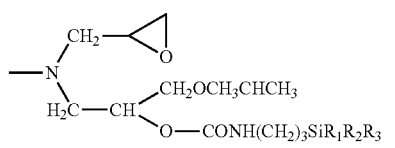
(S14)

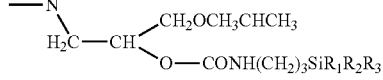
(S15)

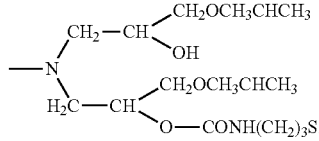

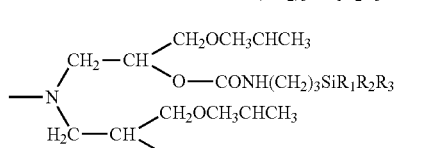
and
(S16)

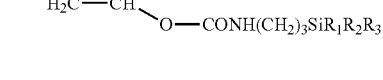

(In Formula S11 to S16, at least one of $R_1$ to $R_3$ is an alkoxy group having 1 to 5 carbon atoms, the remainders thereof are alkyl groups having 1 to 10 carbon atoms, and the alkoxy group and the alkyl group are a linear or branched.)

[Formula S2]

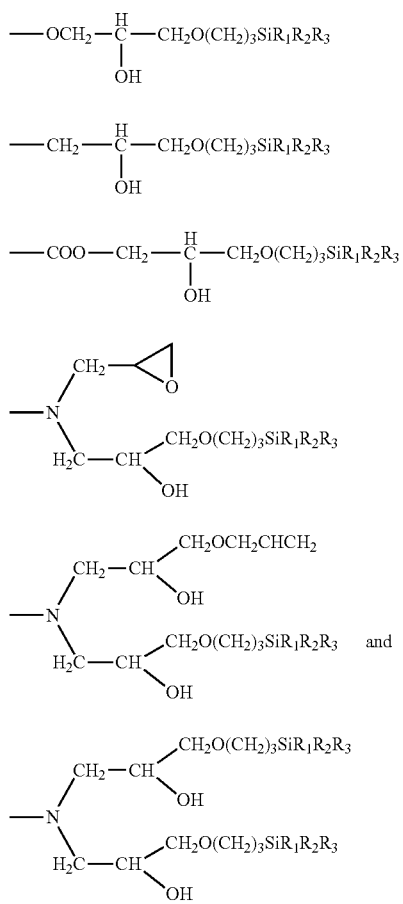

(S21)
(S22)
(S23)
(S24)
(S25)
(S26)

(In formula S21 to S26, at least one of $R_1$ to $R_3$ is an alkoxy group having 1 to 5 carbon atoms, the remainders thereof are alkyl groups having 1 to 10 carbon atoms, and the alkoxy group and the alkyl group are a linear or branched.)

[Formula S3]

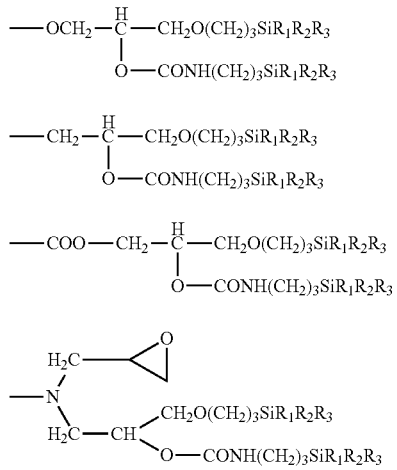

(S31)
(S32)
(S33)
(S34)

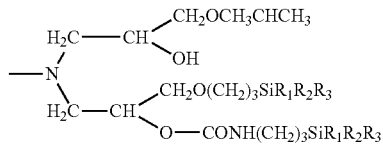

(S35)

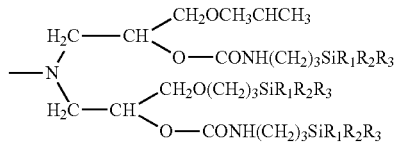

(S36)

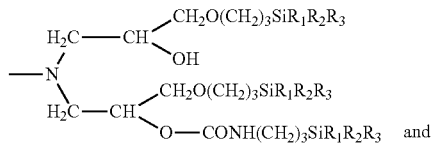

(S37)

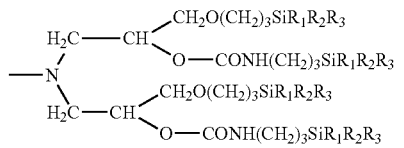

and

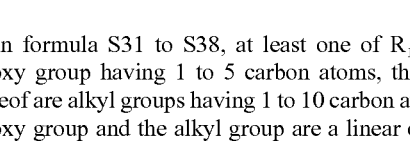

(S38)

(In formula S31 to S38, at least one of $R_1$ to $R_3$ is an alkoxy group having 1 to 5 carbon atoms, the remainders thereof are alkyl groups having 1 to 10 carbon atoms, and the alkoxy group and the alkyl group are a linear or branched.)

[Formula S5(3)]

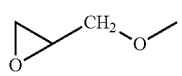

(S51)

(S52)

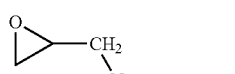

(S53)

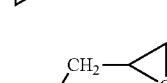

(S54)

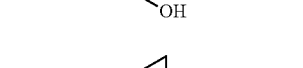

(S55)

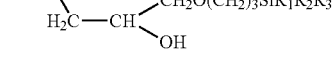

(S56)

(S57) 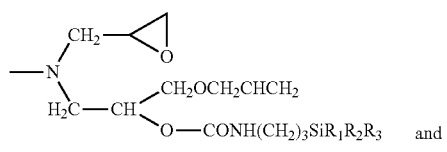

(S58) 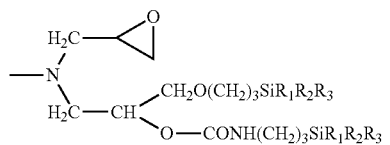

(In formula S56 to S58, at least one of $R_1$ to $R_3$ is an alkoxy group having 1 to 5 carbon atoms, the remainders thereof are alkyl groups having 1 to 10 carbon atoms, and the alkoxy group and the alkyl group are a linear or branched.)

The epoxy compound having an alkoxysilyl group of Korean patent application No. 2014-0021884 may be an epoxy compound having an alkoxysilyl group represented as a compound selected from a group consisting of Formulae AF to NF below:

(AF) 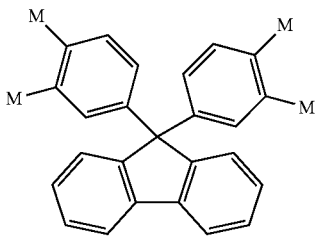

(BF) 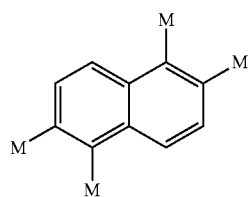

(CF) 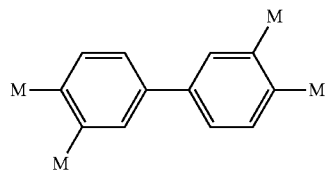

(DF) 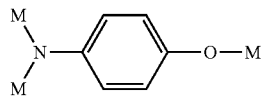

(EF) 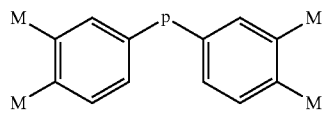

(FF) 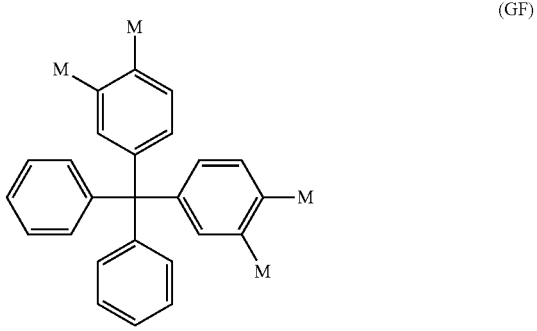

(GF) 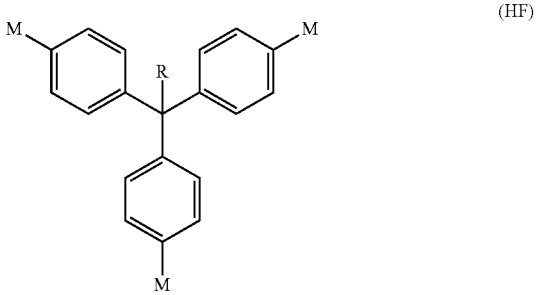

(HF) 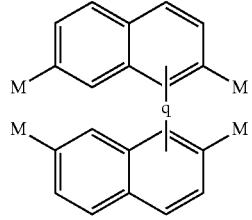

(IF)

(JF) 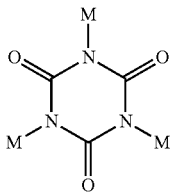

(KF) 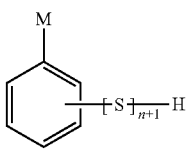

(LF) 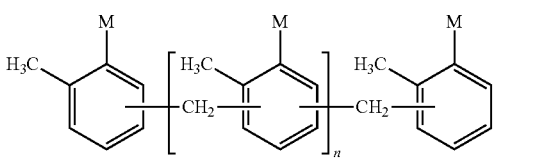

-continued (MF)
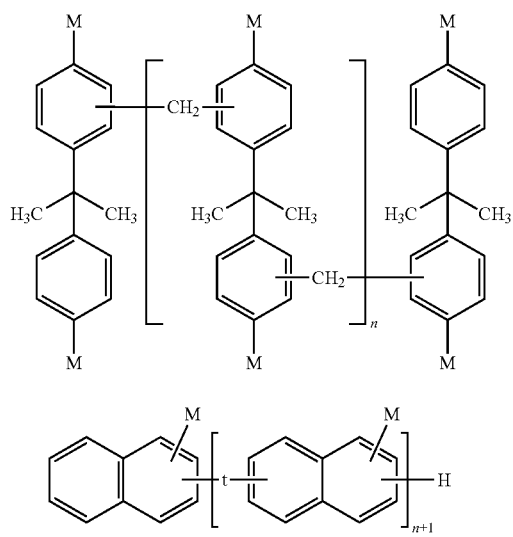

(NF)
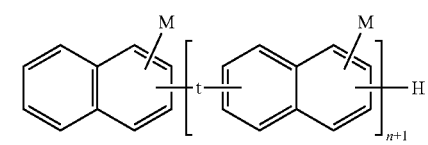

(In Formula DF, -p- is —C(CH$_3$)$_2$—, —CH$_2$—, —C(CF$_3$)$_2$—, —S—, —SO$_2$—,

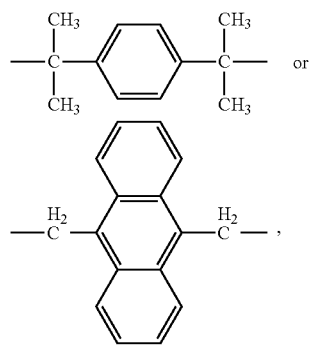

in Formula EF, -q- is —CH$_2$— or a direct linkage, in Formula HF, R is hydrogen, a hydroxyl group, an alkyl group (C1-C10), or an aromatic group, in Formula KF, S is

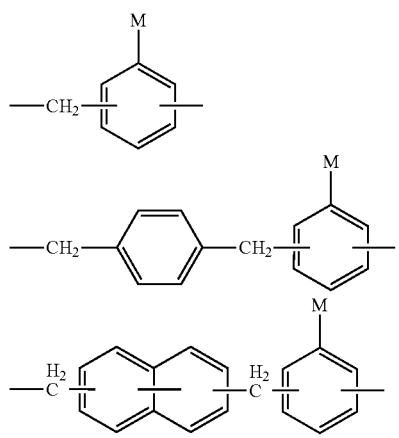

-continued

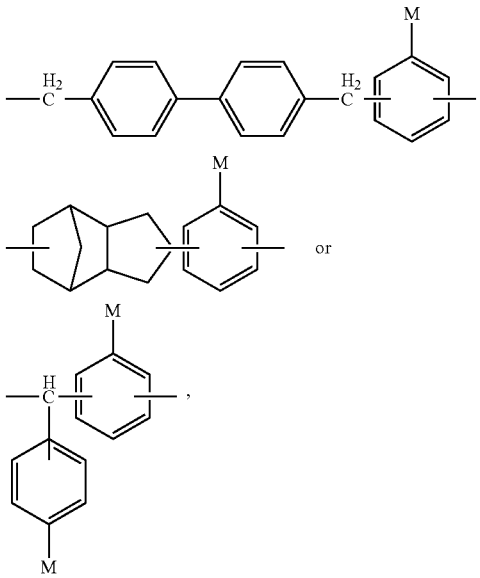

in Formula NF, t is

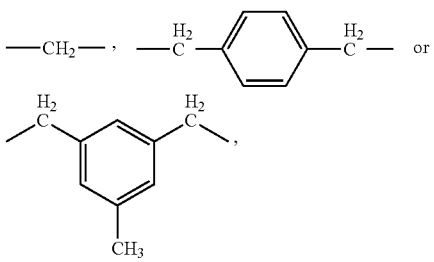

in Formulae KF to NF, n is an integer equal to or greater than 1, at least two of a plurality of Ms of Formulae AF, BF, DF to IF, and KF to NF above is an epoxy group selected from a group consisting of Formulae S41 to S45 below, at least one of the plurality of Ms is an alkoxysilyl group, an S1 substituent independently selected from a group consisting of Formulae S11 to S15 below or an S2 substituent independently selected from a group consisting of Formulae S21 to S25 below, the remainders thereof are hydrogen, or Formula S3 substituents selected from a group consisting of Formulae S31 to S35 below, at least two of a plurality of Ms of Formulae CF and JF above is an epoxy group of Formula S42, and the remainder is an alkoxysilyl group of Formula S12 or Formula S22 below:

[Formula S1]

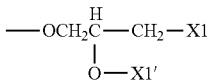 (S11)

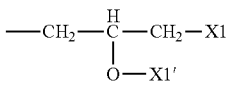 (S12)

-continued

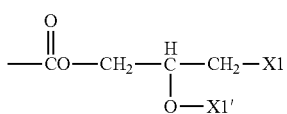
(S13)

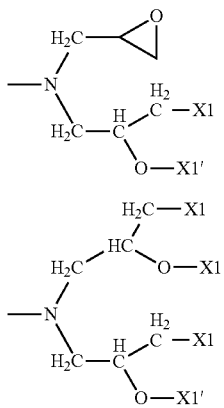
(S14)

(S15)

(In Formulae S11 to S15, X1 is OR$_4$, OH, NR$_4$R$_6$, SR$_4$, or OCONH(CH$_2$)$_3$SiR$_1$R$_2$R$_3$, X1' is CONH(CH$_2$)$_3$SiR$_1$R$_2$R$_3$. Also, at least one of R$_1$ to R$_3$ is an alkoxy group having 1 to 5 carbon atoms, and the remainders thereof are alkyl groups having 1 to 10 carbon atoms. R$_4$ or R$_5$ may be an alkyl group, an aryl group, or an aralkyl group, having 1 to 20 carbon atoms, and may include a hetero compound comprising N, O, P or S.)

[Formula S2]

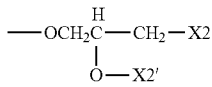
(S21)

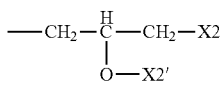
(S22)

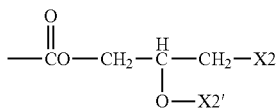
(S23)

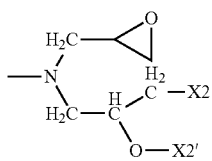
(S24)

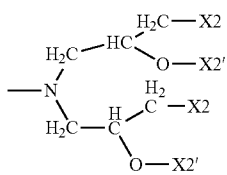
(S25)

(In Formulae S21 to S25, X2 is OR$_4$, OH, NR$_4$R$_5$, SR$_4$, or O(CH$_2$)$_n$CH$_2$CH$_2$SiR$_1$R$_2$R$_3$, and X2' is (CH$_2$)$_n$CH$_2$CH$_2$SiR$_1$R$_2$R$_3$. Also, at least one of R$_1$ to R$_3$ is an alkoxy group having 1 to 5 carbon atoms, and the remainders thereof are alkyl groups having 1 to 10 carbon atoms. R$_4$ or R$_5$ may be an alkyl group, an aryl group, or an aralkyl group, having 1 to 20 carbon atoms, and may include a hetero compound comprising N, O, P or S.)

[Formula S4(3)]

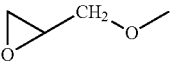
(S41)

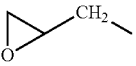
(S42)

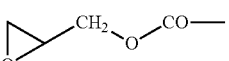
(S43)

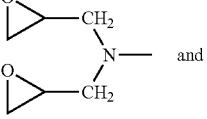
(S44)

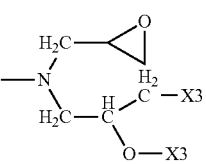
and

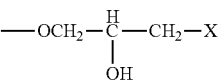
(S45)

(X3 is OR$_4$, OH, NR$_4$R$_5$, SR$_4$, OCONH(CH$_2$)$_3$SiR$_1$R$_2$R$_3$ or O(CH$_2$)$_n$CH$_2$CH$_2$SiR$_1$R$_2$R$_3$, and X3' is H, CONH(CH$_2$)$_3$SiR$_1$R$_2$R$_3$ or (CH$_2$)$_n$CH$_2$CH$_2$SiR$_1$R$_2$R$_3$. Also, at least one of R$_1$ to R$_3$ is an alkoxy group having 1 to 5 carbon atoms, and the remainders thereof are alkyl groups having 1 to 10 carbon atoms. R$_4$ or R$_5$ may be an alkyl group, an aryl group, or an aralkyl group, having 1 to 20 carbon atoms, and may include a hetero compound comprising N, O, P or S.)

[Formula S3]

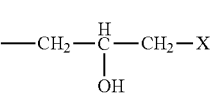
(S31)

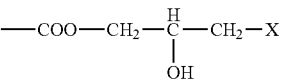
(S32)

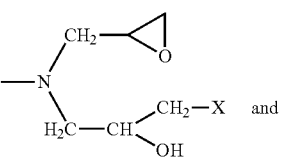
(S33)

(S34)

and

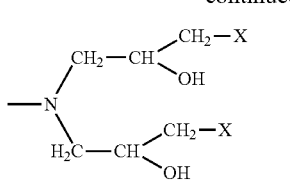
(S35)

(In Formulae S31 to S35, X is $OR_4$, OH, $NR_4R_5$ or $SR_4$. $R_4$ or $R_5$ may be an alkyl group, an aryl group, or an aralkyl group, having 1 to 20 carbon atoms, and may include a hetero compound comprising N, O, P or S.))

The epoxy compound having an alkoxysilyl group of Korean patent application No. 2014-0175937 may include a core, i) at least two epoxy groups selected from an epoxy group of Formulae E1 and E2 below; ii) at least one alkoxysilyl group selected from a group consisting of Formulae A1 to A5 below; and iii) at least one unreactive silyl group selected from a group consisting of Formulae A6 to A10 below, an alkenyl group, or a combination thereof:

[Formula E1]

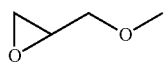

[Formula E2]

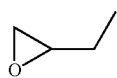

—$CR_bR_c$—$CHR_a$—$CH_2$—$SiR_1R_2R_3$      [Formula A1]

—O—$(CH_2)_{m+2}$—$SiR_1R_2R_3$      [Formula A2]

—O—$CONH(CH_2)_m$—$SiR_1R_2R_3$      [Formula A3]

—$(CH_2)_{m+2}$—$SiR_1R_2R_3$      [Formula A4]

—$CONH(CH_2)_m$—$SiR_1R_2R_3$      [Formula A5]

(In Formula A1, each of $R_a$, $R_b$ and $R_c$ is H or an alkyl group having 1 to 6 carbon atoms, independently, in Formulae A1 to A5 above, at least one of $R_1$ to $R_3$ is an alkoxy group having 1 to 6 carbon atoms, the remainders thereof are alkyl groups having 1 to 10 carbon atoms, the alkyl group and the alkoxy group are a linear or branched alkyl group and a linear or branched alkoxy group, or are an cyclic or acyclic alkyl group and an cyclic or acyclic alkoxy group, may or may not have a hetero atom of N, O, S, or P, and m is an integer ranging from 1 to 10.)

—$CR_bR_c$—$CHR_a$—$CH_2$—$SiR_4R_5R_6$      [Formula A6]

—O—$(CH_2)_{m+2}$—$SiR_4R_5R_6$      [Formula A7]

—O—$CONH(CH_2)_m$—$SiR_4R_5R_6$      [Formula A8]

—$(CH_2)_{m+2}$—$SiR_4R_5R_6$      [Formula A9]

—$CONH(CH_2)_m$—$SiR_4R_5R_6$      [Formula A10]

(In Formula A6, each of $R_a$, $R_b$ and $R_c$ is H or an alkyl group having 1 to 6 carbon atoms, independently, in Formulae A6 to A10 above, $R_4$ to $R_6$ is unreactive group of an aliphatic, alicyclic, or aromatic group having 1 to 20 carbon atoms, the unreactive group may be a linear or branched unreactive group or may be a cyclic or acyclic unreactive group, may not have a hetero atom of N, O, S, or P, and m is an integer ranging from 1 to 10.)

As the epoxy compound, an epoxy compound having at least one alkoxysilyl group and an epoxy compound which does not have an alkoxysilyl group may be used independently, or in combination.

The curing agent may be any curing agent generally used in the field of art, and may be, for example, although not limited thereto, a polyphenol curing agent, an amine curing agent, an acid anhydride curing agent, or the like, may be used.

More specifically, although not limited thereto, as an example of a phenol curing agent, a phenol novolac resin, a cresol novolac resin, a bisphenol A novolac resin, a xylene novolac resin, a triphenyl novolac resin, a biphenyl novolac resin, a dicyclopentadiene novolac resin, a naphthalene novolac resin, or the like, may be used. The phenol curing agent may have at least one alkoxysilyl group or may not have an alkoxysilyl group.

As the phenol curing agent, a phenol curing agent having at least one alkoxysilyl group and a phenol curing agent which does not have an alkoxysilyl group may be used independently, or in combination. The phenol curing agent having at least one alkoxysilyl group may be disclosed in Korean patent application No. 2015-0002675 of the present applicant.

The curing agent in Korean patent application No. 2015-0002675 is a novolac curing agent having least one alkoxysilyl group selected from a group consisting of Formulae I-1 to I-4 below:

[Formula I-1]

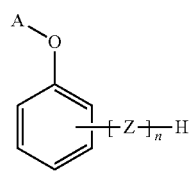

(In Formula I-1, Z is one from a group consisting of Formulae 1A to 1F below:

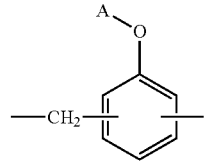
IA

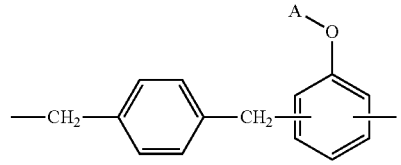
IB

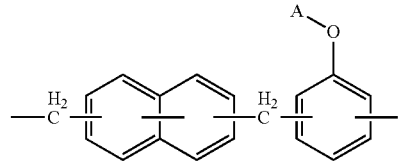
IC

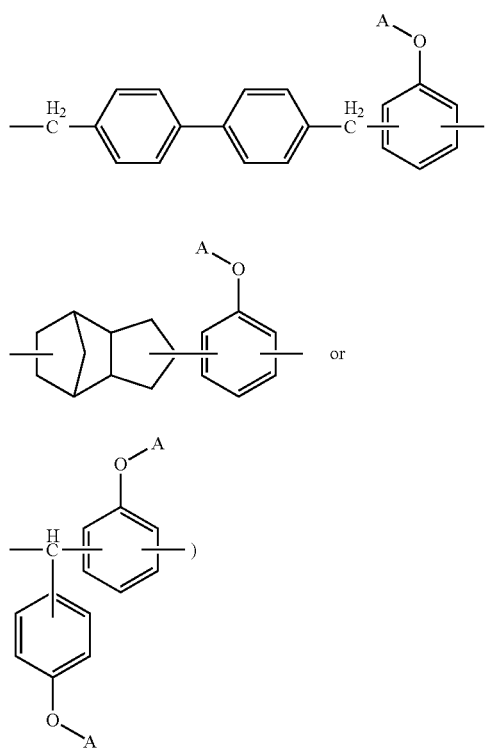

[Formula ID]

[Formula IE]

[Formula IF]

[Formula I-2]

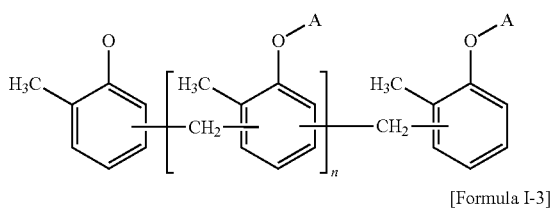

[Formula I-3]

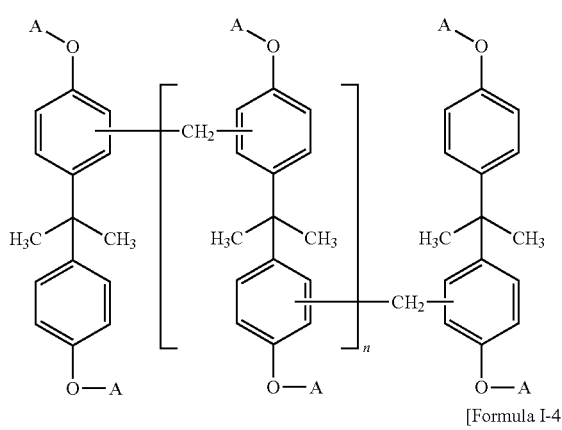

[Formula I-4]

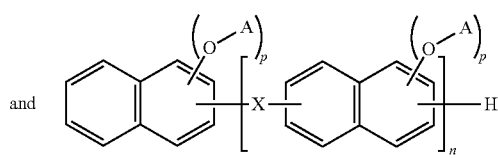

(In Formula I-4, p is 1 or 2,
x is

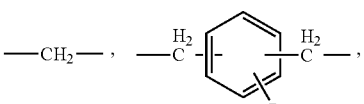

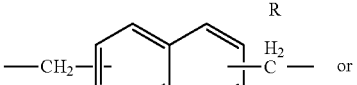

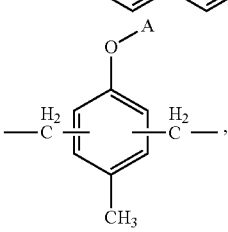

and
in

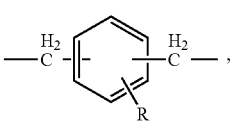

R is a linear or branched alkyl group of C1-C10.)

(In Formulae I-1 to I-4, at least one of As is Formula A2 or Formula A3 below, when at least one of As is A2, the remainders thereof are Formula B2 below or hydrogen, when at least one of As is A3, the remainders thereof are hydrogen, and n is an integer equal to or greater than 1.)

$$-(CH_2)_m-SiR_1R_2R_3 \quad \text{[Formula A2]}$$

$$-CONH(CH_2)_m-SiR_1R_2R_3 \quad \text{[Formula A3]}$$

(In Formulae A2 and A3, at least one of $R_1$ to $R_3$ is a linear or branched alkoxy group having 1 to 5 carbon atoms, the remainders thereof are linear or branched alkyl groups having carbon atoms 1 to 10, and m is an integer ranging from 3 to 10.)

$$-(CH_2)_l-CH=CH_2 \quad \text{[Formula B2]}$$

(In the formula, l is an integer ranging from 1 to 8.)

As an amine curing agent, although not limited thereto, an aliphatic amine, an alicyclic amine, an aromatic amine, other amine, and modified polyamine may be used, and an amine compound including two or more primary amine groups may be used. As an example of the amine curing agent, one or more types of an aromatic amine selected from a group consisting of 4,4'-dimethylaniline (diamino diphenyl methane) (DAM or DDM), diamino diphenyl sulfone (DDS), and m-phenylene diamine, one or more types of an aliphatic amine selected from a group consisting of diethylene triamine (DETA), diethylene tetramine, triethylene tetramine (TETA), m-xylene diamine (MXDA), methane diamine (MDA), N,N'-diethylenediamine (N,N'-DEDA), tetraethylenepentaamine (TEPA), and hexamethylenediamine, one or more types of an alicyclic amine selected from a group consisting of isophorone diamine (IPDI), N-aminoethyl piperazine (AEP), bis(4-amino 3-methylcyclohexyl)methane, larominc 260, other amine such as dicyandiamide (DCDA), modified amine such as a polyamide-based amine, an epoxide-based amine, or the like, may be used.

As an example of an acid anhydride curing agent, although not limited thereto, an aliphatic acid anhydride such as dodecenyl succinic anhydride (DDSA), poly azelaic poly anhydride, or the like, an alicyclic acid anhydride such as hexahydrophthalic anhydride (HHPA), methyl tetrahydrophthalic anhydride (MeTHPA), methylnadic anhydride (MNA), or the like, an aromatic acid anhydride such as trimellitic anhydride (TMA), pyromellitic acid dianhydride, (PMDA), benzophenonetetracarboxylic dianhydride, (BTDA), or the like, a halogen-based acid anhydride such as tetrabromophthalic anhydride (TBPA), chlorendic anhydride, or the like.

Generally, a degree of cure of an epoxy composite may be adjusted by a degree of reaction between a curing agent and an epoxy group, and a content of a curing agent may be adjusted with reference to a concentration of an epoxy group of an epoxy compound in accordance with a desired range of a degree of cure. For example, when a phenol curing agent is used, in the reaction between a phenol curing agent and an epoxy group in equivalents, it may be preferable to adjust a content of the curing agent for an equivalent ratio between epoxy equivalent/phenol equivalent to be 0.5 to 2.0, or to be 0.8 to 1.5, for example.

The mixing amount of the curing agent has been described based on a phenol curing agent as an example, a polyphenol curing agent, an acid anhydride curing agent, and any curing agent which has not been mentioned in the present application and which may be used in the curing of the epoxy compound may be formulated and used in an appropriate stoichiometric amount according to the chemical reaction of the epoxy functional group and the reactive functional group of curing agent based on a concentration of a total epoxy group of the epoxy compound in the epoxy composition in accordance with a desired range of cure. This is generally known in this art.

As for the filler, any filler known in the field of art may be used, and may not be limited to any particular filler. As the filler, an inorganic particle and/or fiber may be used.

As an inorganic particle, any general inorganic particle known as being used to reinforce property of an organic resin may be used. For example, although not limited thereto, at least one type selected from a group consisting of at least one type of a metal oxide selected from a group consisting of silica (e.g., comprising fused silica and crystalline silica), zirconia, titania, alumina, silicon nitride, and aluminum nitride, and silsesquioxane may be used. Only one type of the inorganic particle may be used, or a mixture of two or more types of the inorganic particles may be used.

As the inorganic particle, although not limited thereto, an inorganic particle having a particle size of 0.5 nm to several tens of μm (for example, 50 μm to 100 μm) may be used in consideration of dispersibility, and the like, of an inorganic particle. As an inorganic particle is dispersed in the epoxy compound, it may be preferable to use the inorganic particle having different sizes together within the size range described above due to a difference in dispersibility caused by sizes of particles. Also, to increase the mixing amount of the inorganic particle, it may be preferable to increase a particle size distribution of the inorganic particle in the formulation.

As the fiber, although not limited thereto, any general fiber used to improve property of an organic resin cured product may be used. Specifically, glass fiber, organic fiber, or a mixture thereof may be used. Also, the term 'glass fiber' used in the application may include glass fiber fabric, a non-woven glass fiber product, or the like, as well as glass fiber. As an example of the glass fiber may include, although not limited thereto, an E-glass fiber, a T-glass fiber, an S-glass fiber, an NE-glass fiber, a D-glass fiber, a quartz glass fiber, or the like may be used. For example, E- or T-glass fiber may be used. The organic fiber may include, although is not limited to, at least one selected from a group consisting of a liquid crystal polyester fiber, a polyethylene terephthalate fiber, a wholly aromatic fiber, a polybenzoxazole fiber, a nylon fiber, a polyethylene naphthalate fiber, a polypropylene fiber, a polyether sulfone fiber, a polyvinylidene fluoride fiber, a polyethylene sulfide fiber, and a polyether ether ketone fiber may be used, and only one type of the fibers may be used or two or more of the fibers may be used together.

Further, in the epoxy composition, other additives such as a curing catalyst, an organic solvent, a releasing agent, a surface treatment agent, a flame retardant, a plasticizer, bactericides, a leveling agent, a defoaming agent, a colorant, a stabilizer, a coupling agent, a viscosity controlling agent, a diluent, or the like may be mixed to control the physical properties of the epoxy composition within the range in which physical properties of the epoxy composition is not deteriorated if desired.

The epoxy composition comprising one of the above-mentioned components may be formulated as below, for example.

For example, (A) an epoxy compound, (B) a curing agent, (C) a filler, (D) an optional curing catalyst and/or an additives, and (E) a compound having the alkoxysilyl group and the active ester may be included.

The epoxy composition may be cured by a reaction between (A) the epoxy compound and (B) the curing agent, and (A) the epoxy compound and (B) the curing agent may be cured by a reaction between an epoxy group of the epoxy compound and a curing reactive group of the curing agent in 1 equivalent ratio. Thus, in consideration of a degree of cure and reactivity, (B) the curing agent may be included in the epoxy composition for an equivalent ratio between an epoxy group of the epoxy compound/the curing reactive group of the curing agent to be 0.5 to 2.0, or to be 0.8 to 1.5, for example. The curing reactive group of the curing agent may be a phenol group when the curing agent is a phenol curing agent, the curing reactive group may be an amine group when the curing agent is an amine curing agent, and when the curing agent is an acid anhydride curing agent, the curing reactive group may be an acid anhydride group.

(E) The compound having the alkoxysilyl group and the active ester may be formulated based on the amount of (B) the curing agent. In other words, (E) the compound having the alkoxysilyl group and the active ester may be mixed for a weight ratio between the curing agent:the compound having an alkoxysilyl group and an active ester group to be 99:1 to 20:80. It may be preferable to mix the compound having an alkoxysilyl group and an active ester in the aforementioned range in the aspect of improvement of low moisture absorption. When the compound having an alkoxysilyl group and an active ester is mixed in amount less than a lower limit value, it may be difficult to expect sufficient improvement of low moisture absorption, and when the compound having an alkoxysilyl group and an active ester is mixed in amount exceeding an upper limit value, low moisture absorption may be deteriorated due to a change in network structure during the curing. Preferably, a weight ratio between the curing agent:the compound having an alkoxysilyl group and an active ester may be 99:1 to 50:50, or may be 97:3 to 60:40 more preferably.

(C) The filler may be 5 to 95 parts by weight, for example, 5 to 90 parts by weight, for example, 10 to 90 parts by weight, for example, 30 to 95 parts by weight, for example, 30 to 90 parts by weight, for example, 5 to 85 parts by weight, for example, 5 to 60 parts by weight, for example, 10 to 80 parts by weight, for example, or 10 to 50 parts by weight, for example, based on 100 parts by weight of a total solid portion with reference to a content of a total solid portion (including the filler) of the epoxy composition. In other words, when the filler is 5 parts by weight with respect to 100 parts by weight of a total solid portion, a content of the filler per 100 g of a solids content of the epoxy composition comprising the filler may be 5 g. The solid portion in the epoxy composition may refer to all the components of the epoxy composition other than a solvent.

In other words, with reference to 100 parts by weight of a total content of (A), (B) (C), and (E), or when a curing catalyst and/or an additive is added, with reference to 100 parts by weight of a total content of (A), (B), (C), (D), and (E), (C) the filler may be included by the above-mentioned parts by weight.

The filler may be mixed in content considered appropriate in the field of art in accordance with a decrease of a coefficient of thermal expansion (CTE) of the epoxy cured product and appropriate viscosity and usage required when the filler is applied, and the filler may be mixed in the above-mentioned content in the aspect of exhibition of properties required for an epoxy composition.

For example, in the epoxy composition, the components (A) to (E) may be mixed by 1 to 95 weight % of a solid content in a solvent, the solvent may be removed, and the epoxy composition may be cured and may be manufactured as a desired product. A solid content in the solvent may be appropriately adjusted by a person skilled in the art in accordance with a desired final product.

An epoxy composition provided in any embodiment of the present disclosure may be used as a semiconductor material and/or an electrical and electronic material. For example, as the electronic material, the epoxy composition may be used as prepreg, a laminated substrate in which a metal layer is disposed on prepreg, a substrate, a film, a printed circuit board, a packaging material, and the like. According to another embodiment of the present disclosure, a semiconductor device on which a semiconductor element is mounted on a printed circuit board manufactured using a composition comprising the compound having an alkoxysilyl group and an active ester group of the present disclosure and/or a semiconductor device comprising a semiconductor packaging material manufactured using the compound having an alkoxysilyl group and an active ester group of the present disclosure may be provided.

In the description below, the present disclosure will be described in greater detail in accordance with examples.

Synthesis Example 1: Synthesis of Bisphenol A Having Active Ester and Ethoxysilyl Group (Preparation Method 1)

(1) First Step 20 g of 2,2'-diallylbisphenol A (1-1), 100 ml of THF, and 50 g of pyridine were added into a two-neck flask and stirred at a room temperature. Thereafter, 14.6 g of acetic anhydride was added and the mixture was stirred for 1 hour. After the reaction is completed, a solvent was removed. 300 ml of ethylacetate was added and the mixture was worked up with $H_2O$. Residual $H_2O$ was removed by adding $MgSO_4$ to an organic layer, the mixture was filtered using a Celite filter and was dried, and an intermediate (1-1) having a ratio of ester group to hydroxyl group of 1:1 was obtained. NMR data of the intermediate (1-1) is as below:

$^1$H NMR (400 MHz, DMSO): δ=7.17 (d, 2H, J=3.2 Hz), 7.08 (dd, 2H, J=8.0 Hz, 2.4 Hz), 6.97 (d, 2H, J=8 Hz), 5.86-5.76 (m, 2H), 5.03-4.98 (m, 4H), 3.21 (d, 4H, J=4.0 Hz), 2.25 (s, 6H), 1.63 (s, 6H)

(2) Second Step 20 g of the intermediate (1-1), 0.23 g of $PtO_2$, 18.4 g of triethoxysilane, and 250 ml of toluene were added into a flask and were stirred at a room temperature for 5 minutes. Thereafter, the mixture was heated and stirred at a temperature of 80° C. for 12 hours and was cooled to a room temperature, and an inorganic component was removed by filtering the mixture using a Celite filter. Toluene was removed, and the mixture was dried, and a final product having a ratio of ester group to hydroxyl group of 1:1 was obtained. NMR data of the final product (1-2) is as below:

$^1$H NMR (400 MHz, DMSO): δ=7.18-6.92 (m, 6H), 3.70 (q, 12H, J=8.0 Hz), 2.46-2.42 (m, 4H), 2.26 (s, 6H), 1.62 (s, 6H), 1.55-1.47 (m, 4H), 1.13 (t, 18H, J=8.0 Hz), 0.56-0.52 (m, 4H)

A synthesis scheme of Synthesis Example 1 is as below:

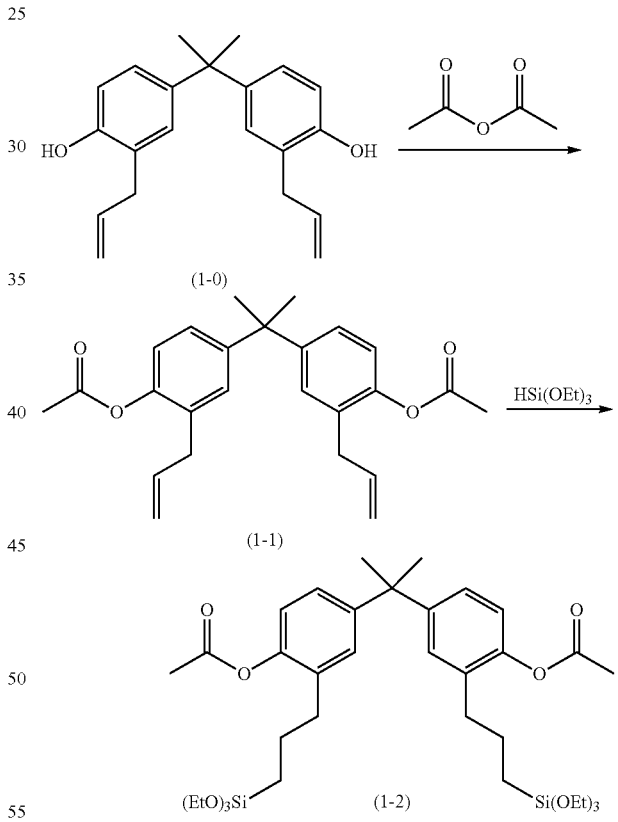

Synthesis Example 2: Synthesis of Biphenyl Having Active Ester and Ethoxysilyl Group (Preparation Method 1)

Synthesis Example 2 was carried out using the same method as described in Synthesis Example 1, except that the different amounts of a starting material and reactants were used. A synthesis scheme of Synthesis Example 2 is as below:

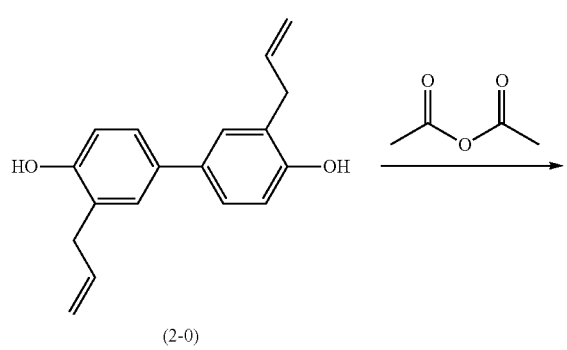

(2-0)

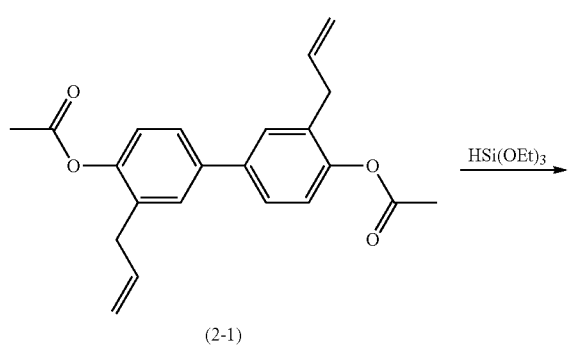

(2-1)

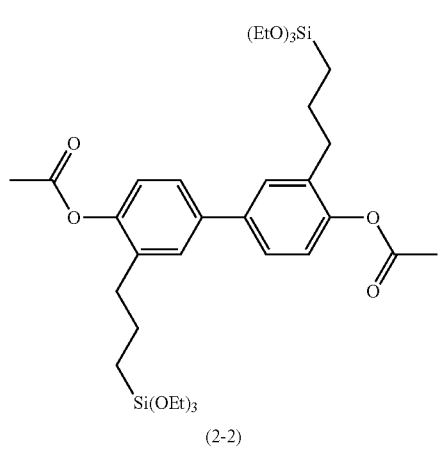

(2-2)

The amount of each reactant used in the first step and the second step to synthesize a final product (2-2) is as listed in Table 1 and Table 2 below:

TABLE 1

Amount of Reactants Used in First Step of Synthesis Example 2

| Synthesis Example 2 | Starting Material (2-0) | Acetic Anhydride | pyridine | THF | [Ester Group]: [Hydroxyl Group] of Intermediate (2-1) |
|---|---|---|---|---|---|
| First Step | 20 g | 16.9 g | 50 g | 100 ml | 1:1 |

TABLE 2

Amount of Reactants Used in Second Step of Synthesis Example 2

| Synthesis Example 2 | Intermediate (2-1) | Triethoxy silane | PtO$_2$ | Toluene | [Ester Group]: [Ethoxysilyl Group] of Final Product (2-2) |
|---|---|---|---|---|---|
| Second Step | 20 g | 20.6 g | 0.26 g | 250 ml | 1:1 |

NMR data of the intermediate (2-1) and the final product (1-2) obtained through Synthesis Example 2 is as below:

First step of Synthesis Example 2: NMR of intermediate (2-1) (ester group:hydroxyl group=1:1)

$^1$H NMR (400 MHz, CDCl$_3$): δ=6.94 (d, 4H, J=10.6 Hz), 6.84 (d, 2H, J=8.4 Hz), 6.03~5.93 (m, 2H), 5.12~5.05 (m, 4H), 3.35 (d, 4H, J=6.4 Hz), 2.26 (s, 6H)

Second step of Synthesis Example 2: NMR of final product (2-2) (ester group:alkoxysilyl group=1:1)

$^1$H NMR (400 MHz, CDCl$_3$): δ=6.94 (d, 4H, J=10.6 Hz), 6.84 (d, 2H, J=8.4 Hz), 3.70 (q, 12H, J=8.0 Hz), 2.63-2.60 (m, 4H), 2.26 (s, 6H), 1.67~1.57 (m, 4H), 1.13 (t, 18H, J=8.0 Hz), 0.61~0.56 (m, 4H)

Synthesis Example 3: Synthesis of Naphthalene Having Active Ester and Ethoxysilyl Group (Preparation Method 1)

Synthesis Example 3 was carried out using the same method as described in Synthesis Example 1, except that the different amounts and types of a starting material and reactants were used. A synthesis scheme of Synthesis Example 3 is as below:

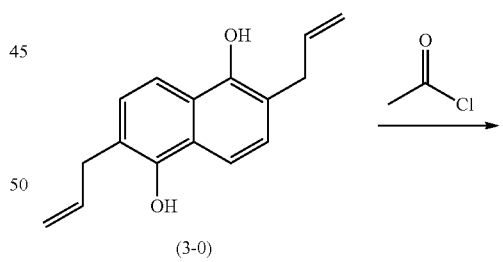

(3-0)

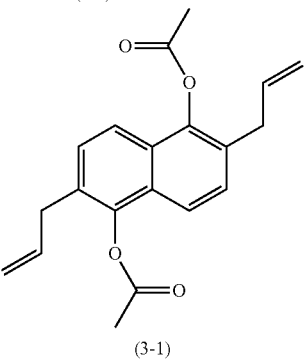

(3-1)

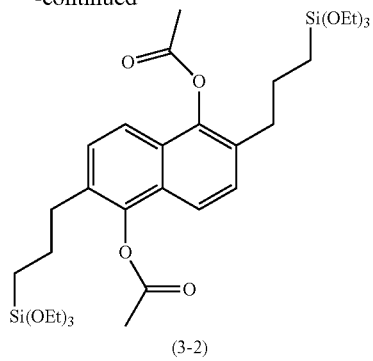

(3-2)

The amount of each reactant used in the first step and the second step to synthesize a final product (3-2) is as listed in Table 3 and Table 4 below:

TABLE 3

Amount of Reactants Used in First Step of Synthesis Example 3

| Synthesis Example 3 | Starting Material (3-0) | Acetyl Chloride | Pyridine | THF | [Ester Group]: [Hydroxyl Group] of Intermediate (3-1) |
|---|---|---|---|---|---|
| First Step | 20 g | 14.37 g | 50 g | 100 ml | 1:1 |

TABLE 4

Amount of Reactants Used in Second Step of Synthesis Example 3

| Synthesis Example 3 | Intermediate (3-2) | Triethoxy silane | PtO$_2$ | Toluene | [Ester Group]: [Ethoxysilyl Group] of Final Product (3-2) |
|---|---|---|---|---|---|
| Second Step | 20 g | 22.3 g | 0.28 g | 250 ml | 1:1 |

NMR data of an intermediate (3-1) and a final product (3-2) obtained through Synthesis Example 3 are as below:

First step of Synthesis Example 3: NMR of intermediate (3-1) (ester group:hydroxyl group=1:1)

$^1$H NMR (400 MHz, CDCl$_3$): δ=7.68 (d, 2H, J=8.5 Hz), 7.19 (d, 2H, J=8.5 Hz), 6.11~6.02 (m, 2H), 5.25~5.10 (m, 4H), 3.45 (d, 4H, J=5.8 Hz), 2.27 (s, 6H)

Second step of Synthesis Example 3: NMR of final product (3-2) (ester group:ethoxysilyl group=1:1)

$^1$H NMR (400 MHz, CDCl$_3$): δ=7.68 (d, 2H, J=8.5 Hz), 7.19 (d, 2H, J=8.5 Hz), 3.70 (q, 12H, J=8.0 Hz), 2.63~2.59 (m, 4H), 2.27 (s, 6H), 1.66~1.57 (m, 4H), 1.13 (t, 18H, J=8.0 Hz), 0.60~0.56 (m, 4H)

Synthesis Example 4: Synthesis of Cardo Compound Having Active Ester and Ethoxysilyl Group (Preparation Method 1)

Synthesis Example 4 was carried out using the same method as described in Synthesis Example 1, except that the different amounts and types of a starting material and reactants were used. A synthesis scheme of Synthesis Example 4 is as below:

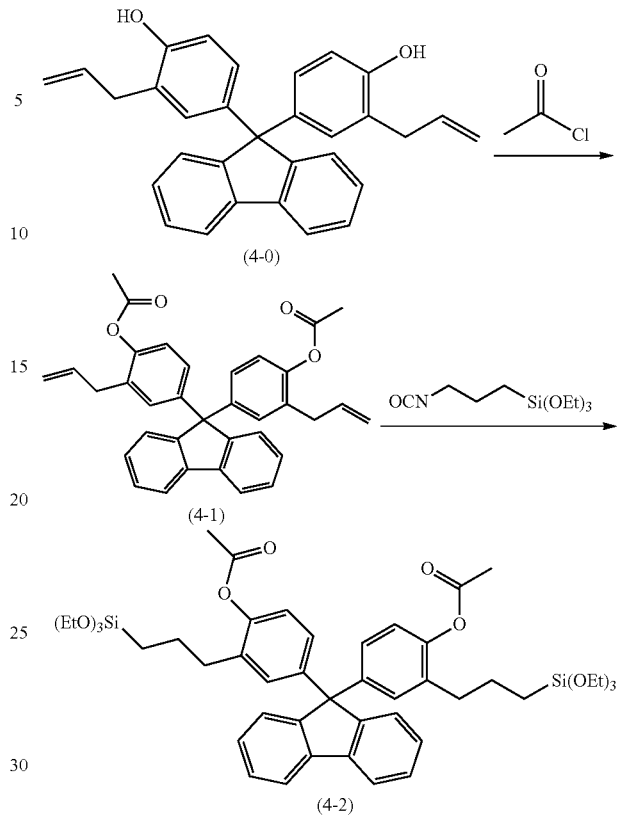

The amount of each reactant used in the first step and the second step to synthesize a final product (4-2) is as listed in Table 5 and Table 6 below:

TABLE 5

Amount of Reactants used in First Step of Synthesis Example 4

| Synthesis Example 4 | Starting Material (4-0) | Acetyl Chloride | Pyridine | THF | [Ester Group]: [Hydroxyl Group] of Intermediate (4-1) |
|---|---|---|---|---|---|
| First Step | 20 g | 8.02 g | 50 g | 100 ml | 1:1 |

TABLE 6

Amount of Reactants Used in Second Step of Synthesis Example 4

| Synthesis Example 4 | Intermediate (4-1) | Triethoxy silane | PtO$_2$ | Toluene | [Ester Group]: [Ethoxysilyl Group] of Final Product (4-2) |
|---|---|---|---|---|---|
| Second Step | 20 g | 14.1 g | 0.21 g | 250 ml | 1:1 |

NMR data of an intermediate (4-1) and a final product (4-2) obtained through Synthesis Example 4 are as below.

First step of Synthesis Example 4: NMR of intermediate (4-1) (ester group:hydroxyl group=1:1)

$^1$H NMR (400 MHz, CDCl$_3$): δ=7.74 (d, 2H, J=7.2 Hz), 7.36~7.22 (m, 6H), 6.96 (d, 2H, J=2.4 Hz), 6.88 (dd, 2H, J=2.4, 6.0 Hz), 6.62 (d, 2H, J=8.4 Hz), 5.97~5.87 (m, 2H), 5.09~5.04 (m, 4H), 3.48 (d, 4H, J=6.0 Hz), 2.27 (s, 6H)

Second step of Synthesis Example 4: NMR of final product (4-2) (ester group:ethoxysilyl group=1:1)

$^1$H NMR (400 MHz, CDCl$_3$): δ=7.74 (d, 2H, J=7.2 Hz), 7.36~7.22 (m, 6H), 6.96 (d, 2H, J=2.4 Hz), 6.88 (dd, 2H, J=2.4, 6.0 Hz), 6.62 (d, 2H, J=8.4 Hz), 3.70 (q, 12H, J=8.0 Hz), 2.63~2.60 (m, 4H), 2.27 (s, 6H), 1.67~1.57 (m, 4H), 1.13 (t, 18H, J=8.0 Hz), 0.61~0.56 (m, 4H)

Synthesis Example 5: Synthesis of Tetraphenylmethane Compound Having Active Ester and Ethoxysilyl Group (Preparation Method 1)

Synthesis Example 5 was carried out using the same method as described in Synthesis Example 1, except that the different amounts and types of a starting material and reactants were used. A synthesis scheme of Synthesis Example 5 is as below:

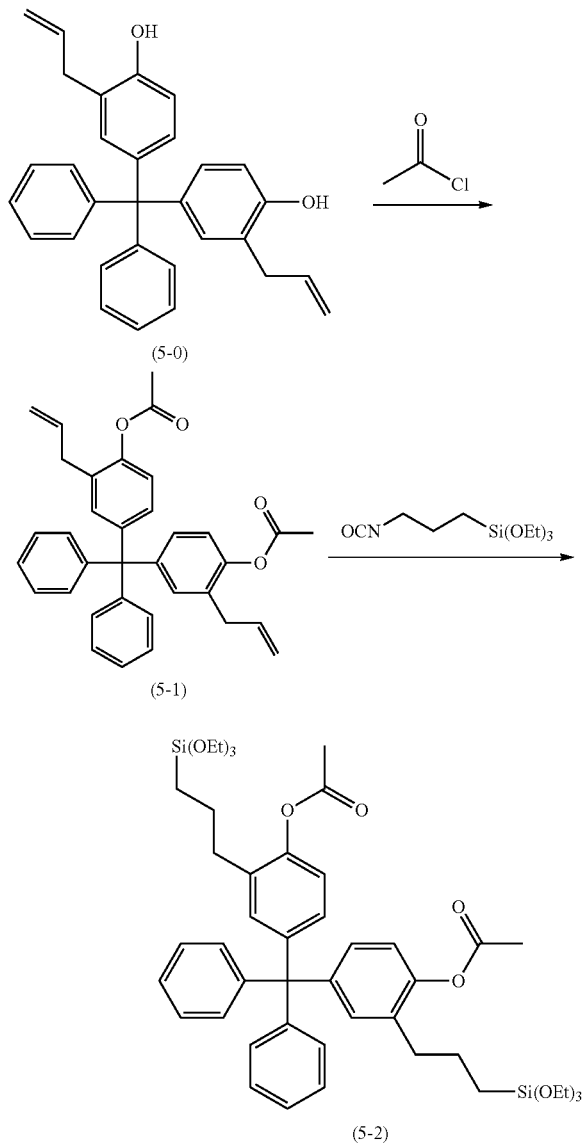

The amount of each reactant used in the first step and the second step to synthesize a final product (5-2) is as listed in Table 7 and Table 8 below:

TABLE 7

Amount of Reactants Used in First Step of Synthesis Example 5

| Synthesis Example 5 | Starting Material (5-0) | Acetyl Chloride | Pyridine | THF | [Ester Group]: [Hydroxyl Group] of Intermediate (5-1) |
|---|---|---|---|---|---|
| First Step | 20 g | 7.99 g | 50 g | 100 ml | 1:1 |

TABLE 8

Amount of Reactants Used in Second Step of Synthesis Example 5

| Synthesis Example 5 | Intermediate (5-1) | Triethoxy silane | PtO$_2$ | Toluene | [Ester Group]: [Ethoxysilyl Group] of Final Product (5-2) |
|---|---|---|---|---|---|
| Second Step | 20 g | 14.0 g | 0.18 g | 250 ml | 1:1 |

NMR data of an intermediate (5-1) and a final product (5-2) obtained through Synthesis Example 5 are as below:

First step of Synthesis Example 5: NMR of intermediate (5-1) (ester group:hydroxyl group=1:1)

$^1$H NMR (400 MHz, CDCl$_3$): δ=7.26-7.00 (m, 12H), 6.86-6.71 (m, 4H), 6.03~5.94 (m, 2H), 5.12~5.05 (m, 4H), 3.37~3.30 (m, 4H), 2.28 (s, 6H)

Second step of Synthesis Example 5: NMR of final product (5-2) (ester group:alkoxysilyl group=1:1)

$^1$H NMR (400 MHz, CDCl$_3$): δ=7.26-7.00 (m, 12H), 6.86-6.71 (m, 4H), 3.70 (q, 12H, J=8.0 Hz), 2.63~2.60 (m, 4H), 2.28 (s, 6H), 1.67~1.57 (m, 4H), 1.13 (t, 18H, J=8.0 Hz), 0.61~0.56 (m, 4H)

Synthesis Example 6: Synthesis of Phenol Novolac Having Active Ester and Ethoxysilyl Group (Preparation Method 2)

(1) 2-1 Step 20 g of phenol novolac (6-0), 100 ml of THF, 50 g of pyridine, and 9.5 g of acetic anhydride were added into a two-neck flask and stirred at a room temperature for 1 hour. After the reaction is completed, THF and pyridine were removed, 300 ml of ethyl acetate was added and the mixture was worked up with H$_2$O. Residual H$_2$O was removed by adding MgSO$_4$ to an organic layer, the mixture was filtered using a Celite filter and was vaporized and dried, and an intermediate (6-1) having a ratio of ester group to hydroxyl group of 1:1 was obtained. NMR data of the intermediate (6-1) is as below:

$^1$H NMR (400 MHz, DMSO): δ=9.40-9.17 (m, 3.52H) 7.26-6.63 (m, 21.68H), 3.97-3.71 (m, 10.5 6H), 2.27-2.08 (m, 9.92H)

(2) 2-2 Step 20 g of the intermediate (6-1) synthesized in the 2-1 step and 50 ml of THF were added into a two-neck flask and were stirred at a room temperature. Thereafter, 23.1 g of 3-(triethoxysilyl)propylisocyanate was slowly added to the mixture at a room temperature for 10 minutes and the mixture was heated and stirred at a temperature of 50° C. for 5 hours. After the reaction is completed, the mixture was cooled at a room temperature, THF was removed using an evaporator, and the mixture was fully dried using a vacuum pump, thereby obtaining a final product (6-2) having a ratio of ester group to hydroxyl group of 1:1.

NMR data of the final product (6-2) is as below:

$^1$H NMR (400 MHz, DMSO): δ=7.80-7.71 (m, 2.32H), 7.26-6.63 (m, 21.68H), 3.97-3.71 (m, 27.56H), 3.06-3.01

(m, 5.85H), 2.27-2.08 (m, 9.90H), 1.57-1.46 (m, 6.06H), 1.20-1.10 (m, 27.23H), 0.64-0.55 (m, 5.88H)

A synthesis scheme of Synthesis Example 6 is as below:

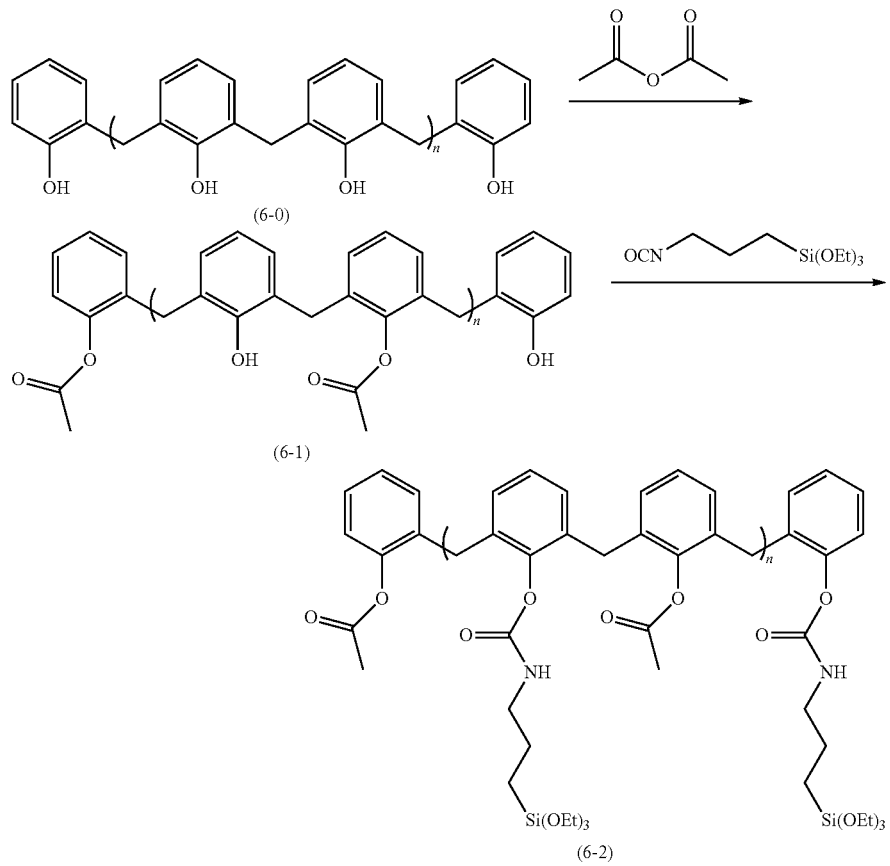

Synthesis Examples 7 and 8: Synthesis of Phenol Novolac Having Active Ester and Ethoxysilyl Group (Preparation Method 2)

The first and second steps of Synthesis Examples 7 and 8 were carried out using the same method as described in Synthesis Example 6, except that the amount of reactants was different. Ratios of an ester group: an alkoxysilyl group of final products (7-2) and (8-2) synthesized in Synthesis Examples 7 and 8 are 10:1 and 2.63:1, respectively, and the amount of each reactant used in each synthetizing step is as listed in Tables 9 and 10 below.

TABLE 9

Amount of Reactants Used in First Steps of Synthesis Examples 7 and 8

| Synthesis Example (First Step) | Phenol Novolac (6-0) | Acetyl Chloride | Pyridine | THF | [Ester Group]: [Hydroxyl Group] of Intermediate |
|---|---|---|---|---|---|
| 7 | 20 g | 17.34 g | 50 g | 50 ml | 10:1 |
| 8 | 20 g | 13.83 g | 50 g | 50 ml | 2.63:1 |

TABLE 10

Amount of Reactants Used in Second Steps of Synthesis Examples 7 and 8

| Synthesis Example (Second Step) | Intermediate | 3-(triethoxysilyl) propyl isocyanate | [Ester Group]: [Ethoxysilyl Group] of Final Compound |
|---|---|---|---|
| 7 | 20 g | 3.08 g | 10:1 |
| 8 | 20 g | 9.86 g | 2.63:1 |

NMR data of an intermediate and a final product obtained through Synthesis Example 7 are as below:

First step of Synthesis Example 7: NMR of intermediate (ester group:hydroxyl group=10:1)

$^1$H NMR (400 MHz, DMSO): δ=9.40-9.17 (m, 0.59H) 7.26-6.63 (m, 21.68H), 3.97-3.71 (m, 10.01H), 2.27-2.08 (m, 18.05H)

Second step of Synthesis Example 7: NMR of final product (ester group:ethoxysilyl group=10:1)

$^1$H NMR (400 MHz, DMSO): δ=7.27-6.63 (m, 21.68H), 3.97-3.59 (m, 13.17H), 3.05-3.01 (m, 1.23H), 2.27-1.90 (m, 18.07H), 1.57-1.46 (m, 1.34H), 1.20-1.10 (m, 5.39H), 0.64-0.55 (m, 1.19H)

NMR data of an intermediate and a final product obtained through Synthesis Example 8 are as below:

First step of Synthesis Example 8: NMR of intermediate (ester group:hydroxyl group=2.63:1)

$^1$H NMR (400 MHz, DMSO): δ=9.40-9.17 (m, 1.98H) 7.26-6.63 (m, 21.68H), 3.97-3.71 (m, 12.41H), 2.27-2.08 (m, 14.52H)

Second step of Synthesis Example 8: NMR of final product (ester group:ethoxysilyl group=2.63:1)

$^1$H NMR (400 MHz, DMSO): δ=7.80-7.71 (m, 1.34H), 7.26-6.63 (m, 21.68H), 3.99-3.71 (m, 20.12H), 3.07-3.01 (m, 3.50H), 2.28-2.07 (m, 14.17H), 1.57-1.46 (m, 3.69H), 1.20-1.10 (m, 13.01H), 0.64-0.55 (m, 3.61H)

Synthesis Examples 9 and 10: Synthesis of Phenol Novolac Having Active Ester and Methoxysilyl Group (Preparation Method 2)

The first and second steps of Synthesis Examples 9 and 10 were carried out using the same method as described in Synthesis Example 6, except that the different amounts of reactants and 3-(trimethoxysilyl)propylisocyanate were used. Ratios of anester group:an methoxysilyl group of final products synthesized in Synthesis Examples 9 and 10 are 2.87:1 and 1.30:1, respectively, and the amount of each reactant used in each synthetizing step is as listed in tables below:

TABLE 11

Amount of Reactants Used in First Steps of Synthesis Examples 9 and 10

| Synthesis Example (First Step) | Phenol Novolac (6-0) | Acetic Anhydride | Pyridine | THF | [Ester Group]: [Hydroxyl Group] of Intermediate |
|---|---|---|---|---|---|
| 9 | 20 g | 14.15 g | 50 ml | 100 ml | 2.87:1 |
| 10 | 20 g | 10.79 g | 50 ml | 100 ml | 1.30:1 |

TABLE 12

Amount of Reactants Used in Second Steps of Synthesis Examples 9 and 10

| Synthesis Example (Second Step) | Intermediate | 3-(trimethoxysilyl) propyl isocyanate | [Ester Group]: [Methoxysilyl Group] of Final Compound |
|---|---|---|---|
| 9 | 20 g | 7.63 g | 2.87:1 |
| 10 | 20 g | 13.60 g | 1.30:1 |

NMR data of an intermediate and a final product obtained through Synthesis Example 9 are as below:

First step of Synthesis Example 9: NMR of intermediate (ester group:hydroxyl group=2.87:1)

$^1$H NMR (400 MHz, DMSO): δ=9.40-9.17 (m, 1.59H) 7.26-6.63 (m, 21.68H), 3.97-3.71 (m, 9.63H), 2.27-2.08 (m, 14.38H)

Second step of Synthesis Example 9: NMR of final product (ester group:methoxysilyl group=2.87:1)

$^1$H NMR (400 MHz, DMSO): δ=7.81-7.71 (m, 1.68H), 7.27-6.63 (m, 21.68H), 3.97-3.35 (m, 25.81H), 3.05-3.01 (m, 3.44H), 2.27-1.90 (m, 14.50H), 1.57-1.46 (m, 3.63H), 0.64-0.55 (m, 3.37H)

NMR data of an intermediate and a final product obtained through Synthesis Example 10 are as below:

First step of Synthesis Example 10: NMR of intermediate (ester group:hydroxyl group=1.3:1)

$^1$H NMR (400 MHz, DMSO): δ=9.40-9.17 (m, 2.25H) 7.26-6.63 (m, 21.68H), 3.97-3.71 (m, 9.55H), 2.27-2.08 (m, 11.39H)

Second step of Synthesis Example 10: NMR of final product (ester group:methoxysilyl group=1.3:1)

$^1$H NMR (400 MHz, DMSO): δ=7.80-7.70 (m, 1.99H), 7.27-6.63 (m, 21.68H), 3.97-3.59 (m, 36.12H), 3.05-3.01 (m, 5.24H), 2.27-1.90 (m, 10.36H), 1.57-1.46 (m, 5.54), 0.64-0.55 (m, 5.32H)

Synthesis Example 11: Synthesis of Binaphthalene Having Active Ester and Ethoxysilyl Group (Preparation Method 2)

Synthesis Example 11 was carried out using the same method as described in Synthesis Example 6 described above, except that the different amounts of a starting material and reactants were different. A synthesis scheme of Synthesis Example 11 is as below:

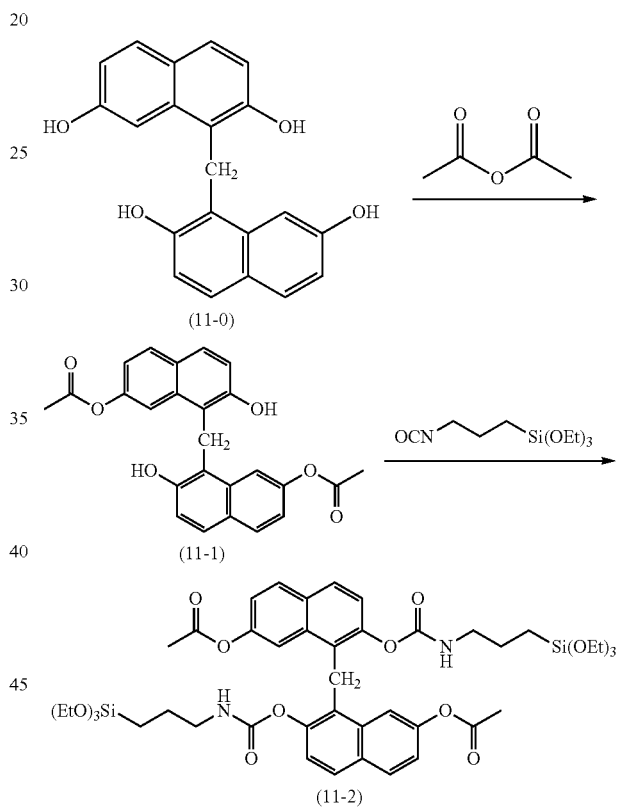

The amount of each reactant used in the first step and the second step to synthesize a final product (11-2) is as listed in Table 13 and Table 14 below:

TABLE 13

Amount of Reactants Used in First Step of Synthesis Example 11

| Synthesis Example 11 | Starting Material (11-0) | Acetic Anhydride | Pyridine | THF | [Ester Group]: [Hydroxyl Group] of Intermediate (11-1) |
|---|---|---|---|---|---|
| First Step | 20 g | 12.3 g | 50 g | 100 ml | 1:1 |

TABLE 14

Amount of Reactants Used in Second Step of Synthesis Example 11

| Synthesis Example 11 | Intermediate (11-1) | 3-(triethoxysilyl) propyl isocyanate | [Ester Group]: [Ethoxysilyl Group] of Final Product (11-2) |
|---|---|---|---|
| Second Step | 20 g | 23.8 g | 1:1 |

NMR data of an intermediate (11-1) and a final product (11-2) obtained through Synthesis Example 11 are as below:

First step of Synthesis Example 11: NMR of intermediate (11-1) (ester group:hydroxyl group=1:1)

$^1$H NMR (400 MHz, DMSO): δ=9.50~9.11 (br s, 2H), 7.78-7.66 (m, 4H), 7.34-7.25 (m, 4H), 6.92-6.89 (m, 2H), 4.76 (s, 2H), 2.16 (s, 6H)

Second step of Synthesis Example 11: NMR of final product (11-2) (ester group:ethoxysilyl group=1:1)

$^1$H NMR (400 MHz, DMSO): δ=7.78-7.66 (m, 4H), 7.34-7.25 (m, 4H), 6.92-6.89 (m, 2H), 4.76 (s, 2H), 3.84-3.78 (m, 12H), 3.36-3.25 (m, 4H), 2.27 (s, 6H), 1.75-1.70 (m, 4H), 1.22 (t, 18H, J=7.2 Hz), 0.67-0.60 (m, 4H)

Synthesis Example 12: Synthesis of Triphenylmethane Having Active Ester and Ethoxysilyl Group (Preparation Method 2)

Synthesis Example 12 was carried out using the same method as described in Synthesis Example 6 described above, except that different amounts of a starting material and reactants were used. A synthesis scheme of Synthesis Example 12 is as below:

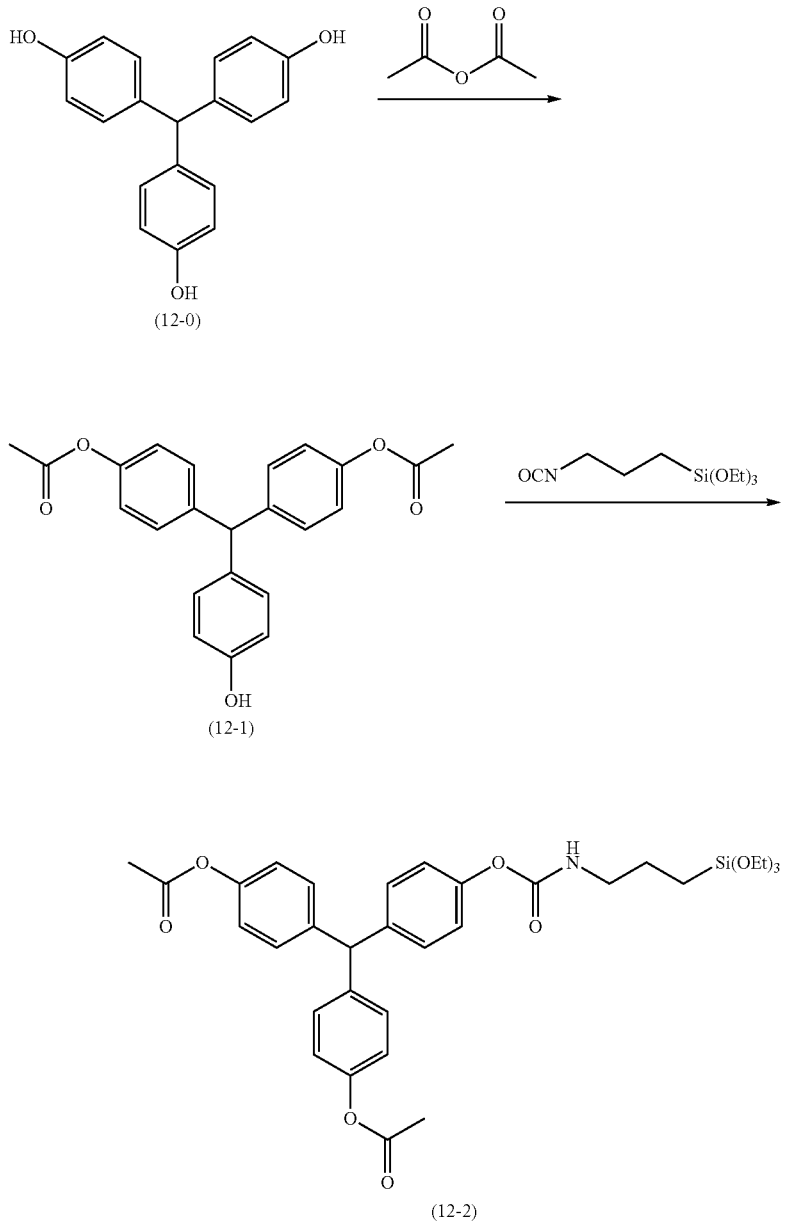

The amount of each reactant used in the first step and the second step to synthesize a final product (12-2) are as listed in Table 15 and Table 16 below:

TABLE 15

Amount of Reactants Used in First Step of Synthesis Example 12

| Synthesis Example 12 | Starting Material (12-0) | Acetic Anhydride | Pyridine | THF | [Ester Group]: [Hydroxyl Group] of Intermediate (12-1) |
|---|---|---|---|---|---|
| First Step | 20 g | 14.0 g | 50 g | 100 ml | 2:1 |

TABLE 16

Amount of Reactants Used in Second Step of Synthesis Example 12

| Synthesis Example 12 | Intermediate (12-1) | 3-(triethoxysilyl) propyl isocyanate | [Ester Group]: [Ethoxysilyl Group] of Final Product (12-2) |
|---|---|---|---|
| Second Step | 20 g | 13.1 g | 2:1 |

NMR data of an intermediate (12-1) and a final product (12-2) obtained through Synthesis Example 12 are as below:

First step of Synthesis Example 12: NMR of intermediate (12-1) (ester group:hydroxyl group=2:1)

$^1$H NMR (400 MHz, DMSO): δ=9.27 (br s, 1H), 7.21-7.10 (m, 10H), 6.75 (s, 2H), 3.28 (s, 1H), 2.17 (s, 6H)

Second step of Synthesis Example 12: NMR of final product (12-2) (ester group:ethoxysilyl group=2:1)

$^1$H NMR (400 MHz, DMSO): δ=7.21-7.10 (m, 10H), 6.75 (s, 2H), 3.70 (q, 6H, J=8.0 Hz), 3.28 (s, 1H), 2.63~2.60 (m, 2H), 2.17 (s, 6H), 1.67~1.57 (m, 2H), 1.13 (t, 9H, J=8.0 Hz), 0.61~0.56 (m, 2H)

Synthesis Example 13: Synthesis of Tetramethylethane Compound Having Active Ester and Ethoxysilyl Group (Preparation Method 2)

Synthesis Example 13 was carried out using the same method as described in Synthesis Example 6 described above, except that different amounts of a starting material and reactants were used. A synthesis scheme of Synthesis Example 13 is as below:

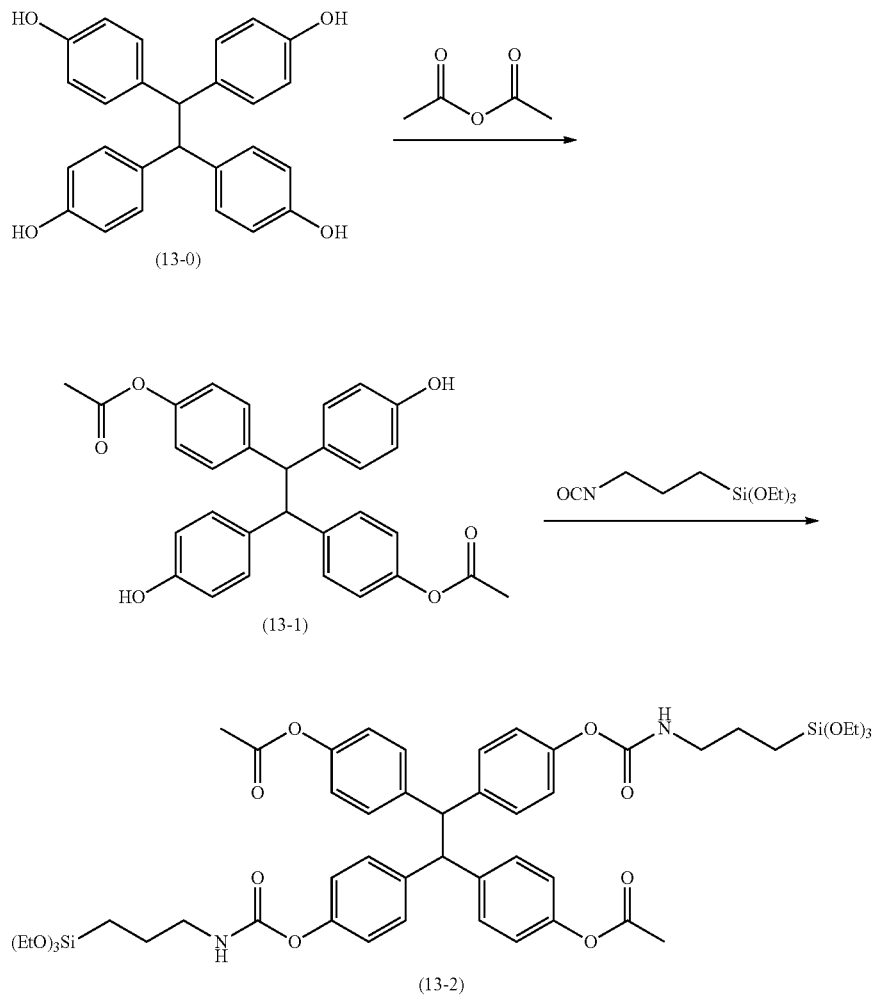

The amount of each reactant used in the first step and the second step to synthesize a final product (13-2) are as listed in Table 17 and Table 18 below:

TABLE 17

Amount of Reactants Used in First Step of Synthesis Example 13

| Synthesis Example 13 | Starting Material (13-0) | Acetic Anhydride | Pyridine | THF | [Ester Group]: [Hydroxyl Group] of Intermediate (13-1) |
|---|---|---|---|---|---|
| First Step | 20 g | 10.2 g | 50 g | 100 ml | 1:1 |

TABLE 18

Amount of Reactants Used in Second Step of Synthesis Example 13

| Synthesis Example 13 | Intermediate (13-1) | 3-(triethoxysilyl) propyl isocyanate | [Ester Group]: [Ethoxysilyl Group] of Final Product (13-2) |
|---|---|---|---|
| Second Step | 20 g | 20.5 g | 1:1 |

NMR data of an intermediate (13-1) and a final product (13-2) obtained through Synthesis Example 13 are as below:

First step of Synthesis Example 13: NMR of intermediate (13-1) (ester group:hydroxyl group=1:1)

$^1$H NMR (400 MHz, DMSO): δ=9.49-9.11 (br s, 2H), 7.31-7.11 (m, 12H), 6.68-6.55 (m, 4H), 4.54 (s, 2H), 2.26 (s, 6H)

Second step of Synthesis Example 13: NMR of final product (13-2) (ester group:ethoxysilyl group=1:1)

$^1$H NMR (400 MHz, DMSO): δ=7.31-7.11 (m, 12H), 6.68-6.55 (m, 4H), 4.54 (s, 2H), 3.83-3.77 (m, 12H), 3.25-3.23 (m, 4H), 1.74-1.66 (m, 4H), 1.24 (t, 18H, J=7.2 Hz), 2.26 (s, 6H), 0.70-0.66 (m, 4H)

Synthesis Example 14: Synthesis of Cresol Novolac Compound Having Active Ester and Ethoxysilyl Group (Preparation Method 2)

Synthesis Example 14 was carried out using the same method as described in Synthesis Example 6 described above, except that different amounts of a starting material and reactants were used. A synthesis scheme of Synthesis Example 14 is as below:

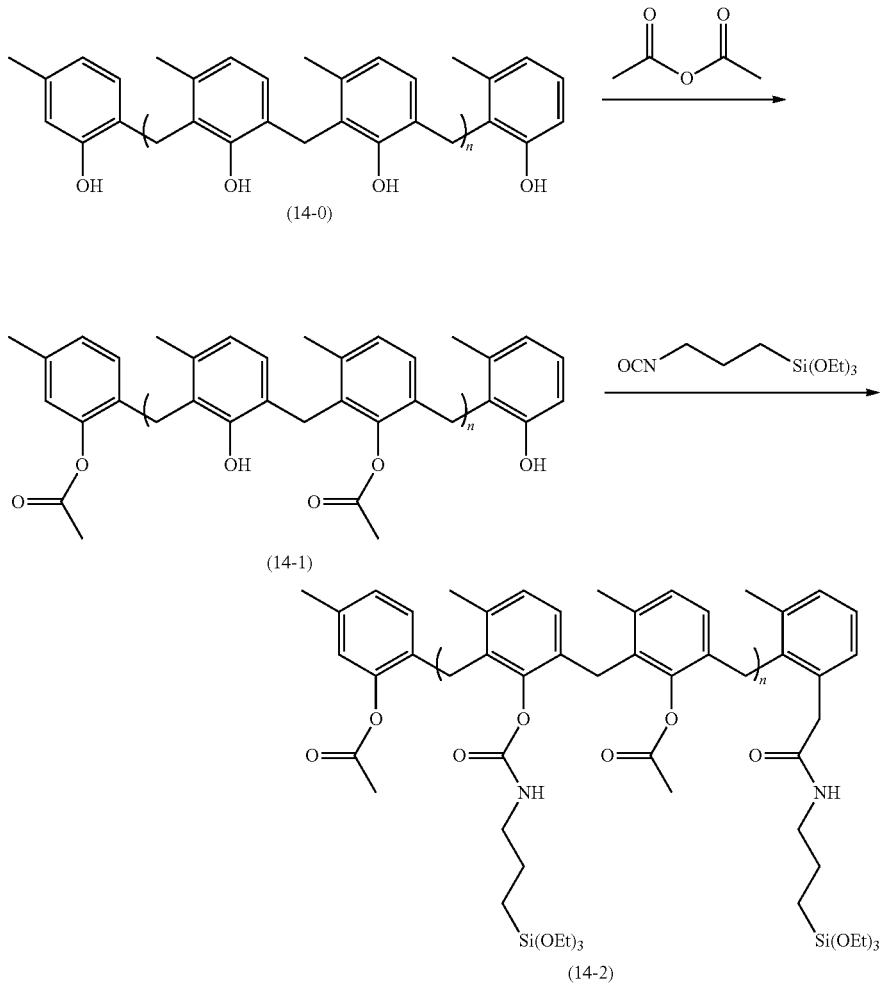

The amount of each reactant used in the first step and the second step to synthesize a final product (14-2) is as listed in Table 19 and Table 20 below:

TABLE 19

Amount of Reactants Used in First Step of Synthesis Example 14

| Synthesis Example 14 | Starting Material (14-0) | Acetic Anhydride | Pyridine | THF | [Ester Group]:[Hydroxyl Group] of Intermediate (14-1) |
|---|---|---|---|---|---|
| First Step | 20 g | 8.7 g | 50 g | 100 ml | 1:1 |

TABLE 20

Amount of Reactants Used in Second Step of Synthesis Example 14

| Synthesis Example 14 | Intermediate (14-1) | 3-(Triethoxysilyl)Propyl isocyanate | [Ester Group]:[Ethoxysilyl Group] of Final Product (14-2) |
|---|---|---|---|
| Second Step | 20 g | 17.7 g | 1:1 |

NMR data of an intermediate (14-1) and a final product (14-2) obtained through Synthesis Example 14 are as below:

First step of Synthesis Example 14: NMR of intermediate (14-1) (ester group:hydroxyl group=1:1)

$^1$H NMR (400 MHz, DMSO): δ=9.32 (br.s, 1.85H), 7.02-6.89 (m, 10H), 4.24-3.36 (m, 6.25H), 2.29-2.0 6 (m, 20.28H)

Second step of Synthesis Example 14: NMR of final product (14-2) (ester group:ethoxysilyl group=1:1)

$^1$H NMR (400 MHz, DMSO): δ=7.77 (br.s, 1.97H), 7.02-6.89 (m, 10H), 4.24-3.36 (m, 19.25H), 3.18-3.01 (m, 4.58H), 2.29-2.06 (m, 19.88H), 1.73-1.40 (m, 4.33H), 1.20-1.14 (m, 19.99H), 0.64-0.50 (m, 4.11H)

Synthesis Example 15: Synthesis of Bisphenol A Novolac Compound Having Active Ester and Ethoxysilyl Group (Preparation Method 2)

Synthesis Example 15 was carried out using the same method as described in Synthesis Example 6 described above, except that different amounts of a starting material and reactants were used. A synthesis scheme of Synthesis Example 15 is as below:

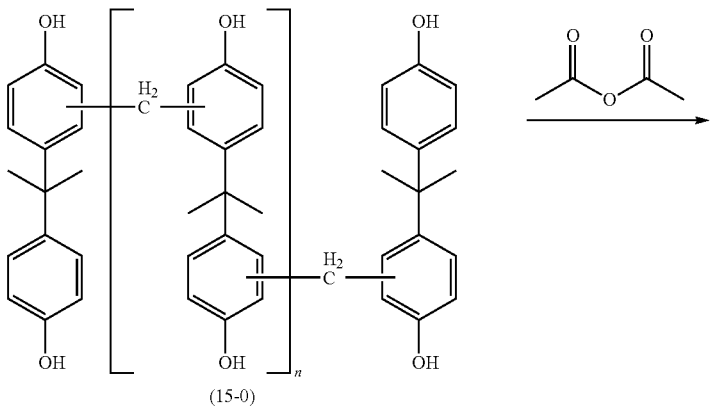

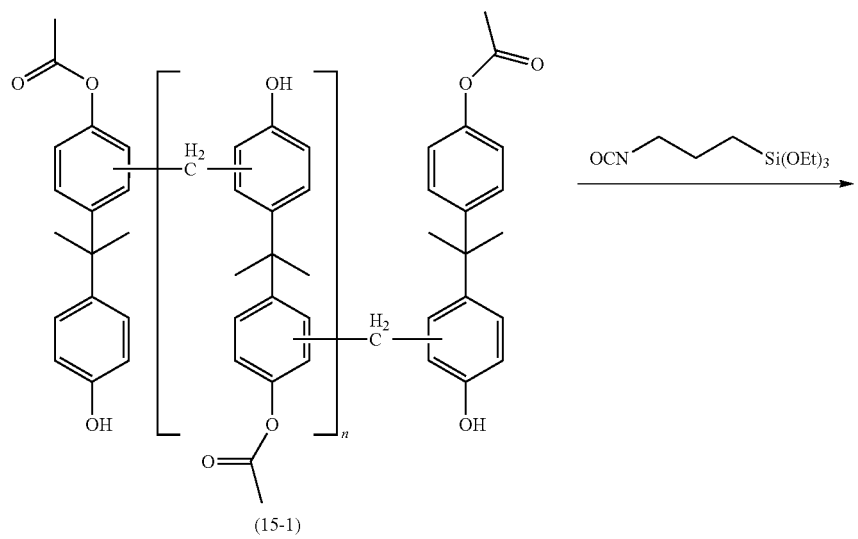

-continued

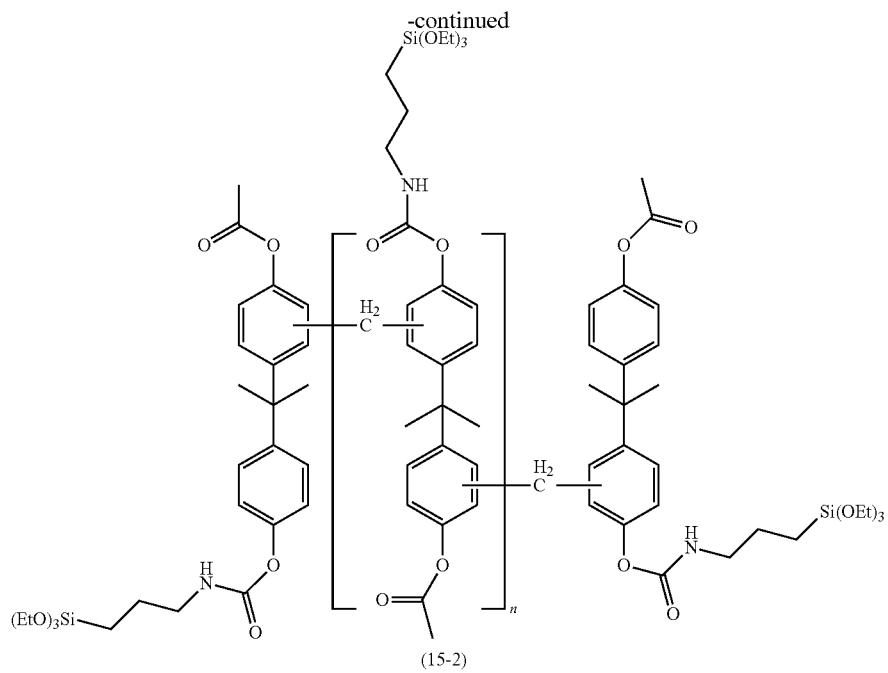

(15-2)

The amount of each reactant used in the first step and the second step to synthesize a final product (15-2) are as listed in Table 21 and Table 22 below:

TABLE 21

Amount of Reactants Used in First Step of Synthesis Example 15

| Synthesis Example 15 | Starting Material (15-0) | Acetic Anhydride | Pyridine | THF | [Ester Group]: [Hydroxyl Group] of Intermediate (15-1) |
|---|---|---|---|---|---|
| First Step | 20 g | 8.7 g | 50 g | 100 ml | 1:1 |

TABLE 22

Amount of Reactants Used in Second Step of Synthesis Example 15

| Synthesis Example 15 | Intermediate (15-1) | 3-(triethoxysilyl) propyl isocyanate | [Ester Group]: [Ethoxysilyl Group] of Final Product (15-2) |
|---|---|---|---|
| Second Step | 20 g | 17.7 g | 1:1 |

NMR data of an intermediate (15-1) and a final product (15-2) obtained through Synthesis Example 15 are as below:

First step of Synthesis Example 15: NMR of intermediate (15-1) (ester group:hydroxyl group=1:1)

$^1$H NMR (400 MHz, DMSO): δ=9.31 (br.s, 4.45H), 7.76 (br.s, 4.81H), 7.29-6.75 (m, 32.10H), 4.22-3.79 (m, 12.12H), 2.27~2.05 (m, 15.82H), 1.62-1.39 (m, 35.86H)

Second step of Synthesis Example 15: NMR of final product (15-2) (ester group:ethoxysilyl group=1:1)

$^1$H NMR (400 MHz, DMSO): δ=7.76 (br.s, 4.81H), 7.29-6.75 (m, 32.10H), 4.22-3.79 (m, 44.12H), 3.36-3.28 (m, 12.12H), 2.27~2.05 (m, 15.82H), 1.62-1.39 (m, 45.86H), 1.20-1.07 (m, 49.98H), 0.67-0.51 (m, 10.02H)

Synthesis Example 16: Synthesis of Phenol Novolac Having Active Ester and Ethoxysilyl Group (Preparation Method 3)

(1) First Step 20 g of phenol novolac (6-0), 11.3 g of allylbromide, and 200 ml of THF were added into a two-neck flask and stirred at a room temperature. Thereafter, a solution of 7.5 g of sodium hydroxide dissolved in 200 ml of H$_2$O was slowly added at a room temperature for 1 hour, and the mixture was stirred for 4 hours. After the reaction is completed, THF was removed using an evaporator, 400 ml of ethyl acetate was added, and the mixture was worked up with H$_2$O. Residual H$_2$O was removed by adding MgSO$_4$ to an organic layer, the mixture was filtered using a Celite filler, and was vaporized and dried, thereby obtaining an intermediate (16-1) having a ratio of ester group to hydroxyl group of 1:1. NMR data of the intermediate (16-1) is as below:

First step of Synthesis Example 16: NMR of intermediate (16-1) (hydroxyl group:allyl group=1:1)

$^1$H NMR (400 MHz, DMSO): δ=7.26-6.80 (m, 21.68H), 6.05-5.91 (m, 3.73H), 5.39-5.20 (m, 6.65H), 4.58-4.49 (m, 5.52H), 3.93-3.65 (m, 9.71H)

(2) Second Step 20 g of the intermediate (16-1) synthesized in the first step, 100 ml of THF, and 50 g of pyridine were added into a two-neck flask and were stirred at a room temperature. Thereafter, 10.5 g of an acetic anhydride was slowly added at a room temperature for 10 minutes, and the mixture was stirred for 1 hour. After the reaction is completed, THF and pyridine were removed using an evaporator, 300 ml of ethylacetate was added, and the mixture was worked up with H$_2$O. Residual H$_2$O was removed by adding MgSO$_4$ to an organic layer, the mixture was filtered using a Celite filler, and was vaporized and dried, thereby obtaining an intermediate (16-2) having a ratio of ester group to allyl group of 1:1. NMR data of the intermediate (16-2) is as below:

Second step of Synthesis Example 16: NMR of intermediate (16-2) (ester group:allyl group=1:1)

$^1$H NMR (400 MHz, DMSO): δ=7.27-6.80 (m, 21.68H), 6.05-5.92 (m, 3.71H), 5.39-5.20 (m, 6.63H), 4.57-4.49 (m, 5.46H), 3.92-3.66 (m, 9.65H), 2.25-1.96 (m, 9.96H)

(3) Third Step 20 g of the intermediate (16-2) synthesized in the second step, 0.30 g of PtO$_2$, 12.1 g of triethoxysilane, and 250 ml of toluene were added into a flask and were stirred at a room temperature for 5 minutes. Thereafter, the mixture was heated and stirred at a temperature of 80° C. for 12 hours, was cooled to a room temperature, and an inorganic component was removed by filtering the mixture using a Celite filter. Then, toluene was removed by vaporizing and drying the mixture, and the mixture was fully dried using a vacuum pump, thereby obtaining a final product (16-3). NMR data of the final product (16-3) is as below:

Third step of Synthesis Example 16: NMR of final product (16-3) (ester group:ethoxysilyl group=1:1)

$^1$H NMR (400 MHz, DMSO): δ=7.27-6.76 (m, 21.68H), 3.92-3.72 (m, 43.90H), 2.23-2.09 (m, 9.81H), 1.72-1.69 (m, 6.25H), 1.17-1.04 (m, 40.45H), 0.68-0.65 (m, 7.40H)

A synthesis scheme of Synthesis Example 16 is as below:

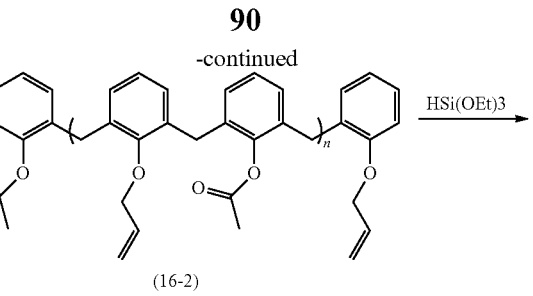

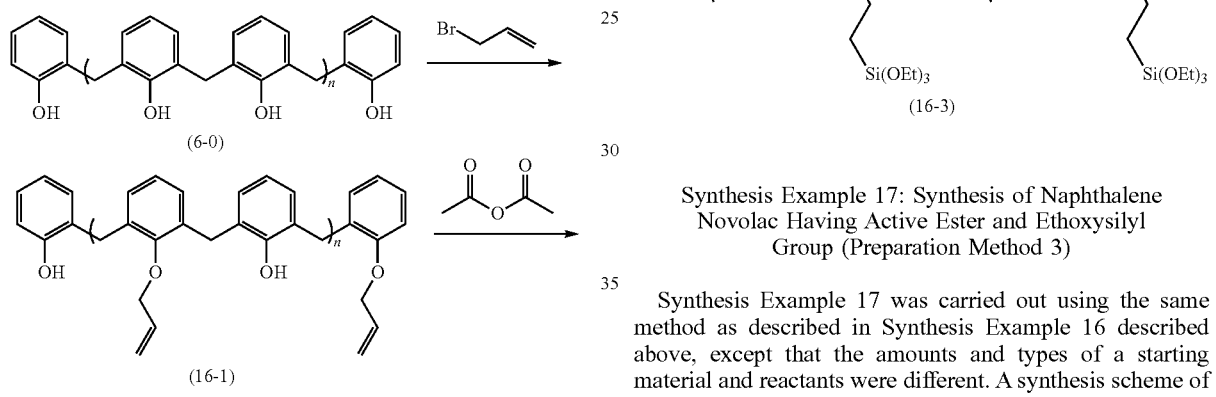

Synthesis Example 17: Synthesis of Naphthalene Novolac Having Active Ester and Ethoxysilyl Group (Preparation Method 3)

Synthesis Example 17 was carried out using the same method as described in Synthesis Example 16 described above, except that the amounts and types of a starting material and reactants were different. A synthesis scheme of Synthesis Example 17 is as below:

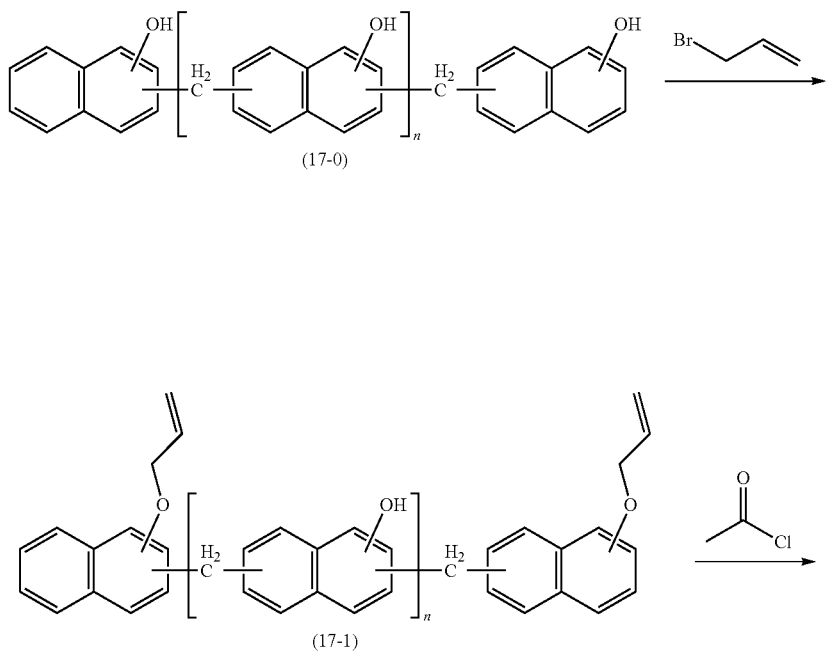

-continued

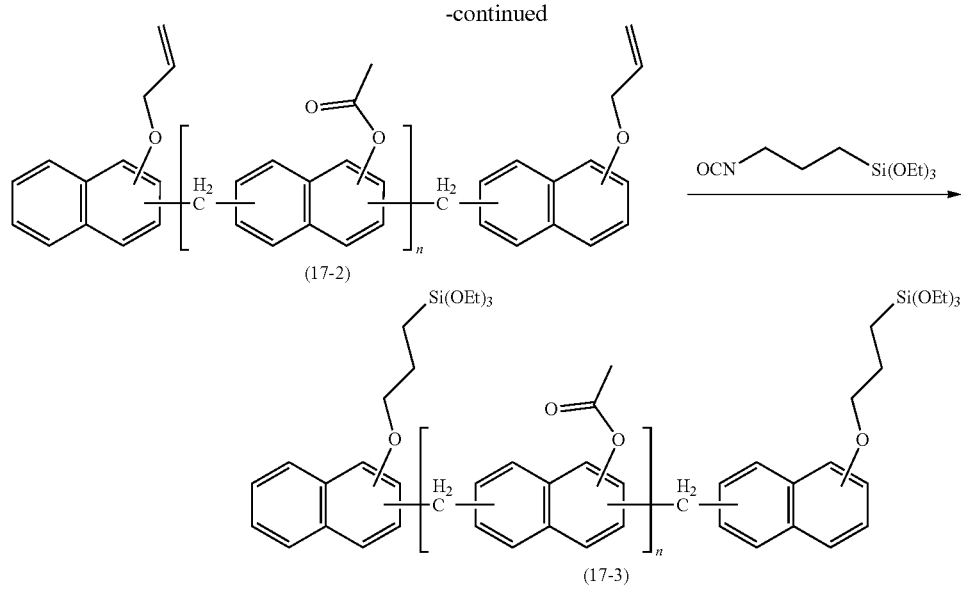

(17-2)

(17-3)

The amount of each reactant used in the first step, the second step, and the third step to synthesize a final product (17-3) is as listed in Tables 23, 24, and 25 below:

TABLE 23

Amount of Reactants Used in First Step of Synthesis Example 17

| Synthesis Example 17 | Starting Material (17-0) | Allyl bromide | Sodium Hydroxide | THF | $H_2O$ | [Hydroxyl Group]:[Allyl Group] of Intermediate (17-1) |
|---|---|---|---|---|---|---|
| First Step | 20 g | 8.8 g | 5.8 g | 200 ml | 200 ml | 1:1 |

TABLE 24

Amount of Reactants Used in Second Step of Synthesis Example 17

| Synthesis Example 17 | Intermediate (17-1) | Acetyl Chloride | Pyridine | THF | [Ester Group]:[Allyl Group] of Intermediate (17-2) |
|---|---|---|---|---|---|
| Second Step | 20 g | 5.69 g | 50 g | 100 ml | 1:1 |

TABLE 25

Amount of Reactants Used in Third Step of Synthesis Example 17

| Synthesis Example 17 | Intermediate (17-2) | Triethoxy silane | $PtO_2$ | Toluene | [Ester Group]:[Ethoxysilyl Group] of Final Product (17-3) |
|---|---|---|---|---|---|
| Third Step | 20 g | 10.0 g | 0.25 g | 250 g | 1:1 |

NMR data of intermediates (17-1 and 17-2) and a final product (17-3) obtained through Synthesis Example 17 are as below:

First step of Synthesis Example 17: NMR of intermediate (17-1) (hydroxyl group:allyl group=1:1)

$^1$H NMR (400 MHz, DMSO): δ=8.03-7.51 (m, 11.99H), 7.39-6.85 (m, 15.43H), 6.05-6.01 (m, 2.48H), 5.40-5.20 (m, 5.46H), 4.50-4.46 (m, 5.39H), 4.12-3.43 (m, 14.9H)

Second step of Synthesis Example 17: NMR of intermediate (17-2) (ester group:allyl group=1:1)

$^1$H NMR (400 MHz, DMSO): δ=8.03-7.51 (m, 11.99H), 7.39-6.85 (m, 15.43H), 6.05-6.01 (m, 2.48H), 5.40-5.20 (m, 5.46H), 4.50-4.46 (m, 5.39H), 4.13-3.42 (m, 14.9H), 2.29~2.06 (m, 8.14H)

Third step of Synthesis Example 17: NMR of final product (17-3) (ester group:alkoxysilyl group=1:1)

$^1$H NMR (400 MHz, DMSO): δ=8.03-7.51 (m, 11.99H), 7.39-6.85 (m, 15.43H), 4.12-3.40 (m, 29.75H), 2.29~2.06 (m, 14.14H), 1.80-1.69 (m, 5.08H), 1.18-1.04 (m, 21.99H), 0.72-0.61 (m, 4.85H)

(Evaluation of Moisture Absorption Property)

In the compositions of Tables 26-1 and 26-2 below, the compound of the synthesis example, epoxy compound, curing agent and curing catalyst were dissolved in methyl ethyl ketone to have a solid content of 50 wt %, followed by mixing to be a homogeneous solution. Thereafter, the mixture was placed into a vacuum oven heated to 100° C. in order to remove a solvent, and was cured at 120° C. for 2 hours in a hot press heated to 120° C. and at 180° C. for 2 hours in an oven, thereby a sample (8 mm×8 mm×3 mm) was prepared for moisture absorption measurement.

The sample prepared as above was treated in boiling water of 100° C. for 4 hours, and was dried using a kimtech towel. Thereafter, weights of the sample before and after absorbing moisture were measured, and a moisture absorption property was calculated.

TABLE 26-1

Moisture Absorption Property

|  |  | Ex 1 | Ex 2 | Ex 3 | Ex 4 | Ex 5 | Ex 6 | Ex 7 | Ex 8 | Ex 9 | Ex 10 |
|---|---|---|---|---|---|---|---|---|---|---|---|
| NC3000H[(1)] (g) |  | 3 | 3 | 3 | 3 | 3 | 3 | 3 | 3 | 3 | 3 |
| HF-1M[(2)] (g) |  | 1.07 | 1.07 | 1.07 | 1.08 | 1.08 | 1.08 | 1.04 | 1.06 | 1.08 | 1.08 |
| The | SE1 | 0.12 |  |  |  |  |  |  |  |  |  |
| Present | SE2 |  | 0.12 |  |  |  |  |  |  |  |  |
| Compound | SE3 |  |  | 0.12 |  |  |  |  |  |  |  |
| (g) | SE4 |  |  |  | 0.12 |  |  |  |  |  |  |
|  | SE5 |  |  |  |  | 0.12 |  |  |  |  |  |
|  | SE6 |  |  |  |  |  | 0.12 |  |  |  |  |
|  | SE7 |  |  |  |  |  |  | 0.11 |  |  |  |
|  | SE8 |  |  |  |  |  |  |  | 0.12 |  |  |
|  | SE9 |  |  |  |  |  |  |  |  | 0.12 |  |
|  | SE10 |  |  |  |  |  |  |  |  |  | 0.12 |
| 2PZ[(3)] (g) |  | 0.03 | 0.03 | 0.03 | 0.03 | 0.03 | 0.03 | 0.03 | 0.03 | 0.03 | 0.03 |
| MA (%) |  | 0.78 | 0.80 | 0.81 | 0.88 | 0.89 | 0.88 | 0.82 | 0.72 | 0.82 | 0.89 |

TABLE 26-2

Moisture Absorption Property

|  |  | Ex 11 | Ex 12 | Ex 13 | Ex 14 | Ex 15 | Ex 16 | Ex 17 | Comp. Ex 1 |
|---|---|---|---|---|---|---|---|---|---|
| NC3000H[(1)] (g) |  | 3 | 3 | 3 | 3 | 3 | 3 | 3 | 3 |
| HF-1M[(2)] (g) |  | 1.08 | 1.07 | 1.08 | 1.08 | 1.08 | 1.07 | 1.08 | 1.11 |
| The | SE11 | 0.12 |  |  |  |  |  |  |  |
| Present | SE12 |  | 0.12 |  |  |  |  |  |  |
| Compound | SE13 |  |  | 0.12 |  |  |  |  |  |
| (g) | SE14 |  |  |  | 0.12 |  |  |  |  |
|  | SE15 |  |  |  |  | 0.12 |  |  |  |
|  | SE16 |  |  |  |  |  | 0.12 |  |  |
|  | SE17 |  |  |  |  |  |  | 0.12 |  |
| 2PZ[(3)] (g) |  | 0.03 | 0.03 | 0.03 | 0.03 | 0.03 | 0.03 | 0.03 | 0.03 |
| MA (%) |  | 0.92 | 0.95 | 0.95 | 0.86 | 0.91 | 0.97 | 0.93 | 1.46 |

Compounds used in [Table 26-1] and [Table 26-2] above, and [Table 27-1], [Table 27-2], and [Table 28] below are as below:

(1) NC3000H: an epoxy compound having a biphenyl structure (manufactured by Nippon Kayaku Kabushiki Kaisha)

(2) HF-1M: a phenol novolac curing agent (Meiwa Plastic Industries, HEW=107)

(3) 2PZ: 2-phenylimidazole (Aldrich)

Ex: Example

Comp.Ex: Comparative Example

SE: Synthesis Example

PE: Property Example

Comp. PE: Comparative Property Example

MA: Moisture Absorption

As indicated in [Table 26-1] and [Table 26-2] above, the cured product in examples 1 to 17 comprising the compound of the present disclosure exhibited a moisture absorption significantly lower than that of the cured product of comparative example 1 which does not comprise the compound of the present disclosure.

Also, the more the OH group is present, the higher moisture absorption and the higher dielectric constant are. Thus, according to the result of the low moisture absorption in the tables above, it is understood that a hydroxyl group generated in the curing reaction is decreased by an ester group and an alkoxysilyl group of the compound of the present disclosure, and it is obvious that a dielectric constant is also decreased.

Evaluation of Physical Property: Preparing Cured Product and Evaluation of Coefficient of Thermal Expansion 1. Preparing a Resin Cured Product In the compositions of Tables 27-1 and 27-2 below, the compound of the synthesis example, epoxy compound, curing agent and curing catalyst were dissolved in methyl ethyl ketone to have a solid content of 50 wt %, followed by mixing to be a homogeneous solution. Thereafter, the mixture was placed into a vacuum oven heated to 100° C. to remove a solvent, and was cured at 120° C. for 2 hours in a hot press heated to 120° C. and at 180° C. for 2 hours, and at >200° C. for 2 hours also in an oven, thereby a sample (8 mm×8 mm×3 mm) was prepared for measuring thermal expansion properties. Although the samples are described separately, the samples for measurement prepared in compositions as in [Table 27-1] and [Table 27-2] below are the same as those for moisture absorption measurement prepared in compositions as in [Table 26-1] and [Table 26-2] above.

2. Preparing an Epoxy Filler Composite (Cured Product)

The epoxy compound, the compound of Synthesis Example 8, silica slurry (70 wt % of a solid content, a 2-methoxyethanol solvent, and an average size of silica, 1 µm) and polyvinylacetal were dissolved in methyl ethyl ketone so as to have a solid content of 40 wt % t. The mixture solution was mixed at a speed of 1500 rpm for 1 hour, a curing agent and a curing catalyst were added, and the mixture was further mixed for 50 minutes. The mixture was placed into a vacuum oven heated to 100° C. to remove a solvent, and was cured at 120° C. for 2 hours in a hot press heated to 120° C. and at 180° C. for 2 hours, and >200° C. for 2 hours, thereby an epoxy filler (inorganic particle) composite (5 mm×5 mm×5 mm) was obtained.

3. Evaluation of Thermal Expansion Property

Changes in dimension with temperature were evaluated using a thermo-mechanical analysizer, using the cured product obtained from the property examples of [Table 27-1], [Table 27-2] and [Table 28] below, and thermal expansion properties were listed in [Table 27-1], [Table 27-2] and [Table 28] below:

TABLE 27-1

Thermal Absorption Property (CTE) of cured Epoxy Composition

| | | PE 1 | PE 2 | PE 3 | PE 4 | PE 5 | PE 6 | PE 7 | PE 8 | PE 9 | PE 10 |
|---|---|---|---|---|---|---|---|---|---|---|---|
| NC3000H[(1)] (g) | | 3 | 3 | 3 | 3 | 3 | 3 | 3 | 3 | 3 | 3 |
| HF-1M[(2)] (g) | | 1.07 | 1.07 | 1.07 | 1.08 | 1.08 | 1.08 | 1.04 | 1.06 | 1.08 | 1.08 |
| The Present | SE1 | 0.12 | | | | | | | | | |
| Compound | SE2 | | 0.12 | | | | | | | | |
| (g) | SE3 | | | 0.12 | | | | | | | |
| | SE4 | | | | 0.12 | | | | | | |
| | SE5 | | | | | 0.12 | | | | | |
| | SE6 | | | | | | 0.12 | | | | |
| | SE7 | | | | | | | 0.11 | | | |
| | SE8 | | | | | | | | 0.12 | | |
| | SE9 | | | | | | | | | 0.12 | |
| | SE10 | | | | | | | | | | 0.12 |
| 2PZ[(3)] (g) | | 0.03 | 0.03 | 0.03 | 0.03 | 0.03 | 0.03 | 0.03 | 0.03 | 0.03 | 0.03 |
| CTE | $\alpha_1$ | 69.9 | 69.2 | 67.4 | 70.6 | 70.1 | 70.5 | 68.2 | 67.8 | 69.8 | 69.6 |
| (ppm/° C.) | $\alpha_2$ | 167.8 | 165.8 | 166.9 | 171.5 | 173.3 | 168.7 | 170.3 | 169.9 | 168.2 | 167.3 |

TABE 27-2

Thermal Expansion Property (CTE) of Cured Epoxy Composition

| | | PE 11 | PE 12 | PE 13 | PE 14 | PE 15 | PE 16 | PE 17 | Comp. PE 1 |
|---|---|---|---|---|---|---|---|---|---|
| NC3000H[(1)] (g) | | 3 | 3 | 3 | 3 | 3 | 3 | 3 | 3 |
| HF-1M[(2)] (g) | | 1.08 | 1.07 | 1.08 | 1.08 | 1.08 | 1.07 | 1.08 | 1.11 |
| The Present | SE11 | 0.12 | | | | | | | |
| Compound | SE12 | | 0.12 | | | | | | |
| (g) | SE13 | | | 0.12 | | | | | |
| | SE14 | | | | 0.12 | | | | |
| | SE15 | | | | | 0.12 | | | |
| | SE16 | | | | | | 0.12 | | |
| | SE17 | | | | | | | 0.12 | |
| 2PZ[(3)] (g) | | 0.03 | 0.03 | 0.03 | 0.03 | 0.03 | 0.03 | 0.03 | 0.03 |
| CTE | $\alpha_1$ | 67.0 | 72.0 | 69.9 | 68.5 | 70.8 | 73.5 | 66.7 | 71.6 |
| (ppm/° C.) | $\alpha_2$ | 162.2 | 176.4 | 174.3 | 170.3 | 176.4 | 180.4 | 162.2 | 178.5 |

(2) Preparing an Epoxy Filler Composite

Changes in dimension with a temperature for the cured product obtained from the property examples of Table 28 below were measured using a thermo-mechanical analyzer, and CTE values were listed in Table 28 below and in The FIGURE Filler composite samples with the dimension of 5×5×3 (mm$^3$) were prepared.

TABLE 28

Moisture Absorption and Thermal Expansion Properties of Filler Composite

| Composition | | PE 18 | PE 19 | Comp. PE 2 |
|---|---|---|---|---|
| NC3OOOH[(1)] (g) | | 0.5 | 0.5 | 0.5 |
| HF-IM[(2)] (g) | | 0.1873 | 0.1433 | 0.1947 |
| SE8 (g) | | 0.02 | 0.1433 | 0 |
| 2PZ[(3)] (g) | | 0.005 | 0.005 | 0.005 |
| Silica (g) | | 4.25 | 4.4 | 4.84 |
| MA(%) | | 0.26 | 0.25 | 0.47 |
| CTE | $\alpha_1$ | 10.3 | 7.8 | 11.7 |
| (ppm/° C.) | $\alpha_2$ | 32.4 | 20.1 | 48.1 |

As indicated in [Table 28] and The FIGURE, Property Examples 18 and 19 which are the composite of Synthesis Example 8 of the present disclosure had a significantly low moisture absorption as well as a low CTE value as compared to that of Comparative Property Example 2 which does not comprise the compounds of Synthesis Example 8, which indicates that the excellent low thermal expansion properties are also observed.

Generally, low thermal expansion properties can be improved by a filler. Therefore, the moisture absorption and low thermal expansion properties of the above [Table 26-1], [Table 26-2], [Table 27-1], and [Table 27-2] were measured using the epoxy resin curing agent in the absence of filler so that it can be confirmed that the effect of maintaining or improving the low thermal expansion properties and improving the low moisture absorption are due to the compound having the alkoxysilyl group and the active ester group according to the present disclosure by excluding the effect of improving the low thermal expansion properties by the filler.

Further, according to the result of [Table 28], by using the compound having the alkoxysilyl group and active ester group of the present disclosure, the improvement of the low moisture absorption and the low thermal expansion properties of an epoxy composite can be confirmed. Specifically, as shown in Property Examples 18 and 19 in [Table 28] and in Example 8 and Property Example 8 comprising the compound of Synthesis Example 8 in [Table 26-1] and [Table 27-1], low moisture absorption and low thermal expansion properties of the composite were further improved, being compared with those of the epoxy resin cured product.

INDUSTRIAL APPLICABILITY

The compound having an alkoxysilyl group and an active ester group according to the present disclosure has an effect that, when the compound is added in an epoxy composition, low moisture absorption and/or low dielectric properties may be improved while low thermal expansion properties may be maintained.

Specifically, in an epoxy composition comprising the compound of the present disclosure having an alkoxysilyl group and an active ester group in a core structure, the formation of the hydrophilic hydroxyl group is suppressed due to the reaction of hydroxy group formed during epoxy curing with active ester group and alkoxysilyl group. In addition, since excellent interfacial bond formation between the epoxy compound, the curing agent, and/or the filler and the alkoxysilyl group is possible, the thermal expansion characteristics are not deteriorated, differently from the case where low moisture absorption is achieved using the conventional method. Rather, in the present disclosure, it exhibits an excellent effect of low moisture absorption and/or low dielectric properties in addition to low-thermal expansion properties.

The invention claimed is:
1. A compound having an alkoxysilyl group and an active ester group selected from a group consisting of Formulae AF to LF below:

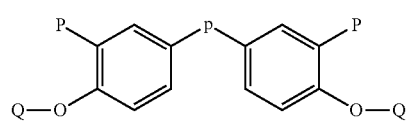 (AF)

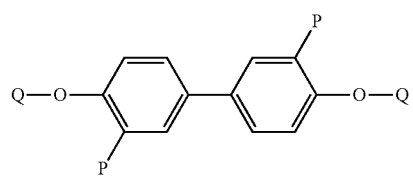 (BF)

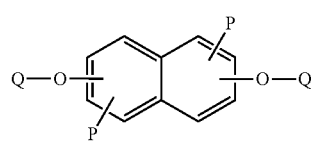 (CF)

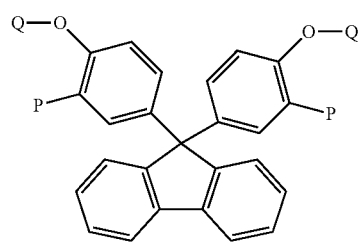 (DF)

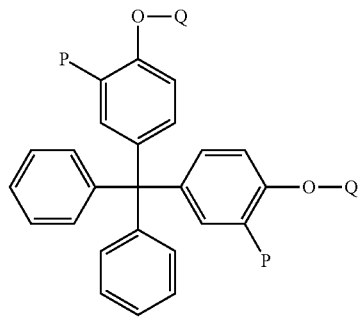 (EF)

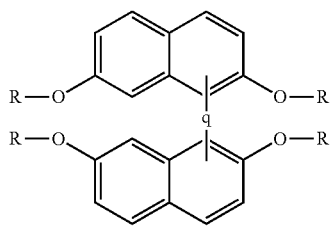 (FF)

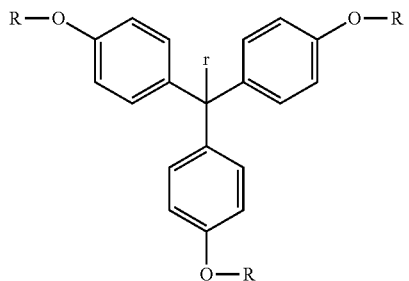 (GF)

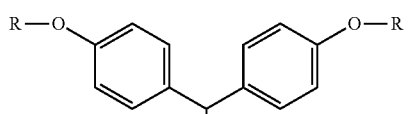 (HF)

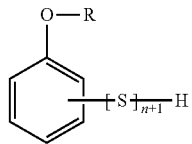 (KF)

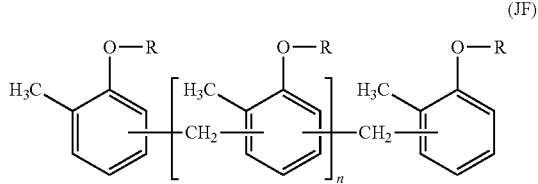 (JF)

(KF)

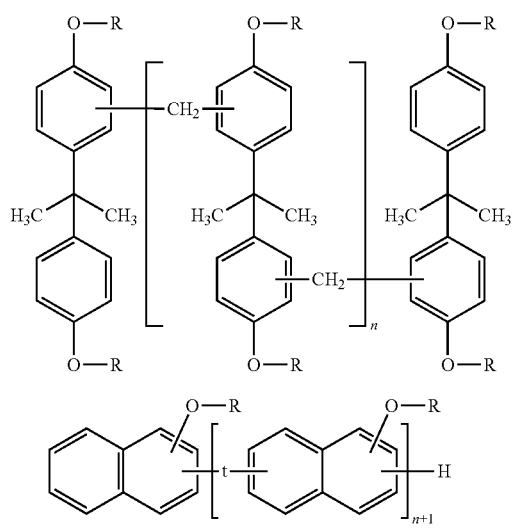

(LF)

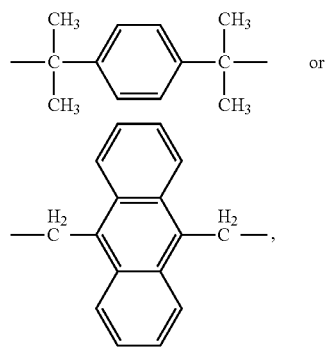

in Formula AF, -p- is —C(CH$_3$)$_2$—, —CH$_2$—, —C(CF$_3$)$_2$—, —S—, —SO$_2$—,

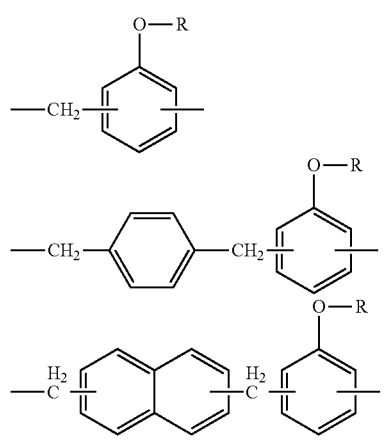

in Formula FF, -q- is —CH$_2$— or a direct linkage, in Formula GF, r is hydrogen, a hydroxyl group, a C1-C10 alkyl group, or a C1-C10 aromatic group, preferably a C6-C10 aromatic group, in Formula IF, s is

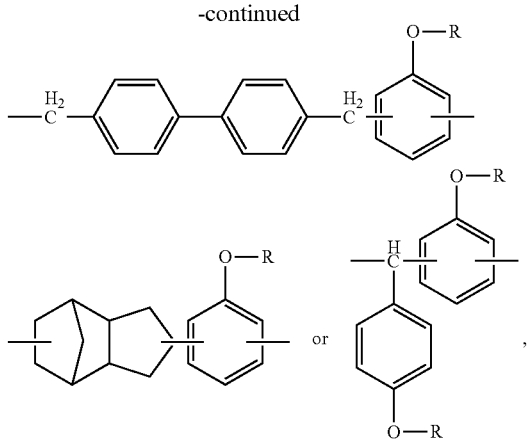

in Formula LF, t is

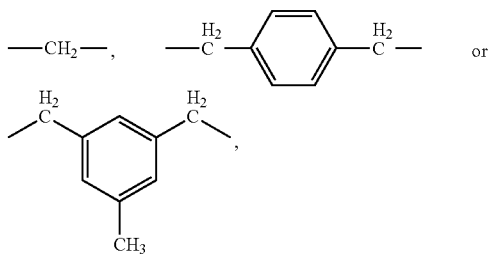

in Formulae IF to LF, n is an integer equal to or greater than 1, in Formulae AF to EF, at least one of a plurality of Ps is —(CH$_2$)mSiRaRbRc, at least one of Ra, Rb, and Rc is a C1-C5 alkoxy group and the remainders thereof are alkyl groups having 1 to 10 carbon atoms, the alkyl group and the alkoxy group are a linear or branched alkyl group and a linear or branched alkoxy group, m is an integer ranging from 3 to 10, the remainders thereof are hydrogen or alkenyl group of —(CH$_2$)$_l$CHCH$_2$, where l is an integer ranging from 1 to 8, at least one of a plurality of Qs is —COR$_1$, where R$_1$ is an aliphatic, alicyclic, or aromatic hydrocarbon group of C1-C20, and the aliphatic hydrocarbon group is a linear or branched aliphatic hydrocarbon group, and the remainder of the plurality of Qs are hydrogen, in Formulae FF to LF, at least one of a plurality of Rs is —(CH$_2$)mSiRaRbRc or —CONH(CH$_2$)mSiRaRbRc, where at least one of Ra, Rb, and Rc is a C1-C5 alkoxy group, and the remainders thereof are alkyl groups having 1 to 10 carbon atoms, the alkyl group and the alkoxy group are linear or branched, m is an integer ranging from 3 to 10, at least one of a plurality of Rs is —COR$_1$, R$_1$ is an aliphatic, alicyclic, or aromatic hydrocarbon group of C1-C20, the aliphatic hydrocarbon group is linear or branched, and the remainder of the plurality of Rs are hydrogen or alkenyl group of —(CH$_2$)$_l$CHCH$_2$, independently, where l is an integer ranging from 1 to 8.

2. An epoxy composition comprising a compound having an alkoxysilyl group and an active ester group selected from a group consisting of Formulae AF to LF of claim 1.

3. The epoxy composition of claim 2, further comprising: an epoxy compound, a curing agent, and a filler.

4. An electrical and electronic material including the epoxy composition of claim 2.

5. The electrical and electronic material of claim 4, wherein the electrical and electronic material is a substrate, a film, a laminated substrate, prepreg, a printed circuit board, or a packaging material.

6. An adhesive comprising the epoxy composition of claim 2.

7. A paint comprising the epoxy composition of claim 2.

* * * * *